United States Patent
Rao et al.

(10) Patent No.: US 12,150,083 B1
(45) Date of Patent: Nov. 19, 2024

(54) METHODS AND APPARATUS FOR POWER-EFFICIENT POSITIONING IN WIRELESS COMMUNICATION SYSTEMS

(71) Applicant: InterDigital Patent Holdings, Inc., Wilmington, DE (US)

(72) Inventors: Jaya Rao, Montreal (CA); Faris Alfarhan, Montreal (CA); Fumihiro Hasegawa, Westmount (CA); Moon Il Lee, Melville, NY (US); Tuong Hoang, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 18/770,033

(22) Filed: Jul. 11, 2024

Related U.S. Application Data

(63) Continuation of application No. 18/031,378, filed as application No. PCT/US2021/055060 on Oct. 14, 2021.

(Continued)

(51) Int. Cl.
*H04W 64/00* (2009.01)

(52) U.S. Cl.
CPC .................................. *H04W 64/00* (2013.01)

(58) Field of Classification Search
CPC ........................ H04W 52/0225; H04W 64/00
(Continued)

(56) References Cited

U.S. PATENT DOCUMENTS

| 8,730,932 B2 * | 5/2014 | Islam | G01S 13/767 370/441 |
| 11,683,659 B2 * | 6/2023 | Kim | G05D 1/0295 455/456.1 |

(Continued)

FOREIGN PATENT DOCUMENTS

| CN | 103763748 A | 4/2014 |
| CN | 105122672 A | 12/2015 |
| WO | WO 2014182338 A1 | 11/2014 |

OTHER PUBLICATIONS

3rd Generation Partnership Project (3GPP), TS 38.305 V16.1.0, "Technical Specification Group Radio Access Network, NG Radio Access Network (NG-RAN), Stage 2 functional specification of User Equipment (UE) positioning in NG-RAN Release 16)", Jul. 2020, pp. 1-114.

(Continued)

*Primary Examiner* — Joseph Arevalo
(74) *Attorney, Agent, or Firm* — Flaster Greenberg, P.C.

(57) ABSTRACT

Method, apparatus, and systems for determining and transmitting positioning information in a wireless communication network are provided. For example, a method for wireless communications comprises receiving configuration information related to a set of positioning configurations and a small data transmission (SDT), determining, based on the configuration information, that at least one positioning configuration of the set of positioning configurations satisfies a positioning requirement and is associated with a payload size being less than a data volume threshold (DVT) associated with the SDT, selecting, from the at least one positioning configuration, a positioning configuration associated with a payload size being closest to the DVT, performing a positioning measurement based on the selected positioning configuration, and sending, using an uplink resource for the SDT, a measurement report based on the selected positioning configuration and the positioning measurement.

14 Claims, 12 Drawing Sheets

Related U.S. Application Data

(60) Provisional application No. 63/227,496, filed on Jul. 30, 2021, provisional application No. 63/167,985, filed on Mar. 30, 2021, provisional application No. 63/134,331, filed on Jan. 6, 2021, provisional application No. 63/091,399, filed on Oct. 14, 2020.

(58) Field of Classification Search
USPC .......... 455/456.1, 522, 450, 101, 436, 452.1
See application file for complete search history.

(56) References Cited

U.S. PATENT DOCUMENTS

| | | | |
|---|---|---|---|
| 2012/0129550 A1* | 5/2012 | Hannan | G01S 5/0036 455/456.1 |
| 2012/0129551 A1* | 5/2012 | Islam | G01S 13/878 455/456.1 |
| 2020/0229130 A1 | 7/2020 | Keating et al. | |
| 2023/0099762 A1* | 3/2023 | Khoshkholgh Dashtaki | H04W 56/0045 370/350 |
| 2023/0247583 A1* | 8/2023 | Kim | H04W 8/24 455/456.1 |

OTHER PUBLICATIONS

3rd Generation Partnership Project (3GPP), "Technical Specification Group Radio Access Network; NR; Radio Resource Control (RRC) protocol specification (Release 16)," 3GPP TS 38.331 V16.1.0 (Jul. 2020).

* cited by examiner

METHODS AND APPARATUS FOR POWER-EFFICIENT POSITIONING IN WIRELESS COMMUNICATION SYSTEMS

CROSS-REFERENCE TO RELATED APPLICATIONS

This application is a continuation of U.S. Non-Provisional patent application Ser. No. 18/031,378, filed Apr. 12, 2023, which is the U.S. National Stage Application under 35 U.S.C. 371 of International Patent Application No. PCT/US2021/055060, filed Oct. 14, 2021, which claims priority to and the benefit of U.S. Provisional Application No. 63/091,399 filed in the U.S. Patent and Trademark Office on Oct. 14, 2020, U.S. Provisional Application No. 63/134,331 filed in the U.S. Patent and Trademark Office on Jan. 6, 2021, U.S. Provisional Application No. 63/167,985 filed in the U.S. Patent and Trademark Office on Mar. 30, 2021, and U.S. Provisional Application No. 63/227,496 filed in the U.S. Patent and Trademark Office on Jul. 30, 2021, the entire contents of each of which being incorporated herein by reference as if fully set forth below in their entirety and for all applicable purposes.

BACKGROUND

In the 3rd Generation Partnership Project (3GPP) standards (e.g., 3GPP Release 16), downlink, uplink, and downlink and uplink positioning methods are specified.

In the downlink positioning method(s), Positioning Reference Signals (PRSs) are sent from multiple Transmission/Reception Points (TRPs) of a wireless communication network to a WTRU. The WTRU will observe multiple reference signals and measure time difference of arrival between a pair of PRSs. Then, the WTRU returns measured Reference Signal Time Difference (RSTD) to the Location Management Function (LMF). In addition, the WTRU can return measured Reference Signal Received Power (RSRP) for each PRS. Based on the returned measurements, the LMF conducts positioning of the WTRU. Alternatively, the WTRU can report RSRP for downlink (DL) angle-based positioning methods.

In the uplink positioning method(s), the WTRU sends a Sounding Reference Signal (SRS) for positioning, configured by Radio Resource Control (RRC) signaling, to Reception Points (RPs) or TRPs. For timing-based methods, TRP measures Relative Time of Arrival (RTOA) for received SRS signals and reports measured values to the LMF. The WTRU can report RSRP for SRS. In angle-based uplink positioning methods, an RP or TRP will measure angles of arrival and report it to the LMF.

In the uplink and downlink positioning method(s), a WTRU measures Rx-Tx time difference between a received PRS and a transmitted SRS. The Rx-Tx time difference is reported to the LMF. The WTRU can also report measured RSRP for PRS and, the TRP computes the Rx-Tx difference between the received SRS and the transmitted PRS.

A "DL positioning method" may refer to any positioning method that requires downlink reference signals, such as PRS. In such positioning techniques, the WTRU may receive multiple reference signals from TP and measures DL RSTD and/or RSRP. Examples of DL positioning methods include DL-AoD or DL-TDOA positioning.

A "UL positioning method" may refer to any positioning technique that requires uplink reference signals, such as SRS for positioning. In such techniques, the WTRU may transmit SRS to multiple RPs or TRPs, and the RPs or TRPs measure the UL RTOA and/or RSRP. Examples of UL positioning methods include UL-TDOA or UL-AoA positioning.

A "DL and UL positioning method" may refer to any positioning method that requires both uplink and downlink reference signals for positioning. In one example, a WTRU transmits SRS to multiple TRPs and a gNB measures the Rx-Tx time difference. The gNB can measure RSRP for the received SRS. The WTRU measures Rx-Tx time difference for PRSs transmitted from multiple TRPs. The WTRU can measure RSRP for the received PRS. The Rx-TX difference, and possibly RSRP measured at the WTRU and the gNB, are used to compute round trip time. Here, Rx and Tx difference refers to the difference between arrival time of the reference signal transmitted by the TRP and transmission time of the reference signal transmitted from the WTRU. An example of DL and UL positioning method is multi-Round Trip Time (RTT) positioning.

A DL-based positioning (and possibly DL and UL positioning) is either WTRU-based (i.e., the WTRU conducts positioning) or WTRU-assisted (the network conducts the positioning operations using with measurement reports sent from the WTRU).

In various embodiments, the term "network" is inclusive of AMF, LMF, and/or NG-RAN.

SUMMARY

Embodiments disclosed herein generally relate to wireless communication networks. For example, one or more embodiments disclosed herein are related to method, apparatus, and systems for determining and transmitting positioning information (e.g., a geographic position, positioning configurations, positioning measurements, and/or a measurement report for positioning) in a wireless communication network. Various embodiments and methods may be implemented in a wireless transmit/receive unit (WTRU) in a wireless communication network (e.g., a cellular network), while in a low-power state, such as a low-power connectivity state, an Idle state, and/or an inactive state.

In one embodiment, a method implemented in a WTRU for wireless communications includes receiving configuration information related to a set of positioning configurations and a small data transmission (SDT), determining, based on the configuration information, that at least one positioning configuration of the set of positioning configurations satisfies a positioning requirement and is associated with a payload size being less than a data volume threshold (DVT) associated with the SDT, selecting, from the at least one positioning configuration, a positioning configuration associated with a payload size being closest to the DVT, performing a positioning measurement based on the selected positioning configuration, and sending, using an uplink resource for the SDT, a measurement report based on the selected positioning configuration and the positioning measurement.

In one embodiment, a method implemented in a WTRU for wireless communications includes receiving assistance data including one or more Positioning Reference Signal (PRS) configurations, each PRS configuration may include a measurement configuration and/or a measurement report configuration. At least one of the PRS configurations may be indicated to meet a minimum accuracy requirement. The method may also include sending an indication (e.g., to a gNB) of the payload sizes (of measurement report(s)) associated with the one or more PRS configurations. The method may include receiving a small data transmission (SDT) configuration (e.g., from the gNB) including a data volume threshold (DVT) for SDT (e.g., indicating the maximum payload size for SDT). On condition that at least one PRS config from the one or more received PRS configurations indicated to satisfy the minimum accuracy requirement has an associated payload size less than the DVT for SDT, the method may include selecting a PRS config with an associated payload size closest to the DVT for SDT from among the at least one PRS configurations that satisfy the minimum accuracy requirement; and performing PRS measurements and sending a measurement report (to the LMF) based on the selected PRS config using an SDT (e.g., in an INACTIVE state), and the measurement report indicates the selected PRS config and the DVT for SDT. On condition that none of the PRS configurations indicated to satisfy the minimum accuracy requirement have an associated payload size less than the DVT for SDT, the method may include sending a connection request (e.g., to the gNB to transition to a CONNECTED state to be able to send a measurement report).

BRIEF DESCRIPTION OF THE DRAWINGS

A more detailed understanding may be had from the detailed description below, given by way of example in conjunction with the drawings appended hereto. Figures in such drawings, like the detailed description, are exemplary. As such, the Figures and the detailed description are not to be considered limiting, and other equally effective examples are possible and likely. Furthermore, like reference numerals ("ref.") in the Figures ("FIGS.") indicate like elements, and wherein.

DETAILED DESCRIPTION

Introduction

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples described, disclosed or otherwise provided explicitly, implicitly and/or inherently (collectively "provided") herein. Although various embodiments are described and/or claimed herein in which an apparatus, system, device, etc. and/or any element thereof carries out an operation, process, algorithm, function, etc. and/or any portion thereof, it is to be understood that any embodiments described and/or claimed herein assume that any apparatus, system, device, etc. and/or any element thereof is configured to carry out any operation, process, algorithm, function, etc. and/or any portion thereof.

Figure 1A:
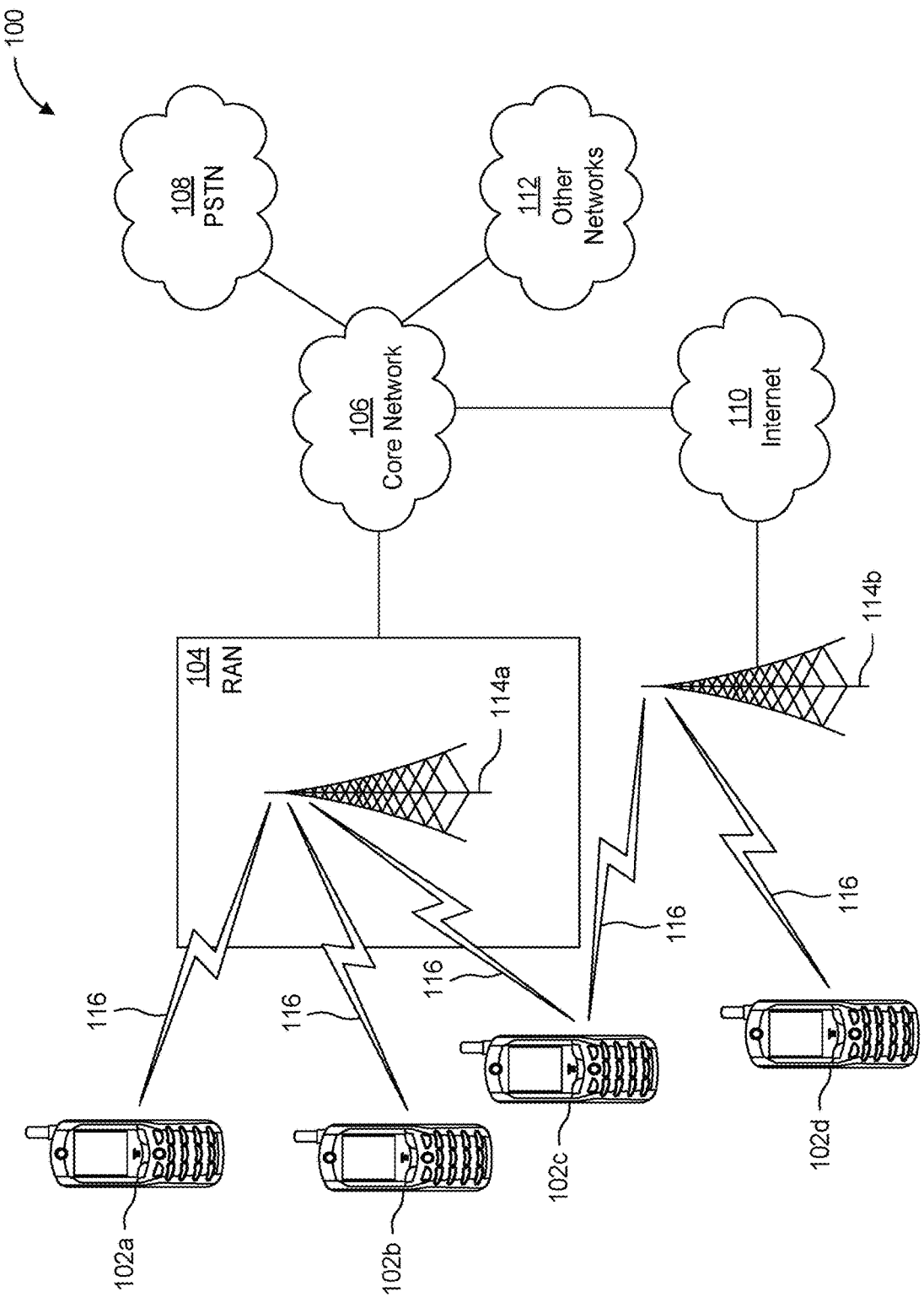
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VOIP) services to one or more of the WTRUs 102a, 102b, 102c, 102d. The data may have varying quality of service (QOS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
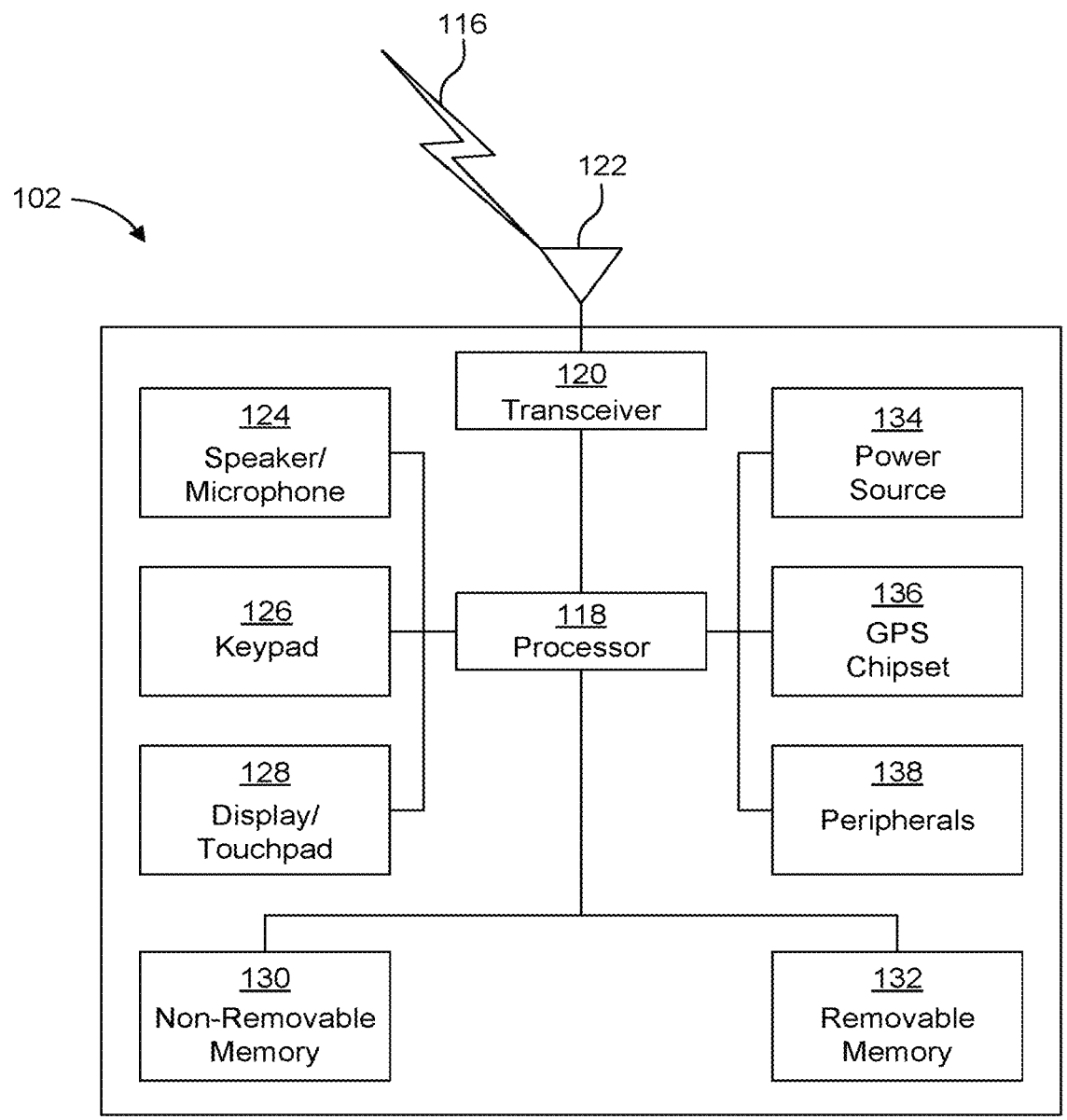
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
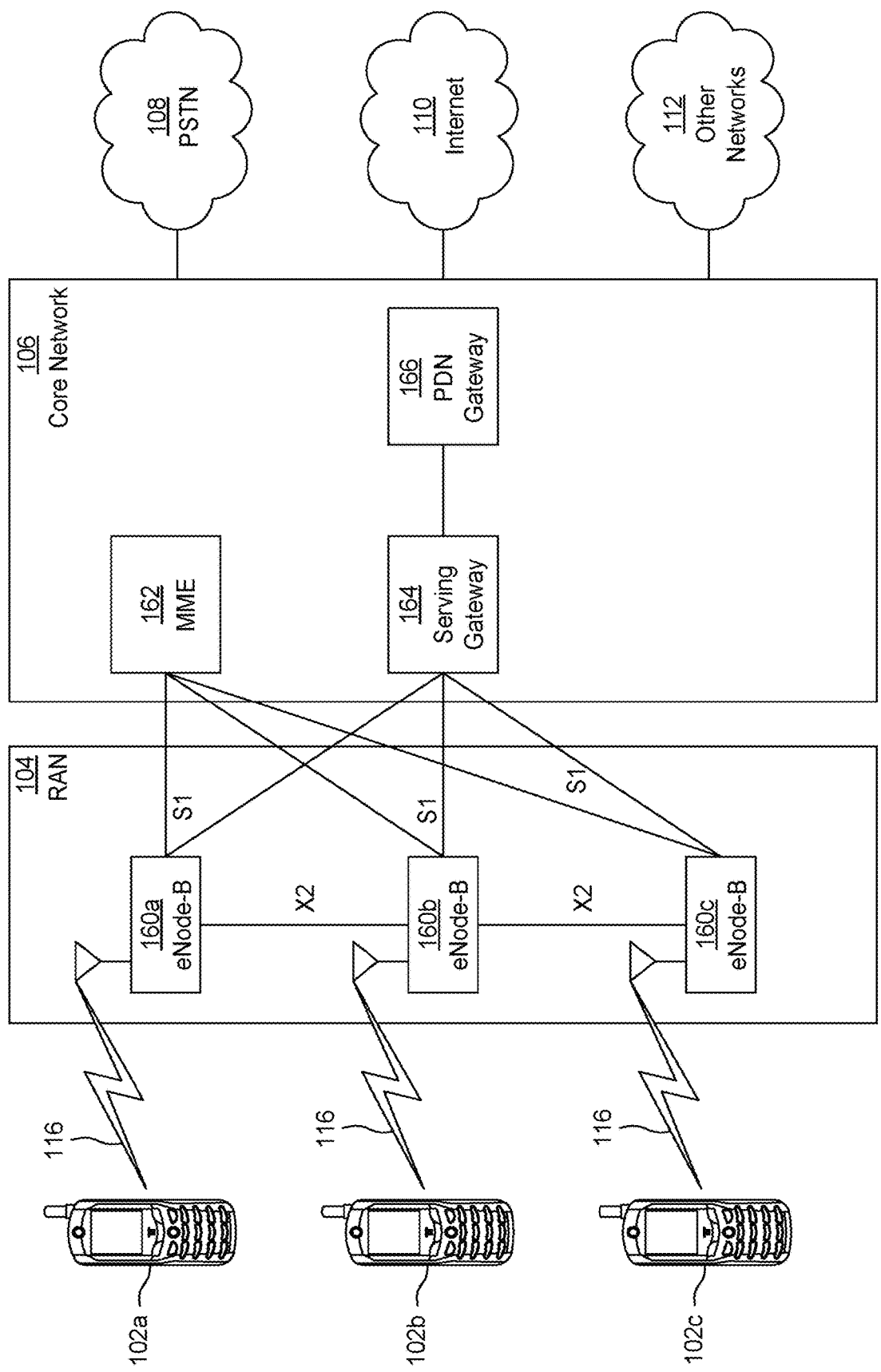
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102*a*, 102*b*, 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In one embodiment, the eNode-Bs 160*a*, 160*b*, 160*c* may implement MIMO technology. Thus, the eNode-B 160*a*, for example, may use multiple antennas to transmit wireless signals to, and/or receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the UL and/or DL, and the like. As shown in FIG. 1C, the eNode-Bs 160*a*, 160*b*, 160*c* may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162*a*, 162*b*, 162*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network. In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHZ, 80 MHZ, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHZ, 2 MHZ, 4 MHZ, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHZ, 8 MHZ, 16 MHZ, and/or other channel bandwidth operating modes. Carrier sensing and/or Network Allocation Vector (NAV) settings may depend on the status of the primary channel. If the primary channel is busy, for example, due to a STA (which supports only a 1 MHZ operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHZ. In Japan, the available frequency bands are from 916.5 MHz to 927.5 MHz. The total bandwidth available for 802.11ah is 6 MHz to 26 MHz depending on the country code.

Figure 1D:
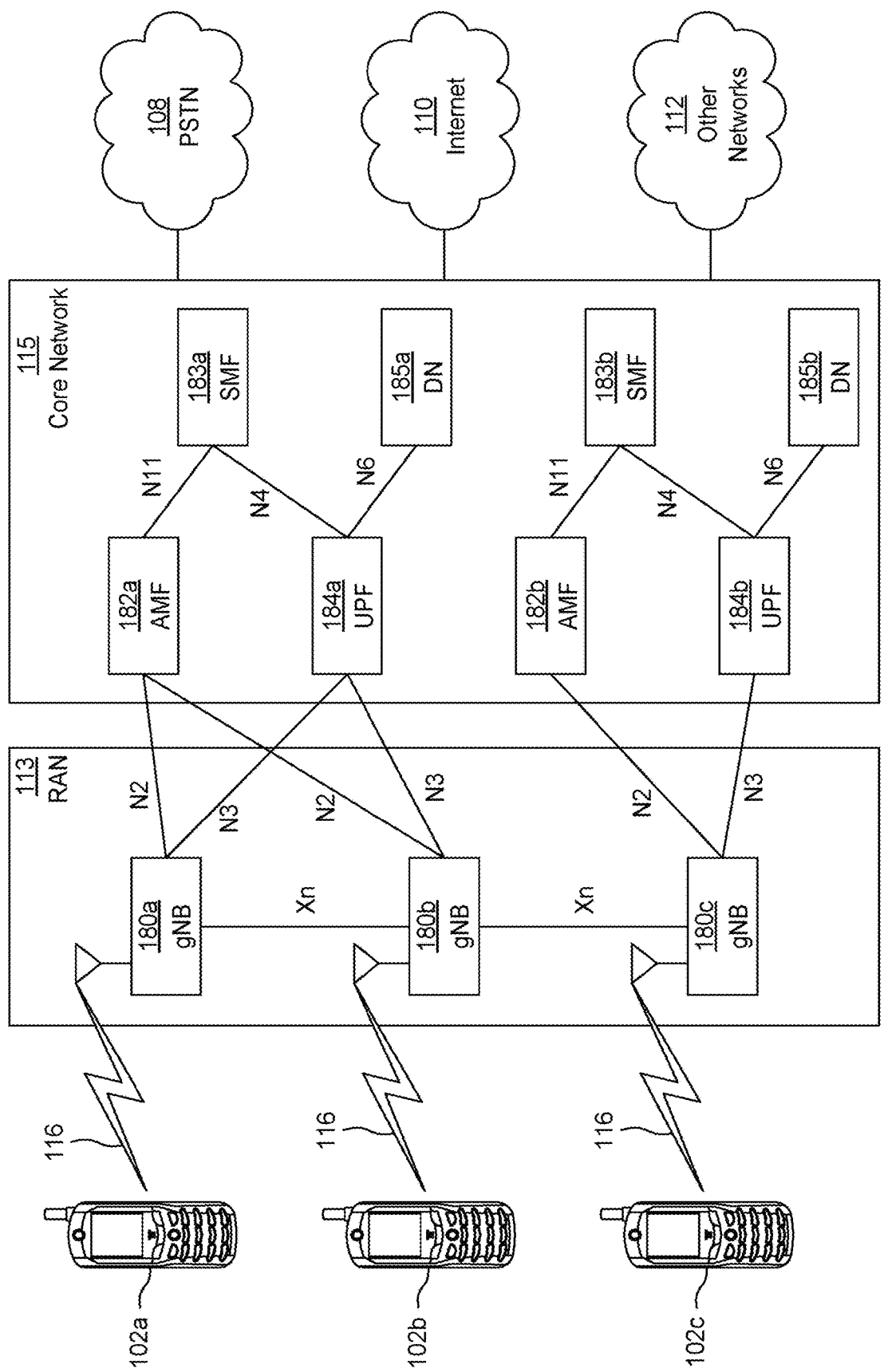
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 180b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (COMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of Non-Access Stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Positioning in 3GPP Release 16

3GPP Rel-16 for NR (New Radio) supports positioning for RRC_CONNECTED mode. During IDLE or INACTIVE mode, positioning procedure, or WTRU behavior is unknown.

To reduce power consumption, WTRUs need to be in INACTIVE or IDLE mode. In addition, recent demands for centimeter level accuracy for IIoT (Industrial Internet of Things) applications require both high accuracy and low latency during positioning. This specification discloses methods and apparatus that satisfy the requirements for high accuracy and low latency even when WTRUs are in INACTIVE/IDLE mode.

In the current 3GPP specification, configurations of reference signals used for positioning during IDLE and INACTIVE mode are not specified. In addition, procedures for a WTRU to obtain reference signal configurations or measurement reporting is not clear. IIoT devices such as sensors or cameras may be accidently moved from their current positions, e.g., a sensor may be dislodged from its mount and carried by flooding or strong winds to different areas. Therefore, mobility support, which reduces latency during positioning, is needed for positioning during INACTIVE/IDLE mode. Further, IIoT applications may need to support large numbers of IIoT devices, and hence features to support simultaneous positioning are needed.

Herein, "SRS for positioning" refers to an SRS signal/transmission used for positioning. Resources for SRS for positioning may be defined (e.g., signaled) by RRC. Rel. 16 specifies SRS resource set and SRS resource configured for positioning. However, "SRS for positioning" or "SRS" as used in this disclosure may include at least one of the following:
- SRS which is configured under SRS-PosResourceSet-r16 and SRS-PosResource-r16 in [2]
- SRS which is configured under SRS-ResourceSet and SRS-Resource in [2]
- SRS which is not configured under SRS-PosResourceSet-r16 and SRS-PosResource-r16 in [2]
- SRS which is not configured under SRS-ResourceSet and SRS-Resource in [2]
- SRS which is not associated with SRS-PosResourceSet-r16, SRS-PosResource-r16, SRS-ResourceSet or SRS-Resource in [2]
- Uplink reference signal that is associated for positioning
- DM-RS for uplink
- PTRS for uplink For brevity, SRS for positioning is denoted as "SRSp" herein, and PRS or SRS as used herein are not limited to RS used for positioning. The methods and apparatus disclosed herein can be applied to or used with any DL or UL reference signals.

Configurations and WTRU Behavior During a RACH Procedure

Trigger for Positioning

Positioning Configuration

A positioning configuration may include a set of information related to positioning measurement and/or SRSp transmission. One or more of following types of information may be included in a positioning configuration:
- One or more of positioning method used (e.g., DL-TDOA (Time Difference of Arrival), UL-TDOA, DL-AOD (Angle of Departure), UL-AoA (Angle of Arrival), Multi-RTT)
- PRS configuration
- SRSp configuration
- Uplink resource (e.g., Physical Random Access Channel (PRACH), Physical Uplink Shared Channel (PUSCH), Physical Uplink Control Channel (PUCCH)) to report the positioning measurement.
- One or more threshold values to determine the positioning measurement quality
- Positioning mode of operation (e.g., starting positioning mode of operation)

PRS resource configuration may include any one or more of the following:
- PRS resource ID
- PRS sequence ID, or other IDs used to generate PRS sequence
- PRS resource element offset
- PRS resource slot offset
- PRS symbol offset
- PRS Quasi Co-location Information (QCL) information
- PRS resource set ID
- List of PRS resources in the resource set
- Number of PRS symbols
- Muting pattern for PRS, muting parameters such as repetition factor, muting options
- PRS resource power
- Periodicity of PRS transmission
- Spatial direction information of PRS transmission (e.g., beam information, angles of transmission)
- Spatial direction information of UL Reference Signal (RS) reception (e.g., beam ID used to receive UL RS, angle of arrival)

SRSp resources configuration may include at least one of the following:
- Resource ID
- Comb offset values, cyclic shift values.
- Start position in the frequency domain
- Number of SRSp symbols.
- Shift in the frequency domain for SRSp
- Frequency hopping pattern
- Type of SRSp, e.g., aperiodic, semi-persistent or periodic
- Sequence ID used to generate SRSp, or other IDs used to generate SRSp sequence
- Spatial relation information, indicating which reference signal the SRSp is related to spatially
- Resource set ID
- List of SRSp resources in the resource set
- Transmission power related information
- Pathloss reference information which may contain index for Synchronization Signal Block (SSB), Channel State Information Reference Signal (CSI-RS) or PRS
- Periodicity of SRSp transmission
- Spatial direction information of SRSp transmission (e.g., beam information, angles of transmission)
- Spatial direction information of DL RS reception (e.g., beam ID used to receive DL RS, angle of arrival)

As the part of its configuration, the WTRU may receive information related to the cell ID, global cell ID, or TRP ID which is associated with PRS. For example, the TRP which transmits PRS is identified by the TRP ID, which may belong to a cell identified by the cell ID. The WTRU may be configured with timing information such as System Frame Number (SFN) offset for PRS or SRSp transmission. The offset is introduced to prevent the WTRU from receiving overlapping PRS in the time domain.

In one method, the WTRU may be configured with measurement gaps to receive PRS from the network.

Positioning Mode of Operation and Conditions for Occurrence of Positioning Mode

In one embodiment, a WTRU may be configured, determined, or indicated to perform positioning measurement in RRC idle mode and/or RRC inactive mode. For example, one or more of the positioning modes of operation may be used. In a first positioning mode of operation, a WTRU may perform positioning measurement and reporting when the WTRU is in RRC connected mode; in a second positioning mode of operation, a WTRU may perform positioning measurement and reporting in one or more RRC connection states (e.g., connected, inactive, and idle). One or more of the following may apply:

- A WTRU may indicate its capability to support the positioning mode of operation to an LMF. For example, a first WTRU may indicate its capability to support a first positioning mode of operation only, while a second WTRU may indicate its capability to support a first and second positioning modes of operation
- The positioning mode of operation may be configured or indicated (e.g., by LMF).
- The positioning mode of operation may be determined based on the WTRU power status. For example, if a WTRU is in a low power status (e.g., remaining battery level is lower than a threshold), the WTRU may perform a first positioning mode of operation (e.g., positioning measurement and reporting only in RRC connected status); otherwise, the WTRU may perform a second positioning mode of operation (e.g., positioning measurement and reporting at least in RRC connected/inactive states or RRC connected/inactive/idle states)
- The positioning mode of operation may be determined based on an application type (or use case), wherein the application type (or use case) may be at least one of enhanced Mobile Broadband (eMBB), Ultra-Reliable and Low Latency Communications (URLLC), IIoT, public safety, V2X, and massive machine type communications (mMTC))
  - Application type may be interchangeably used with use case, traffic type, device type, target QoS, QoS, requirements, and WTRU category
  - A first positioning mode of operation may be used for application types that may not require high reliability and/or low latency and a second positioning mode of operation may be used for application types that may require high reliability and/or low latency.
- The positioning mode of operation may be determined based on the availability of other positioning signals (e.g., Global Navigation Satellite System (GNSS), WiFi signal). For example, a first positioning mode of operation may be used when another positioning signal (e.g., GNSS) is available, while a second positioning mode of operation may be used when another positioning signal is not available
  - In this case, it is assumed that positioning accuracy may be reasonably sufficient even without a RAN-based positioning method when a WTRU is in RRC inactive or RRC idle status.
- The positioning mode of operation may be determined based on the positioning measurement accuracy. The positioning measurement accuracy may be interchangeably used with positioning measurement reliability and positioning measurement quality
  - In an example, if the positioning measurement accuracy (e.g., RSRP level of a PRS measurement) is lower than a threshold, the WTRU may perform a first positioning mode of operation; otherwise, the WTRU may perform a second positioning mode of operation
  - In another example, if there is a Line of Sight (LOS) path for the positioning measurement, the WTRU may perform a first positioning mode of operation; otherwise, the WTRU may perform a second positioning mode of operation.
  - The positioning measurement accuracy metric may include at least one of RSRP, L1-RSRP, existence of LoS path, beam quality, number of beams used for PRS transmission, etc.
- A WTRU may switch positioning mode of operation when one or more predefined conditions are met. For example, a WTRU may perform a first positioning mode of operation when the positioning measurement accuracy is lower than a threshold. When the positioning measurement accuracy becomes better and above threshold, the WTRU may switch to a second positioning mode of operation.
  - The WTRU may request to switch to a second positioning mode of operation from a first positioning mode of operation (e.g., to LMF)

Using DRX to Determine when to Wake Up to Perform Positioning Measurements

In one method, a WTRU may wake up for a positioning occasion in DRX, which is referred to as a DRX positioning occasion to perform measurements and/or report positioning related data. A DRX positioning occasion may include: on durations, a subset of DRX off cycles, a subset of on durations if a WTRU identity has been determined to be signaled in the on duration (e.g., in P-RNTI or power savings RNTI (Radio Network Temporary Identifier), and/or a subset of on durations if the WTRU has received a wake up signal.

A WTRU may be configured with a specific RNTI or a group RNTI, which can be used to indicate to the WTRU (or a group of WTRUs) to wake up to perform positioning measurements and/or reporting. The WTRU may determine the configuration of PRS or SRSp (including contents of applicable resource sets, resources, and the sequence ID) from the received RNTI, from PDSCH transmission addressed to that RNTI, or from the paging message itself. The WTRU may also receive an uplink grant along with the configuration to provide the associated positioning report.

In inactive sate, the WTRU may monitor the PDCCH during on duration addressed to I-RNTI or C-RNTI for the reception of the indication for positioning.

Upon reception of an indication for positioning in a paging occasion, the WTRU may determine the related configuration for PRS or SRSp, perform the related positioning measurements, and/or report the related position or positioning report (part of a PUSCH transmission in a RACH procedure or on a configured grant applicable in the current serving cell).

WTRU in Idle/Inactive Mode Initiates a Positioning Procedure Based on a Reception/Detection of a Positioning Related Trigger In various embodiments, the WTRU may receive a trigger for initiating a positioning procedure for different RAT-dependent positioning methods (e.g., DL-based, UL-based or UL and DL based positioning) while remaining in idle/inactive mode. For example, the trigger received/detected by the WTRU may contain information on the WTRU ID, identifier of positioning method, and identifier of the selected/activated PRS/SRSp configurations. The configurations related to the positioning methods, including the PRS/SRSp (pre)configurations, may be received by the WTRU either prior to transitioning or while operating in idle/inactive mode.

The triggering conditions for a WTRU in idle/inactive mode for initiating positioning operation (e.g., measurement of DL PRS or transmission of SRSp) and/or for receiving the PRS/SRSp configurations) may be one or more of the following:

Higher layer/application trigger: For example, in the case of WTRU-based positioning, the higher layers in the WTRU may trigger reception of the PRS configuration (e.g., assistance information in SIB) or trigger the transmission of a request message for receiving PRS/SRSp configuration. In this case, if the WTRU is pre-configured with the PRS/SRSp configurations and the pre-configured PRS/SRSp are valid when triggered by a higher layer function (e.g. PRS/SRSp configurations may be considered to be valid if the timing and/or cell area list information associated with the PSRS/SRSp configurations is within the validity time and/or validity cell area bounds) the WTRU may use the existing PRS/SRSp configurations for positioning, for example. Otherwise, the WTRU may send an indication message to the LMF/RAN requesting the PRS/SRSp configurations.

Network trigger: For example, in the case of WTRU assisted positioning, the trigger for receiving the PRS configuration and/or for initiating the measurement of DL PRS may be received from the LMF or RAN either in a Core Network (CN) paging message or a System Information Block (SIB). Likewise, the trigger for receiving the SRSp configuration and/or for initiating the transmission of UL SRSp may be received from the RAN either in a RAN paging message or SIB, for example.

SIB: For example, the WTRU may be triggered to receive PRS/SRSp configurations or to update the existing PRS/SRSp based on the reception of a SIB while in idle/inactive mode.

Paging: For example, the WTRU may be triggered to initiate PRS measurement or SRSp transmission upon receiving a CN or RAN paging message In WTRU-based positioning, upon receiving the trigger from a higher layer/application while in idle/inactive mode, the WTRU may apply the received/available PRS configurations for DL-based positioning, SRSp configuration for UL-based positioning, or both PRS and SRSp for UL and DL-based positioning. For the DL positioning, the WTRU may provide the measurement report determined by measuring the downlink PRS directly to the upper layers. For UL based and UL and DL based positioning, the WTRU may receive the measurement reports from the RAN upon sending the SRSp. The received measurement reports and, possibly the calculated positioning information, are subsequently sent to the upper layers.

In WTRU-assisted positioning, the trigger for requesting WTRU location may be received from the LMF, and the WTRU may apply the received/available PRS configuration for DL-based positioning, SRSp configuration for UL-based positioning, or both PRS and SRSp for UL and DL based positioning. For the DL-based positioning, the WTRU may send to the LMF the measurement reports determined by measuring the downlink PRS. For UL-based and UL and DL based positioning, the WTRU may transmit the SRSp to RAN, which subsequently forwards the measurement reports to the LMF.

With the above methods, the WTRU can start the positioning process during IDLE or INACTIVE mode, allowing the WTRU to reduce power consumption.

Configurations/Reconfigurations
Receiving the Configuration of SRSp or PRS in IDLE or Inactive States The WTRU may determine and receive a configuration associated with positioning measurements and reporting from broadcast signaling from stored configurations that are part of the WTRU context, and/or by requesting it in a RACH procedure. If configuration of positioning measurement resources (e.g., PRS, SRSp, and/or associated parameters and sequence IDs) is known to the WTRU, the WTRU may report associated positioning measurements, the WTRU position, and/or a positioning report part of a RACH procedure or on a Configured Grant (CG) applicable in the serving cell. If the WTRU does not have such configuration(s), the WTRU may initiate a new RACH procedure to obtain the configuration associated with positioning measurements and reporting.

The WTRU may obtain the resource configuration(s) for PRS and/or SRSp in Msg2, Msg4 or MsgB. The WTRU may perform positioning measurements and then report them (e.g., the WTRU position or positioning related measurements in WTRU-assisted mode) in part of Msg3/A, a grant scheduled by the gNB and provided part of MsgB or Msg4, a grant scheduled by the gNB after the completion of the RACH procedure (e.g., Msg 5), and/or an uplink configured grant.

The configuration of positioning measurements may also include a sequence ID for PRS and/or SRSp, which may be unique to the WTRU or any WTRU that used the same PRACH resource. In the absence of such sequence ID, the WTRU may use a previously used sequence ID (e.g., used in connected mode or the last used sequence ID), use a default sequence ID, and/or use a random sequence ID, possibly determined from the WTRU identity or the resource identity (e.g., I-RNTI, C-RNTI, RA-RNTI, MsgB-RNTI, small data RNTI, paging RNTI, or CS-RNTI).

The WTRU may also combine a configuration received by broadcast signaling with a configuration obtained using the paging procedure or the RACH procedure to determine the full configuration of PRS or SRSp (including applicable resources and the sequence ID). For example, broadcast signaling can indicate the positioning resource allocation while the paging indication (e.g., in Physical Downlink Shared Channel (PDSCH) or Physical Downlink Control Channel (PDCCH)) may include remaining WTRU-specific parameters (e.g., sequence ID, scrambling identities, security keys) used for positioning. Broadcast signaling may also provide a minimal subset of configurations needed to obtain the remaining configurations (e.g., in PDSCH after paging or part of a RACH procedure).

In one embodiment, the WTRU may be configured with the scrambling identify with which the WTRU can descramble the PRS sequence. The scrambling ID may be used by the network to randomize the PRS sequence such that if the number of WTRUs the network tries to locate is large, the network may use a scrambling ID to randomize the PRS sequence such that only the WTRU that is configured with the scrambling ID can descramble the PRS. If the WTRU does not have the scrambling ID and attempts to descramble the PRS, the resulting PRS appears as noise.

How Timing Advance is Obtained for SRSp

The WTRU may obtain TA (timing advance) used for SRSp transmission from the RACH procedure. The WTRU may receive the TA in message 2 sent from the network in the 4-step RACH procedure. In another method, if 2-step RACH is conducted, rather than 4-step RACH, the WTRU may assume that the TA that it has is zero. This assumption is reasonable because an RSRP for the measured SSB that is sufficiently high to permit 2-step RACH suggests that the WTRU is close to the TRP, and there is no need to perform timing adjustment. Thus, the WTRU can assume that TA is nearly zero. In addition, the WTRU may receive IDLE/INACTIVE mode specific TA for SRSp transmission in the PDCCH or PDSCH. The WTRU may receive the TA related to SRSp transmission in RRCRelease or RRC or MAC-CE. The WTRU may determine to apply the TA prior to the SRSp transmission for accurate time alignment.

Configuration Message for Positioning

The WTRU may receive a configuration message for positioning (e.g., configuration of SRSp, PRS, and/or resource applicable for positioning reporting) as part of RRC release message, part of the WTRU context transfer, or in an RRC or LTE Positioning Protocol (LPP) configuration message, e.g., upon transitioning into INACTIVE state or within INACTIVE state itself. Such configuration message can be received in connected mode. Such configuration message can be received in Msg4 or MsgB or in any PDSCH transmission in INACTIVE state. The configuration message (RRC or LPP message) can contain at least one or more of: resource allocation for SRSp, resource allocation for PRS, indication of which Small Data Transmission (SDT) resource are applicable for reporting a positioning report (e.g. CG and/or RACH resources), an on-demand or temporary positioning resource or reference signal, and/or resource allocation for resources to report a positioning report.

WTRU Request for a Configuration Message or Resource

A WTRU may request the configuration message for positioning, e.g., when in INACTIVE state. The WTRU may include such request as part of an RRC message (e.g., a standalone RRC resume request, or indicated as part of a resume cause of an RRC resume request). The WTRU may include such request as part of MsgA, part of Msg3, part of a context transfer message, or part of the CG transmission. In one method, the WTRU may include such request for positioning configuration and/or a resource for positioning upon satisfying at least one of the following:

If the WTRU does not have a resource for transmitting a positioning resource. For example, the WTRU may include such request if it does not have a PUSCH grant or if an available CG becomes no longer valid (e.g., due to mobility to a different cell, expiry of the associated TA timer, and/or releasing the CG configuration)

After mobility to a different serving cell or a different RNA (e.g., a cell in a different RAN Notification Area (RNA) or tracking area)

Upon expiry of a timer: For example, the WTRU may request a resource for positioning if the TA timer associated with a CG for reporting the position has expired or is about to expire. In another example, the WTRU may start a timer upon reception of a PUSCH resource (e.g., CG) for transmitting positioning reports. The WTRU may transmit positioning reports while such timer is running and may stop the reporting after timer expiry.

A WTRU may request a resource for transmission of the positioning report, transmission of the SRSp, and/or transmission of a positioning related reference signal. Specifically, since such a need may not be reflected in a Buffer Status Report (BSR), an explicit indication may be used (e.g., an RRC message or an LPP message—e.g. configuration request message—) to request the resource. The WTRU may want to transmit or may trigger transmission of such a positioning measurement report when the WTRU does not have an UL resource to transmit it on, e.g., after a preceding transmission.

In one method, the WTRU may indicate such need for an uplink positioning resource as part of a BSR or as part of a small data BSR MAC CE. The WTRU may be configured with a (Logical Channel (LCH), (Logical Channel Group) LCG, and/or a (Data Radio Bearer) DRB associated with transmission of positioning report bits, which may be considered by the WTRU as small data. The WTRU may report that it has new small data (e.g., the positioning report) ready for transmission to the network as part of a BSR or in a small data BSR MAC CE. The WTRU may trigger a new BSR (or small data BSR) upon generation of the new small data, or a positioning report for transmission. If the WTRU already has a valid UL-SCH resource for the inclusion of the BSR MAC CE, the WTRU may multiplex the BSR MAC CE on it. For example, the WTRU does not need to trigger a BSR for requesting UL resources for transmitting a positioning report if it already has buffered data pending from other non-SDT DRBs. Rather, the WTRU can simply append the request for UL resources for transmitting a positioning report onto the BSR that will be transmitted for the already pending buffered data.

Furthermore, a WTRU may cancel an already pending small data BSR upon or after at least one of the following: (1) inclusion of all small data in the SDT resource, (2) upon/after inclusion of the SDT BSR MAC CE in a PDU, if there is no other small data buffered, (3) upon transmitting a subsequent small data transmission (transmission of another small data transmission AFTER the transmission of the initial small data PDU containing the BSR MAC CE, possibly on a different SDT resource), (4) UE receives a HARQ-ACK value equal to "ACK" for the PDU transmitted which contains the multiplexed BSR MAC CE, and/or (5) after receiving an uplink grant for a subsequent small data transmission. For instance, a WTRU may cancel an SDT BSR upon transitioning into connected mode (e.g., including an RRC resume request or reception of an RRC connection resumption/(re)-establishment message). The WTRU may trigger a Scheduling Request (SR) in connected mode if it still has a pending SDT BSR or a positioning report to send. The WTRU may cancel the SDT BSR MAC CE if it is a padding BSR, if there are no accompanied other data bits in the PDU, and/or if there are data bits from non-SDT DRB(s) or LCH(s). The WTRU may initiate a new RACH procedure when an SDT BSR is triggered and the WTRU does not have any valid UL-SCH resources for the transmission of the SDT BSR. The WTRU may be configured with mapping restrictions (e.g., LCP mapping restrictions or a type of UL-SCH resources on which the BSR can be transmitted), whereby the WTRU only multiplexes the SDT BSR on a resource if it meets the configured mapping restrictions.

The WTRU may indicate the intention of transmitting SRSp in a small data transmission prior to the SRSp. For example, the WTRU can indicate the intention of transmitting SRSp in MsgA, msg1, msg3, or part of a PUSCH transmission. The WTRU may then transmit the SRSp on configured resources. The WTRU may transmit the SRSp as part of the CG resources configured for small data transmission. The WTRU may multiplex SRS and other channels such as PUCCH or PUSCH in the CG resources configured for small data transmission.

Configurations

The WTRU in idle/inactive mode may receive either the PRS/SRSp configurations (for WTRU-based and WTRU-assisted positioning), the request for positioning information (for WTRU assisted positioning), or measurement reports (for WTRU-based positioning), in one or more of the following:

Connection establishment procedure: For example, a WTRU may be provided with at least one SRSp (pre) configuration (e.g., via RRC signaling) and/or at least one PRS configuration (e.g., via RRC or LPP signalling) by the network based on the WTRU capability information either during or after connection establishment or registration procedure. The WTRU may receive the PRS/SRSp configurations while in RRC connected state, for example.

SIB/On-demand SIB: For example, the WTRU may directly receive the PRS/SRSp configurations in the SIB. In another example, a WTRU may be triggered to use a PRS/SRSp configuration based on the cell ID received in the SIB and the mapping between PRS/SRSp configurations and cell ID configured in the WTRU. For PRS, the WTRU may receive in the SIB an indication containing the identifier of a PRS configuration to be applied/activated for making DL measurements while in idle/inactive mode, for example. For SRSp, the WTRU may receive in the SIB an indication containing the identifier of SRSp resources and other parameters (e.g., periodicity) or the type of resources (e.g., RACH, Sounding Reference Signal (SRS)) to be used for transmitting SRSp in UL while in idle/inactive mode, for example. For UL-based positioning, the WTRU may also apply a pre-configured or an indicated selection criterion (e.g., listen-before-talk, random back-off) for mitigating interference when transmitting SRSp, for example. In another example, the WTRU may be triggered to send an on-demand SIB message to the network for requesting PRS/SRSp configuration upon receiving a minimum SIB from the network (e.g., without the positioning configuration related information in the received SIB) and determining the accessibility of positioning SIB with on-demand SIB request, for example.

Paging (Core network and/or RAN paging): For example, the WTRU may receive the PRS/SRSp configuration upon receiving a CN or RAN paging message during the on-duration of a DRX cycle in idle/inactive mode. In this case, the WTRU may set an inactivity timer with a particular configured time duration corresponding to the reception of PRS or SRSp configuration, for example. As an example, the duration for the inactivity timer for extending the on-duration may be set by the WTRU-based on the identifier/index included in the paging message (e.g., different identifiers may be used for PRS or SRSp) or based on the type of paging message (e.g., CN paging or RAN paging). In one example, the WTRU may receive an activation message for transmitting SRSp or the measurement report for WTRU-based positioning in RAN paging messages. In another example, the WTRU may receive the request for location/positioning information from the LMF in a CN paging message. In RAN paging and/or CN paging messages, the WTRU may determine the corresponding action (e.g., activation of SRSp transmission or measuring of DL PRS) either based on the identifier/index associated with the action included in the RAN/CN paging messages or based on implicit signaling sent in the paging messages (e.g., reception of a first paging message followed by a second paging message within a certain time duration).

Initial access messages: For example, the WTRU may receive either in Message 2/4 (in 4-step RACH procedure) or in Message B (in 2-step RACH procedure) one or more of the following:
  PRS/SRSp configurations: For example, the WTRU may receive one or more of the PRS/SRSp configuration parameters and/or the PRS/SRSp identifiers (e.g., when receiving an indication indicating the selection of a preconfigured PRS/SRSp).
  PRS: For example, the WTRU may receive PRS from one or more TRPs associated with a gNB that receives the triggering message (e.g., Msg 1/3 or Msg A) from the WTRU
  Request for location information (e.g., for WTRU-assisted positioning)
  Measurement report (e.g., for WTRU based positioning)

Figure 2:
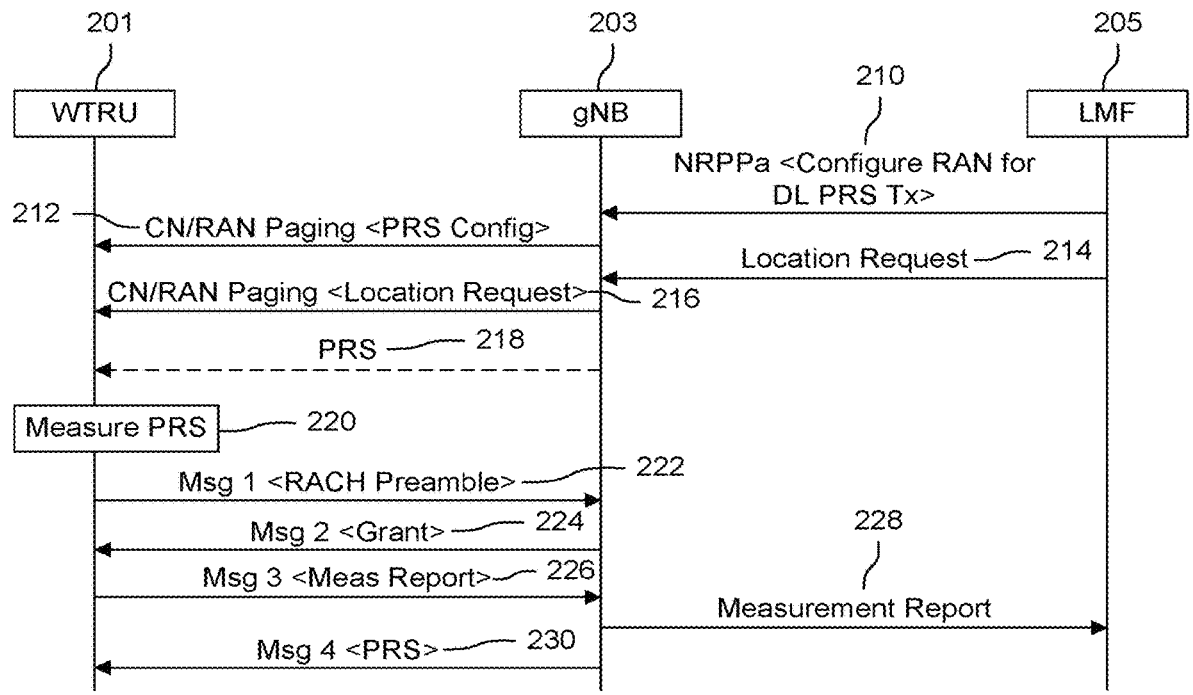
FIG. 2 is a signaling flow chart for 4-step RACH for DL positioning methods for measurement report transmission during inactive mode in accordance with an embodiment.

In the case when the WTRU determines that PRS/SRSp configurations are unavailable (e.g., when triggered by higher layers/network) or the existing PRS/SRSp configurations are not applicable/valid, the WTRU may send an indication to the network requesting PRS/SRSp (re)configuration. In addition to the request for PRS/SRSp, the WTRU may also transmit SRSp and other messages including measurement reports (e.g., for WTRU assisted positioning) in one or more of the following:
  Initial access messages: For example, the WTRU may send the request for PRS/SRSp either in Message 1/3 (in 4-step RACH procedure) or in Message A (in 2-step RACH procedure).
  SRSp resources: For example, the WTRU may send the measurement report in the resources associated with SRSp for UL+DL based positioning
  TA/RNA (Tracking Area/RAN Notification Area) update messages
  On demand SIB The contents of the indication sent by the WTRU requesting for PRS/SRSp configuration may include one or more of the following information:
  WTRU ID: For example, the WTRU may include the WTRU ID assigned by the CN (e.g., Temporary Mobile Subscriber Identity (TMSI)) or RAN (I-RNTI). In another example, the WTRU may include a random ID selected from a pool of IDs configured/accessible to the WTRU. In this case, the WTRU may select an ID from different ID pools associated with different types of PRS/SRSp configurations, for example.
  PRS/SRSp ID
  DRX configuration ID An example of signaling flow is shown in FIG. 2 for 4-step RACH for DL positioning methods for measurement report transmission during inactive mode. The WTRU 201 receives a PRS configuration 212 and Location Request 216 from the gNB 203, which may be generated by the LMF 205 (e.g., see 210 and 214). The WTRU 201 measures (220) a PRS (218) transmitted by the gNB 203 and returns a RACH Preamble in Msg 1 (222). An uplink grant is sent to the WTRU 201 in Msg 2 (224). The measurement report corresponding to the received PRS is sent in Msg 3 (226). In this example, PRS is sent in Msg 4 (230). The measurement reports are sent to the LMF from the gNB (228). If PRS is not configured by the network, RACH Preamble may be replaced by request for PRS configuration which may include the WTRU ID, as described previously.

Figure 3:
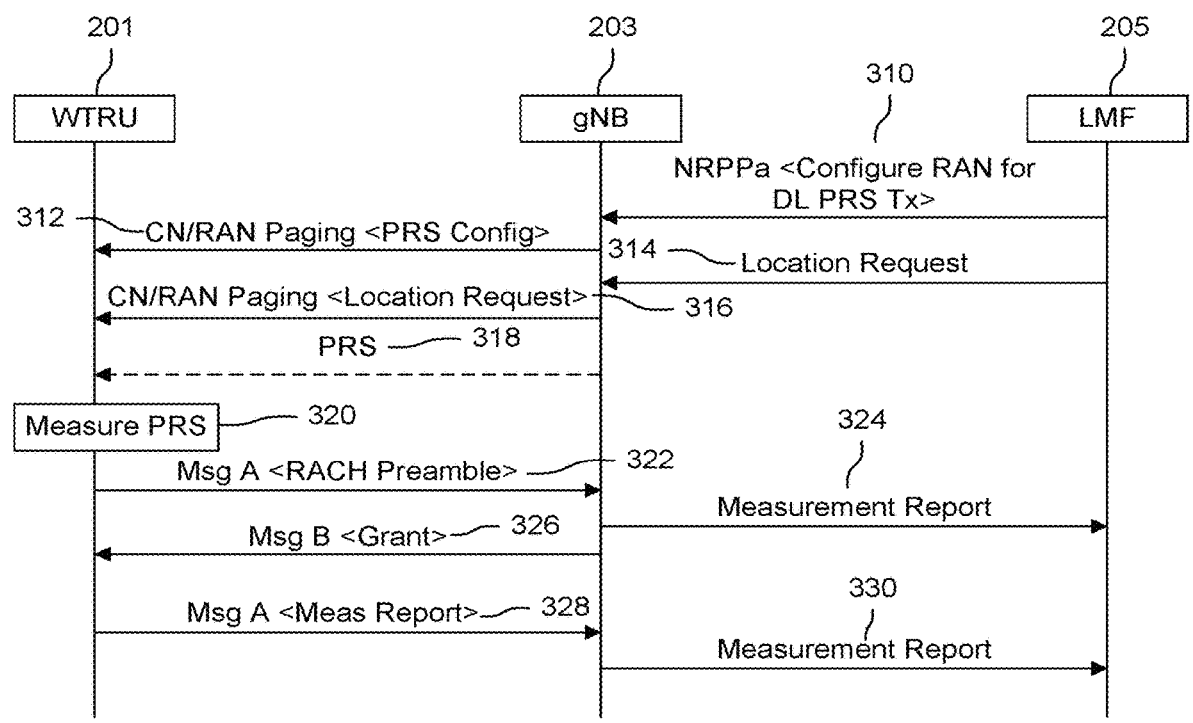
FIG. 3 is a signaling flow chart for 2-step RACH for DL positioning methods for measurement report transmission during inactive mode in accordance with an embodiment.

Another example of signaling flow is shown in FIG. 3 for 2-step RACH for DL positioning methods for measurement report transmission during inactive mode. The WTRU 201 receives PRS configuration 312 and Location Request 316 from the gNB 203, which may be generated by the LMF (see 310 and 314). The WTRU 201 measures (320) a PRS 318 transmitted by the gNB 203 and returns RACH Preamble in Msg A (322), for example. An uplink grant 326 is sent to the WTRU 201 in Msg B 326. A measurement report corresponding to the received PRS is sent back to gNB in Msg A 328. The measurement reports are sent (330) to the LMF 205 from the gNB 203.

Figure 4:
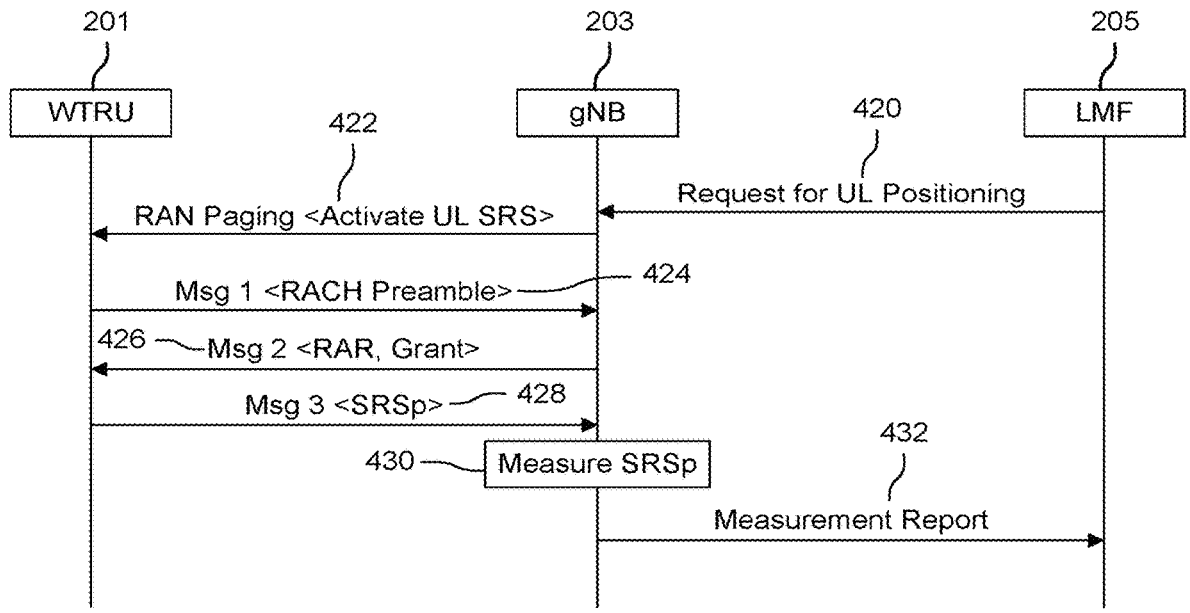
FIG. 4 is a signaling flow chart for 2-step RACH for UL positioning methods for measurement report transmission during inactive mode in accordance with an embodiment.

An example of signaling flow is shown in FIG. 4 for 4-step RACH for UL positioning methods for measurement report transmission during inactive mode. The WTRU 201 receives RAN paging 422 to activate UL SRS, which may be initiated by the LMF 205 (e.g., see 420). The WTRU 201 returns the RACH preamble 424. In return, the gNB 203 returns RAR in Msg 2 426. In Msg 3 428, the WTRU transmits SRS. The gNB 203 can then measure the SRSp (430) and transmit a measurement report 432 to the LMF 205

Figure 5:
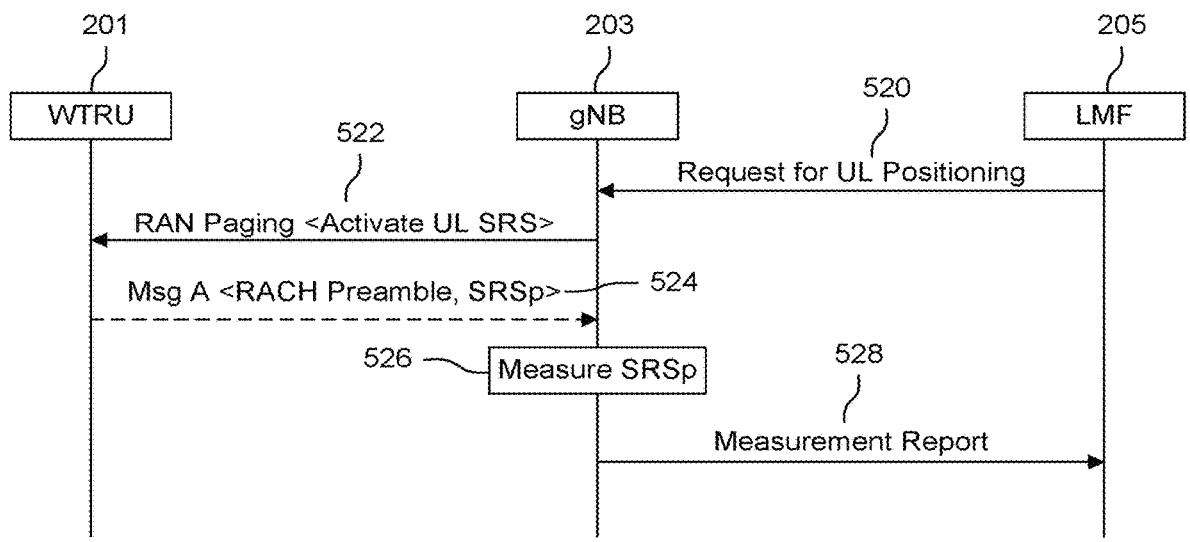
FIG. 5 is a signaling flow chart for 2-step RACH for UL positioning methods for measurement report transmission during inactive mode in accordance with an embodiment.

An example of signaling flow is shown in FIG. 5 for 2-step RACH for UL positioning methods for measurement report transmission during inactive mode. Signals similar to those discussed in FIG. 4 are not discussed. The WTRU 203 receives RAN paging 522 to activate UL SRS. The WTRU transmits SRSp in Msg A 524.

WTRU in Idle/Inactive Mode Sends Indication to Network for PRS/SRSp (Re)Configuration Based on Validity Tag In one embodiment, a WTRU in inactive/idle mode may send an indication to the network requesting (re)configuration of PRS/SRSp based on a configured validity tag. The WTRU may be initially configured with one or more PRS and/or SRSp configurations, which may be maintained by the WTRU when operating in idle/inactive mode, for example. The different PRS/SRSp (pre)configurations may be assigned with an identifier. In addition, the WTRU may also be configured with a positioning validity tag associated with the PRS/SRSp configurations, which may also be maintained for the duration of the WTRU remaining in idle/inactive mode. The positioning validity tag may contain one or more of the following information/conditions:

- Time validity: For example, a time duration may be associated with individual PRS and/or SRSp (pre) configurations in the WTRU. In another example, a common time duration may be associated two or more PRS/SRSp configurations in a group or all of the PRS/SRSp (pre)configurations configured in the WTRU. The WTRU may initialize a timer when transitioning to idle/inactive mode and may use the PRS/SRSp configuration for positioning during idle/inactive mode as long as the associated timer has not expired, for example.
- Area validity: For example, a validity area consisting of at least one cell (e.g., determined by the Cell ID) may be configured in the WTRU and associated with either an individual PRS/SRSp (pre)configuration or a group of PRS/SRSp (pre)configurations. The WTRU may be mobile within the one or more cells in the validity areas and may be allowed to use the PRS/SRSp (pre)configuration as long as the cell identifier related information (e.g., list of cell IDs) matches the information in the validity area, for example.
- Allowed derivations: For example, the WTRU may be allowed to derive/determine the PRS/SRSp configurations based on a combination of two or more pre-configurations when satisfying certain conditions (e.g., the RSRP measurement is above a threshold, detection of multipath with/without LoS)

When triggered by a request for location information from the LMF (for WTRU-assisted positioning) or from higher layers/application in WTRU (for WTRU-based positioning), the WTRU may verify the conditions in the validity tag to determine if the (pre)configured PRS/SRSp is still valid. In this case, the WTRU may use the PRS/SRSp (pre)configurations if the conditions in the validity tag are satisfied. In the case when at least one of the conditions in the validity tag is not satisfied, the WTRU may send a request for reconfiguring the PRS/SRS configurations. The WTRU may receive the PRS/SRSp (re)configurations upon determining the expiry of the validity tag in one or more of the methods indicated in the previous section, for example.

With the above methods, the WTRU may start the positioning process during IDLE or INACTIVE mode, allowing the WTRU to reduce power consumption while achieving high accuracy in positioning.

Context Retrieval

Context retrieval may be possible if the following conditions are satisfied. For an inactive state, the WTRU may persist or store the PRS and/or SRSp configuration as part of the WTRU context. Such configuration may include the positioning resource for PRS and/or SRSp, the sequence ID used to determine the PRS, etc. The WTRU may assume the configuration is applicable for a subset of serving cells, e.g., serving cells for which the context is still known at the gNB, cells in the same RNA, cells that do not require anchor relocation, etc.

WTRU Uses the Stored CG Configuration in WTRU Context while in RRC Inactive/Idle Mode In one embodiment, a WTRU in RRC Inactive/Idle mode uses the CG contained in the WTRU context for sending positioning information and/or measurement reports to the network, e.g., using the configuration associated with the CG received while in RRC Connected mode. The CG configuration received by the WTRU in RRC signaling (e.g., either Type 1 or Type 2) may include one or more of the following: C-RNTI configuration, BWP configuration, periodicity, time domain offset, time domain allocation, and number of HARQ processes. Additionally, the WTRU may receive one or more identifiers and validity conditions associated with the CG configuration for using the CG for positioning when operating in RRC idle/inactive mode. For example, the WTRU in RRC idle/inactive mode may use the CG configuration if the associated validity condition (e.g., validity time duration, TA timer, cell IDs in RNA) is satisfied. In another example, when one or more of the validity conditions is/are not satisfied or expire(s), the WTRU in RRC idle/inactive state may send a request, e.g., in a RRCResumeRequest, for a new CG configuration, and receive a new CG configuration, e.g., in an RRCRelease message. The WTRU may then send the positioning information and/or measurement report to the network using the received new CG configuration while remaining in RRC idle/inactive state. Alternately, the WTRU may transition to RRC Connected state, upon receiving the new CG configuration, e.g., in a RRCResume message, and then send the positioning information and/or measurement report to the network while in CONNECTED state.

The WTRU may receive the CG configuration while operating in RRC Connected mode in dedicated RRC signaling messages. The WTRU also may receive the CG configuration in an RRCRelease message, under the suspendConfig configuration (e.g., in Msg B or Msg4), for example. In this case, the CG configuration in the RRCRelease message may be received when transitioning to RRC Inactive mode from RRC Connected Mode or upon the WTRU sending an RRCResumeRequest while in RRC Inactive state, for example.

In one example, the CG configuration received by the WTRU, e.g., in an RRCRelease message, may contain the same or a different configuration than had been received by the WTRU while in RRC Connected state. In this case, the WTRU may receive the same or a different identifier associated with the CG configuration for use during RRC Inactive state. In another example, the WTRU may receive a differential CG configuration in an RRCRelease message which may possibly contain at least in part some configuration information which is common with the CG configuration received/used during RRC Connected state. For example, the differential CG configuration may include an increase/decrease in the number of time/frequency resources and/or a change in the periodicity relative to a previous CG configuration received during RRC Connected mode. In such case, the WTRU may receive in an RRCRelease message the same identifier associated with the previous CG configuration along with the delta configuration information indicating the differential CG configuration, for example.

The WTRU may store the received CG configuration in the WTRU context and apply the stored configuration for sending one or more of the following while in RRC Inactive/idle mode:

Location Service (LCS) client request to LMF for positioning information (e.g. for Mobile Originated-Location Request (MO-LR) service)

WTRU capability information (e.g., supported positioning methods)

Request for assistance information (e.g., PRS/SRSp configurations), including aperiodic or periodic requests for assistance data Positioning information, including estimated/calculated WTRU location for WTRU-based positioning (e.g., for Mobile Terminated-Location Request (MT-LR) service). The positioning information may be sent to the LMF either aperiodically or periodically, for example.

Measurement report (e.g., for LMF-based positioning), consisting of measurements made on the received PRS, which may be sent either aperiodically or periodically In addition, the WTRU also may store spatial/QCL relationship of the PRS, such as TCI information, QCL-TypeA, QCL-TypeB, QCL-TypeC or QCL-TypeD, spatial relationship, with other RS or channels received/determined while in RRC Connected mode to be used upon transitioning to RRC Inactive/Idle mode based on similar RRC signaling and/or validity conditions applied for using the CG configuration.

WTRU Uses a Positioning Method/Configuration During RRC Inactive/Idle Mode that is Correlated with the Positioning Method/Configuration Applied During RRC Connected Mode In one embodiment, the WTRU may use one or more positioning methods that are applied while in RRC Connected mode for positioning when operating in RRC Inactive/Idle mode. For example, the WTRU configured to support a DL-based or UL-based positioning (i.e., triggered to be performed either as WTRU-based or LMF-based positioning), may use the same positioning method configured during RRC Connected state after transitioning to RRC Inactive/Idle state. In another example, the WTRU may use a positioning method upon transitioning to RRC Inactive/Idle mode, which may be different than the method used during RRC Connected state. In both examples, the one or more configurations associated with the positioning methods (e.g., PRS/SRSp configurations) that are applied by the WTRU in RRC Inactive/Idle mode may be either the same or different than the configurations applied while in RRC Connected mode.

The WTRU may receive from the network while in RRC Connected mode (e.g., just or prior to transitioning to RRC Inactive/Idle mode) an indication of whether to use the same or a different positioning method and/or the associated configuration when it is in Inactive/Idle mode. For example, the WTRU may receive an explicit indication, e.g., in an RRCRelease message, the indication on whether to retain or release the one or more positioning methods and/or the associated configurations that it had been using while in RRC Connected mode. In this case, the RRCRelease message may contain the identifiers of the positioning method/configurations to be retained and/or released when operating in RRC Inactive/Idle state. In another example, the WTRU may receive an implicit indication to retain the positioning method(s) either (a) based on an absence of any indication indicating that it should release the positioning method(s) or (b) when the same positioning method/configuration is continued to be used by the network (e.g., DL-PRS transmission) after the WTRU transitions to RRC Inactive/Idle mode. Alternatively, the WTRU may receive an implicit indication to change the positioning method(s) as a function of changes of the report, such as removal or addition of specific measurements. Examples of measurements include:

angles of arrival,
time difference of arrival,
reference signal time difference,
time of arrival,
RSRP of PRS or reference signals used for positioning,
WTRU Rx-Tx time difference,
Time stamp of measurement,
Quality for each measurement, and/or
Number of paths.

With the above methods, the WTRU can start the positioning process during IDLE or INACTIVE mode, allowing the WTRU to reduce power consumption while achieving high accuracy in positioning.

RACH Procedure for Positioning
Msg A,B Including Variations for IDLE/INACTIVE

The WTRU may perform positioning measurements and report them in part of Msg3/A, a grant scheduled by the gNB and provided part of MsgB or Msg4, a grant scheduled by the gNB after the completion of the RACH procedure (e.g., Msg 5), and/or an uplink configured grant.

The WTRU may remain in IDLE or inactive mode after reporting a positioning related measurement and/or report in a RACH procedure. For a RACH procedure initiated in IDLE or inactive mode for positioning, the WTRU may include a specific RRC message in Msg3 or MsgA to indicate to the gNB the intention that this RACH procedure is performed to report positioning data or to obtain positioning related configuration(s). The WTRU may select a PRACH (Physical Random Access Channel) resource (a preamble group and/or PRACH occasion) to indicate to the network that this RACH (Random Access Channel) procedure is for positioning, to report positioning data, and/or to obtain positioning related configuration(s).

The WTRU may discard a C-RNTI (Cell-RNTI) or a temporary C-RNTI obtained as part of a RACH procedure in IDLE mode for positioning, e.g., upon successfully reporting the WTRU position or the positioning related report and/or going back to DRX sleep. The WTRU may monitor a PDCCH (Physical Downlink Control Channel) addressed to such C-RNTI, possibly for a period of time, e.g., until successfully performing all positioning-related transmissions and/or transmitting a relevant WTRU positioning or positioning report.

PRACH Partitioning

The WTRU may provide SRSp as part of the PRACH procedure, or indicate to the gNB that it will transmit SRSp as part of the RACH procedure, e.g., where such indication can be performed by the WTRU by selecting a subset of PRACH resources (e.g., preambles and/or RACH occasions which can be preconfigured to indicate to the gNB that the WTRU is using such RACH for positioning and/or transmitting SRSp part of the RACH procedure). In one example, the WTRU may transmit the SRSp as part of the PUSCH transmission (e.g., by puncturing the PUSCH transmission, by appending it, or at the end of it) associated with the RACH procedure or a configured grant.

Association Between RACH Resource (i.e., RACH Occasion+Preamble Combination) and PRS or SRSp The WTRU may use message 3 or message A to transmit measurement reports to the network. The WTRU may be configured with the following set of associations to determine the PRS resource that the WTRU receives.

In one embodiment, the WTRU may receive two sets of associations. In the first set of associations, each SSB may be associated with a RACH Occasion (RO). Alternatively, multiple SSBs may be associated with one RO or multiple ROs can be associated with one SSB. In the second set of associations, information regarding spatial relation or QCL relationship between the SSB and other reference signals, such as PRS, or channels may be included. Examples of different types of QCL can be found in 3GPP Technical Specification 38.214.

The WTRU may receive the second set of associations via broadcast from the network. The WTRU may determine the spatial filter to use to receive PRS resources in message 4 or message B according to the first and second sets of associations. Alternatively, the WTRU may receive the PRS configuration during message 2 or message B from the network. The WTRU may, for example, be configured to receive the PRS in any one or more of the following locations:

PRS resource in message 4
PRS resource in message B
PRS resource outside of message 4 or message With the above methods, the WTRU can send the measurement reports to the server during IDLE or INACTIVE mode, allowing the WTRU to reduce power consumption while achieving high accuracy in positioning.

Transition to RRC_CONNECTED

The WTRU may include an indication of preference to transition into connected mode. Such indication can be transmitted by including an RRC (re)-establishment request, an RRC resume request, an RRC message to indicate preference to transition to connected mode, and/or an indication part of the payload, the MAC subheader, or a MAC CE. The indication can be provided as part of MsgA, as part of Msg3, as part of Msg1 (e.g., by preamble selection), on a CG, or on a scheduled grant provided for subsequent transmission.

The WTRU may include such indication of preference to transition into connected mode in response to one or more conditions. In one method, the WTRU may issue the indication if: the WTRU does not have valid security keys to transmit the payload, the payload of the positioning report is larger than a certain threshold, the reporting resource in idle or inactive state does not meet the required latency to provide the positioning report, more accurate positioning measurements are needed, the size of the payload is above a threshold, and/or more granular positioning data/report is required. In one example, the WTRU may issue the indication to transition to connected mode if the RACH—or Configured Grant (CG) periodicity for reporting the positioning report is larger than a threshold. The WTRU may provide the indication to transition to connected mode if the number or size of measurement reports, which are generated by the WTRU after PRS is received by the WTRU, is above a threshold, if the number of measured cells is above a threshold, and/or if the report size is larger than the size of the PUSCH resource associated with the RACH procedure of the CG.

The WTRU also may provide such indication after a configured or predetermined number of failed attempts to transmit the positioning report/data. The WTRU may also provide such indication after the expiry of a configured or predetermined timer. The WTRU may start such timer upon the first transmission attempt of a positioning report, and may stop the timer upon successfully transmitting a positioning report (e.g., receiving a HARQ-ACK or receiving a DL RACH message following the transmission that echoes Msg3 or MsgA).

With the above methods, the WTRU is able to send the measurement reports to the serve in order to achieve high positioning accuracy, while allowing the WTRU to reduce power consumption.

Security Handling for Positioning During IDLE Mode
Security Retrieval During IDLE Mode for Positioning
Reporting Data in IDLE when Security Keys have been Discarded A WTRU may use a subset of positioning methods (e.g., uplink-based positioning, WTRU-assisted positioning, or WTRU-based positioning) in IDLE mode. In one method, the WTRU may restrict the positioning method to uplink-based positioning (based on SRSp transmission) in IDLE mode, e.g., when the security keys are not available. In another method, the WTRU may be provided with a temporary security key as part of the RACH procedure (e.g., including MAC-I, possibly as part of an RRC message) to transmit the WTRU position or a positioning report (associated with WTRU-assisted DL based positioning). Such temporary security key may be assumed valid by the WTRU for a certain period (pre-configured or indicated) or for a limited number of UL grant(s) provided after Msg2, Msg4, or MsgB.

In one method, the WTRU may initiate a new RACH procedure for positioning using an RRC message (e.g., RRC resume or RRC reestablishment) if the security keys are no longer valid. The WTRU may assume security keys to be valid in the same set of serving cell(s) for which the WTRU context is known (e.g., the same serving cell before transitioning into inactive state from connected state, and/or any other cell in the same RNA. The WTRU may use a CG resource only if the security key is maintained and known at the serving cell (e.g., in inactive state for the same serving cell or another cell in the same RNA).

In one embodiment, a WTRU in idle mode determines the security keys to be used for encrypting and sending the positioning related messages to the network. For WTRU-based positioning in idle mode, the WTRU may send a request for PRS configurations to the LMF and receive the PRS configurations in encrypted NAS messages. Likewise, for WTRU-assisted positioning in idle mode, the WTRU may receive the PRS configurations and request positioning information from the LMF, and sends measurement reports in encrypted NAS messages to LMF.

For determining the security keys to be applied when sending/receiving positioning related messages in idle mode, the WTRU may perform one or more of the following actions:

Reuse the CN provided security keys: For example, the WTRU may use the security keys along with the CN-provided WTRU identifier (e.g., TMSI (Temporary Mobile Subscriber Identity), IMSI (International Mobile Subscriber Identity)), which may be received during initial access and applied in RRC connected mode. The security keys may be associated with time/area restrictions which the WTRU may monitor prior to using the keys during idle mode, for example Derive security keys: For example, the WTRU may derive the security keys to be applied for transmitting/receiving NAS messages in idle mode using a configured key derivation algorithm and the CN provided WTRU identifier. The WTRU may also be configured to include positioning related identifiers (e.g., PRS configuration ID) for deriving the security keys.

Select security keys from pre-configurations: For example, the WTRU may select one set of security keys from multiple pre-configurations based on selection criteria (e.g., based on timer and/or cell IDs in Tracking Area) which may be configured by the network in the WTRU prior to transitioning into idle mode.

Retrieve security keys: For example, the WTRU may send an indication to the network containing the CN-provided WTRU identifier (e.g., in Msg A/Msg 1) while moving within the Tracking Area in order to retrieve security keys and/or initiate a security key derivation procedure. The WTRU may send the indication to the network upon determining the expiry or inaccessibility of the stored security keys, for example.

With the above methods, the WTRU is able to send the measurement reports to the server securely during IDLE or INACTIVE mode, allowing the WTRU to reduce power consumption while achieving high accuracy in positioning.

WTRU Behavior During Measurement Reporting

Resource Allocation

Resource Retrieval for Reporting Positioning Data

If available, the WTRU may use PUSCH resources associated with a configured grant in inactive state if the WTRU context is known by the serving gNB, and/or uplink timing is maintained (e.g., TA (Timing Advance) value is either zero or is maintained by a timing alignment timer). The WTRU may assume the CG is useable, even if it moves to a serving cell other than the one from which it received the CG configuration if that cell is part of the same RNA or Tracking Area. Otherwise, the WTRU may initiate a RACH procedure and use PRACH resources to report positioning data.

Sizing, Segmentation, and Optimization of Reporting Contents

During IDLE or INACTIVE mode, bandwidth for the uplink transmission may be limited and the grant size may not be large enough to contain the measurement report that the WTRU generates.

Positioning Measurement Payload Indication

A WTRU may determine a payload size of the measurement. The payload size of positioning measurement reporting may be determined based on one or more of the following:

The number of PRS configurations associated with the reporting

The number of positioning measurements that meet the applicable requirements (e.g., the positioning measurement quality)

The number of TRPs or cells associated with the positioning measurement

The number of positioning measurement methods used.

The number of beams used for the positioning measurement

The number of positioning measurement results which have a LOS path in its measurement The number of LoS paths or additionally detected paths to report, TRP ID, cell ID, global cell ID, or unique ID associated with the WTRU Timing related information such as RSTD associated with pairs of received PRSs or WTRU RX-TX time differences associated with the number PRSs the WTRU receives The number of Rx-Tx time differences to report The number of RSRP values associated with paths or pairs of PRS or WTRU RX-TX time differences In one embodiment, a WTRU may indicate its payload size for the positioning measurement reporting to receive an uplink grant sufficient to carry the positioning measurement reporting. One or more of following may apply:

PRACH resource partitioning may be used. For example, PRACH resources dedicated for the aperiodic positioning measurement reporting may be configured and a subset of the PRACH resources may be associated with one or more payload sizes for the positioning measurement reporting Each subset of the PRACH resources may be associated with a range of payload sizes In one embodiment, a WTRU is only allowed to use a PRACH resource that is associated with a payload size equal to or larger than its payload size to be reported When contention-based RACH is used, a WTRU may determine one of PRACH resource partitions, wherein each PRACH resource partition may be associated with a payload size (or range of payload size). For example, a first partition may support a first range of payload size (e.g., <100 bytes), a second partition may support a second range of payload size (e.g., 100-500 bytes), a third partition may support a third range of payload size (e.g., 500-1000 bytes), and so on. When the payload size determined for the WTRU is in the first range of payload size, the WTRU may start to use (or may be required to use) a PRACH resource in a first partition. If the WTRU fails to receive RAR for the previously transmitted PRACH, the WTRU may use (or may be allowed to use) a next partition (or a partition that can support the determined payload size). Herein, the partition may be interchangeably used with PRACH resource partition When 2-step RACH is used for positioning measurement reporting, RACH MsgA partitioning may be used based on the payload size. For example, RACH MsgA resources dedicated for the aperiodic positioning measurement reporting may be configured and a subset of the RACH MsgA resources may be associated with a payload size (or range of payload sizes)

A RACH MsgA resource associated with a smaller payload size may use, correspond to, or determine a PUSCH resource that may have a smaller number of RBs (Resource Blocks) as compared with that for a RACH MsgA resource associated with a larger payload size The payload size may be explicitly indicated during a RACH procedure. For example, a WTRU may indicate its payload size for positioning measurement reporting in MsgA/Msg3 during the RACH procedure. The WTRU may receive a PUSCH resource allocation after RACH procedure is finished Subsequent Transmission In one embodiment, the WTRU may include an indication for subsequent transmission (e.g., part of MsgA, Msg3, or a CG PUSCH resource), when the positioning report or the WTRU's position does not fit into the PUSCH grant (as a result of the Logical Channel Priority (LCP) procedure). The WTRU may monitor a PDCCH addressed to C-RNTI or I-RNTI for the reception of a PUSCH resource to perform a subsequent transmission.

The WTRU may select a PRACH resource (a preamble group and/or PRACH occasion) as a function of the payload size required to deliver the positioning report. The WTRU may be configured by RRC or provided by broadcast signaling with a mapping between a subset of PRACH resource(s) and a payload size (or a size threshold).

The WTRU may segment a positioning report/data if it does not fit in an applicable reporting PUSCH resource (as a result of LCP). The WTRU may include a WTRU identity or the resource identity along with the report (e.g., I-RNTI, temporary C-RNTI, C-RNTI, and/or MsgB/RA-RNTI) for each report segment, which can help the network schedule a subsequent transmission and/or identity the report segments and attach them together. In IDLE mode, the WTRU may select the same RACH resource (e.g., RACH Occasion (RO)) to transmit a subsequent segment of a positioning report. This would allow the gNB to potentially put the segments together by associating them with the RA-RNTI. In IDLE mode, if the WTRU remains in IDLE mode yet has subsequent segments to transmit, the WTRU may include its identity (or the resource identity used for the first segment part of the payload) in each subsequent segment. The WTRU may include an indication that the PUSCH payload is segmented or that more segments are remaining for transmission (e.g., in a MAC subheader). Such indication may be considered by the network to be an implicit request for subsequent transmission indication.

Segmentation/Apportionment Methods

In one method, the WTRU may determine segmentation and/or apportionment and reporting methods for the content of the report based on configurations. The configurations may include at least one of the following:

- The WTRU is not configured with segmentation. In this case, the WTRU determines at least one of the following reporting methods:
  - The WTRU reports only a portion of the available relevant data (that can fit within the available resources). In one embodiment, the WTRU may not report received power related information or timing related information for additional paths. The WTRU only reports RSTD per pair of the PRSs that the WTRU receives or WTRU Rx-Tx time difference per received PRS the WTRU receives. The WTRU may report RSRP of PRSs that the WTRU receives.
  - The WTRU autonomously decides the content of the report based on the payload size.
- The WTRU is configured with a number of segments and the WTRU determines to partition the measurement report according to predefined segmentation rules. The segmentation schemes may include (1) segmentation schemes in which the measurement data is split into subsets and all of it is transmitted to the network and (2) segmentation schemes in which only some of the segments are transmitted. The segmentation rules can include at least one of the following rules:
  - Overhead only: The WTRU may determine to include information related to the source of transmission of the PRS or generation of the PRS, such as cell ID from which the PRS was transmitted, global cell ID, or the ID used to generate the PRS in one of the segments of the report
  - Timing and power information for the main path only: The WTRU may determine to include the preconfigured amount of information in one of the segments of the measurement report, such as RSTD per pair of the PRSs that the WTRU receives or WTRU Rx-Tx time difference per received PRS. The WTRU may be configured to include power related information.
  - Timing information for the additional paths: The WTRU may determine to include timing related information of additional detected paths that are associated with each RSTD per pair of the PRSs that the WTRU receives or WTRU Rx-Tx time difference per received PRS. The WTRU may be configured to include power related information of the PRSs that the WTRU receives.
  - Timing information only: The WTRU may determine to include timing related information, such as RSTD or WTRU Rx-TX time difference for PRSs that the WTRU receives, and also timing related information of additional detected paths associated with each RSTD or WTRU Rx-Tx timing difference
  - Power information only: The WTRU may determine to include power related information, such as RSRP for PRSs that the WTRU receives, and also power related information, such as RSRP or differential power compared to the reference PRS associated with each RSTD or WTRU Rx-Tx timing difference
  - Segment by TRP/Cell: The WTRU may determine to include timing or power related information related to the origin of the PRS transmission, such as TRP or cell from which the PRS is transmitted. Therefore, the WTRU may segment the report based on TRP ID or Cell ID or Global Cell ID.
  - Segment by positioning frequency layer: The WTRU may determine to include timing or power related information related to the PRS by positioning frequency layers. Therefore, the WTRU may segment the report based on the positioning frequency layer parameter.
  - Segment by PRS resource ID: The WTRU may segment the report based on the PRS resource ID. For example, for the DL and UL positioning method or DL angle of departure-based positioning method, the WTRU measures timing or power related information per PRS. Thus, the WTRU may segment the report based on the PRS resource ID.

Power related information may include RSRP or differential power compared to a reference RSRP, which may be the RSRP of the reference PRS. In this disclosure, PRS, PRS beam, and PRS resources may be used interchangeably. Similarly, in this disclosure, SRSp, SRSp beam, and SRSp resources may be used interchangeably.

In another embodiment, the WTRU may be configured with the number of segments to use for reporting. The WTRU may receive this configuration during Msg A or Msg 2 or Msg 4 during the RACH procedure, or by paging or broadcast.

Reporting Method for Segmented Report

The WTRU may assign the same identification number to each segment of the segmented report and send them to the network accordingly. Alternatively, the WTRU may assign a different identification number to each segment of the segmented report and send them to the network accordingly. The WTRU may send a segmented report periodically or in a predetermined sequence. For example, the segment of the report that contains the overhead information (such as cell ID or TRP ID that indicates the origin of the PRS) may not need to be sent on every occasion. Therefore, the WTRU may be configured with a measurement report period during which the WTRU sends the segment containing overhead information only once. For example, if the WTRU segments the report into four segments, with identification numbers #0, #1, #2 and #3, where #0 contains the overhead information while other segments contain measurement reports, the WTRU may send #0 once during the reporting period, and send #1, #2 and #3 periodically. Each segment may contain a common report ID such that the network can combine the segmented reports together. As explained earlier, the WTRU may include a WTRU identity or the resource identity along with the report (e.g., I-RNTI, temporary C-RNTI, C-RNTI, and/or MsgB/RA-RNTI) for each report segment.

In one method, the WTRU may periodically send the report. For example, if the WTRU segments the report into four segments, with identification numbers #0, #1, #2 and #3, where #0 contains the overhead information while the other segments contain measurement reports, the WTRU may send the segmented report in the following sequence, #0, #1, #2, #3, #1, #2, #3, #1, #2, #3, . . . . The WTRU may be configured with a segmentation report cycling pattern. In addition, segments may be reported repeatedly and the WTRU may be configured with the number of repetitions per segment of the report. For example, if the WTRU is configured with the number of repetitions K=2, the WTRU may send the segmented reports as follows: #0, #1, #1, #2, #2, #3, #3, #1, #1, . . . .

In one method, the WTRU may update the measurements contained in the report. For instance, the WTRU may indicate to the network that the content of the report is updated by updating a flag associated with the measurement report or segment that indicates that the measurements contained in the segment is updated. The WTRU may send the aforementioned flag in MsgA, Msg3, or a CG PUSCH resource.

Procedure when Segmenting LPP Messages

When the payload size of LPP messages (e.g., LPP ProvideLocationInformation) generated by a WTRU is relatively small, the WTRU may continue to perform measurements and send the LPP messages while remaining in INACTIVE state. However, it may be possible that the configured data volume threshold when supporting SDT is restricted, or the allocated resource grant during INACTIVE mode may not be large enough to carry the generated LPP message (e.g., measurement report).

For transmitting larger payload sizes, the WTRU may segment and send the measurement reports/location estimates sequentially using resources configured for SDT with proper identifiers such that the received segments of LPP messages/PDUs can be assembled either at the RAN or the LMF.

The number of segments supported may be determined by the WTRU either on its own or with LMF/gNB assistance based on one or more positioning QoS requirements (e.g., accuracy, latency) and the configured data volume threshold for SDT, for example. Upon segmentation, the WTRU may send the different segments sequentially using SDT such that the overall positioning information may be sent within the accuracy/latency requirement while adhering to the data volume threshold for each segment.

For supporting transmission of segmented LPP messages (e.g., containing measurement reports), the WTRU may receive from the network (e.g., the LMF and/or the RAN) certain segmentation configuration information such as indications (e.g., identifiers, one or more flags to indicate segmentation, end-markers), and/or sequence numbers (e.g., in headers) to use when segmenting the LPP messages/PDUs. Such configuration information may be received by the WTRU in assistance data (LPP ProvideAssistanceData) or in a location request message (LPP RequestLocationInformation). The WTRU may then apply the segmentation configuration for segmenting and transmitting to the network the segmented LPP messages/PDUs over multiple SDT transmission occasions when the generated LPP messages do not fit within the data volume threshold.

Condition Based Reporting

Conditions that Trigger a WTRU to Report, e.g., the WTRU Observing a Difference in Measurements A WTRU may monitor a trigger signal from a gNB, which may be a part of paging occasions, for example. The trigger signal may be, for example, the paging config itself, a paging message addressed to the WTRU's RNTI, a PDCCH, a DL RS, or a DL transmission on a subset of DL resources.

WTRU Autonomous Triggering of Positioning in IDLE/INACTIVE

Periodic Reporting

In one approach, the WTRU may be configured to perform positioning reporting (e.g., positioning measurement for WTRU-assisted positioning technique and/or the positioning information for WTRU-based positioning technique) periodically. For example, the WTRU may use one or multiple CGs to report the positioning measurement and/or positioning information. Alternatively, the WTRU may use the configured RACH resources (MsgA, Msg3, and/or Msg5) to perform positioning reporting.

Event-Triggered Reporting

In another approach, the WTRU may perform positioning reporting based on one or any combination of the following positioning-related events.

The WTRU detects a change in its position.

The WTRU detects a change in the measurements. Specifically, the WTRU may perform measurement reporting if it detects a change in the positioning measurements. The change may be based on any of the following.

The WTRU detect a change in RSTD of the same pair of TRPs between two PRS reception instances The RSRP of the PRS becomes greater than and/or smaller than a threshold and/or the RSRP difference between two PRS reception instances from the same TRP is greater than a threshold.

The WTRU detects an increase or decrease in the number of paths (possibly the paths with RSRP being greater than a threshold) and/or the WTRU detects a change in the time gap between two paths of two different PRS receptions from a TRP The WTRU detects a change in RTT (time gap between SRSp transmission and PRS reception).

Change in the WTRU's speed.

The WTRU may receive the configuration of even-triggered reporting (e.g., RSRP thresholds) along with the reception of the PRS/SRSp configuration (e.g., in the paging message, SIB, and/or RRC message when the WTRU is in the RRC connected state).

WTRU Performs Delta Reporting

In one approach, the WTRU may perform delta reporting for positioning reporting (e.g., reporting only the difference value of the given parameter relative to a previously reported value for that same parameter). Specifically, the WTRU may include the changed information in the reporting. For example, the WTRU may be required to report RSTDs of multiple TRP pairs. However, the WTRU may include the changed RSTDs of the TRP pairs in the reporting. This approach may be motivated to reduce the size of the message.

In an embodiment, the WTRU may perform regular reporting in the periodic reporting and delta reporting in the event-triggered reporting. The delta reporting of an even-triggered reporting may be associated with the last periodic reporting. Specifically, if the WTRU detects a change in the positioning measurement compared to the last periodic reporting, the WTRU may perform event-trigger reporting and/or the WTRU may include only the delta information compared to the last periodic reporting.

In an embodiment, the UE may determine which positioning measurement report to perform based on the time-frequency resource of the configured grant and/or the size of each measurement report. For instance, the UE may determine to perform a normal measurement report if the configured grant is sufficient for such reporting. Alternatively, the UE may perform delta reporting if the configured grant is insufficient for a full report. Alternatively, the UE may perform delta reporting while also indicating the necessity of an additional report (e.g., full report) in the first grant. Such indication may be conveyed by a MAC CE (e.g., BSR) and/or a MAC header. In another embodiment, the UE may segment the positioning measurement report into multiple sequential reports. The UE may also indicate the necessity of a subsequent report in the preceding report (e.g., in in the MAC CE and/or MAC header of the preceding report).

Configured Grant Approach

Configured Grant Allocation for Measurement Reporting

Upon triggering positioning measurement or reporting in IDLE or inactive state, the WTRU may report its positioning measurement, its position, and/or positioning report (or related data) on preconfigured uplink resources (e.g., a configured grant). The WTRU may use such resource if the Timing Advance is known or if a related timing alignment timer is still running.

In another method, the WTRU may use uplink-based positioning regardless of whether uplink timing maintenance is applied or not. An example of timing maintenance is use of Timing Advance. For example, the WTRU may use uplink based positioning if: (1) a Timing Advance timing timer is running, (2) when a Timing Advance timer associated with a PUSCH or PRACH resource is running, if the RSRP associated with an associated PUSCH resource or a PRACH resource is above a threshold, (3) if the RSRP associated with small data transmission is above a threshold, and/or (4) if a Timing Advance value has been obtained since transitioning into idle or inactive state.

For positioning report/data transmitted on CG resources, the WTRU may monitor the PDCCH for HARQ-ACK determination after the transmission; such PDCCH may be scrambled by I-RNTI, C-RNTI, small data-RNTI, or CS-RNTI. The WTRU may monitor for an explicit HARQ ACK/NACK signaling and or assume HARQ-ACK to be ACK—or NACK—upon expiry of a configured or predetermined timer. The WTRU may start such timer upon transmission of the payload on the CG resource. The WTRU may retransmit—or autonomously retransmit—the payload if the timer expires (1) before the WTRU receives—or determines—a HARQ-ACK and/or (2) the WTRU receives a dynamic grant for retransmission. Alternatively, the WTRU may flush the HARQ buffer associated with the payload upon timer expiry. In one realization, such timer can be the legacy configured grant timer.

In one method, the WTRU may be configured with one or more TA timers. Each TA timer may be associated with one or more configured grants. In one example, the WTRU may be configured with one TA timer associated with all configured grants in the idle/inactive mode for the WTRU. In another example, the WTRU may be configured with multiple configured grants wherein each configured grant is associated with one TA timer.

Upon the expiry of the TA timer associated with a configured grant, the WTRU may perform a RACH procedure to continue the positioning measurement reporting procedure. In one embodiment, the WTRU may report the positioning measurement in the RACH resource (e.g., MsgA for 2-step RACH or Msg3 for 4-step RACH). In another embodiment, the WTRU may report the buffer status in the RACH resource upon the expiry of the TA timer. Specifically, the WTRU may determine to include a BSR in MsgA and/or Msg3 to indicate the availability of the positioning measurement data. In another approach, the WTRU may perform a RACH procedure to indicate the invalidity of the configured grant. Specifically, the WTRU may be configured with a dedicated RACH resource (e.g., dedicated RACH preambles or dedicated ROs) to report the invalidity of the configured grant (e.g., due to the expiry of the TA timer). The WTRU may then wait for the command from the network to continue the positioning measurement reporting. The WTRU may then validate the configured grant by restart the TA timer upon the reception of the timing advance command from the network. Such command may be received in MsgA, Msg3, PDCCH, and/or PDSCH.

The WTRU may monitor one or more CORSETs/search spaces associated with one or more configured grants in the idle/inactive mode to receive command from the network after one or multiple uplink transmissions. The WTRU may restart a TA timer associated with the configured grant based on any one or more of the following commands from the network:

The WTRU successfully decodes a PDCCH from the network

The WTRU detects no PDCCH transmission in the configured CORSET/search space (the WTRU may assume that the network successfully receives the PUSCH(s) from the network with the correct TA value)

In one method, the WTRU may be configured with a CG dedicated for positioning measurement reporting. Specifically, the WTRU may be configured with one DRB/SRB (Signaling Radio Bearer), LCH, and/or LCG associated with positioning measurement reporting. During the LCP procedure, the WTRU may be restricted to multiplex the data of the higher priority with the positioning measurement reporting data in the configured grant. Alternatively, the WTRU may be restricted to multiplex the positioning measurement reporting data in the configured grant. The WTRU may perform a RACH procedure to transmit other data and/or it may use other configured grants to transmit the other data.

In one method, the WTRU may be configured with a grant associated with the DRX/DTX cycle configured for the WTRU in the idle/inactive mode. In one approach, the WTRU may then be configured to monitor a CORESET/search space, which may occur before each set of one or more resources of the following:

DL-PRS reception

UL-SRS transmission

PUSCH/PUCCH transmissions.

The WTRU may determine whether to wake up to perform DL-PRS reception, UL-SRS transmission, and/or PUSCH/PUCCH transmissions (e.g., to perform positioning measurement reporting) based on the availability of the PDCCH and/or the content of the PDCCH. For example, the WTRU may be configured by the network to wake up based on the PDCCH decoding status in the configured CORESET/search space associated with the resources for DL-PRS reception, UL-SRS transmission and/or PUSCH/PUCCH transmission. In one configuration, the WTRU may be configured to wake up if there is no PDCCH decoded in the configured CORESET/search space. Otherwise, if the WTRU decodes a PDCCH, the WTRU determines whether the WTRU wakes up or not depending on the content of the bitfield in PDCCH. In another configuration, the WTRU may be configured not to wake up if it does not detect a PDCCH in the configured CORESET/search space.

In another method, the WTRU may be configured to associate one configured grant with a periodic/semi-persistent UL-SRS/DL-PRS measurement resource. The WTRU may then determine whether to perform transmission in the configured grant based on the reception/transmission activity of the associated resource. In one example, if there is no DL-PRS detected in a resource, the WTRU may determine not to perform positioning measurement reporting in the associated configured grant. In another example, the WTRU may not perform measurement reporting in a configured resource if it did not transmit UL-PRS in the associated resource.

Timing for the WTRU to Expect Reception of PRS

In an embodiment, the WTRU may be configured to expect to receive the PRS a (pre)configured time offset after the reception of the timer for the CG. The timer may expire, and the WTRU may need to perform the RACH procedure to reset the timer. In that case, as soon as a new timer or a new value for the timer or the timer is reset for the CG, the WTRU may expect to receive PRS at the (pre)configured time offset.

Aperiodic Measurement Reporting
Aperiodic Positioning Measurement Reporting

A WTRU may be triggered to report positioning measurement or to transmit SRSp when the WTRU is in idle/inactive mode. One or more of the following features may apply:

One or more aperiodic PRS configurations may be configured, determined, or used, and a subset of those aperiodic PRS configurations may be indicated for the positioning measurement reporting
The time/frequency location of the subset of aperiodic PRS configurations for the measurement may be indicated in the triggering message (or indication).
If a WTRU is in Idle/Inactive mode, the triggering message (or indication) may include one or more uplink resources to use for the reporting.
The uplink resources may be one or more uplink resources in the physical cells associated with the reporting. For example, when paging is used to trigger the aperiodic positioning measurement reporting trigger, the physical cells associated with the reporting may be the physical cells in the paging Tracking Areas.
An uplink resource for each physical cell for the physical cells in the paging Tracking Area may be provided, wherein each physical cell may be associated with a unique physical cell identity.
The uplink resource may be one or more SRSp resources for the WTRU to send
The uplink resource may be a set of PRACH resources for the WTRU to use for content-free RACH procedure for the positioning measurement reporting
The uplink resource may be a PUSCH resource which may be scheduled in the DCI triggering aperiodic positioning measurement reporting
When a WTRU is triggered to report positioning measurements, the WTRU may determine the reporting based on the positioning measurement quality. For example, if the positioning measurement quality is below a threshold, the WTRU may drop the positioning measurement reporting; otherwise, the WTRU may report the triggered or requested positioning measurement In an embodiment, a paging event may be used as the trigger for the positioning measurement reporting, wherein a subset of paging occasions (POs) may be used for the aperiodic triggering of positioning measurement reporting. For example, one or more of following may apply:

Receiving a paging indication in the subset of Paging Occasions (Pos) may be considered as the aperiodic triggering event for positioning measurement reporting
A specific RNTI (e.g., P-RNTI or Pos-RNTI associated with aperiodic triggering of positioning measurement reporting) may be used to indicate the aperiodic triggering
A DCI with the Pos-RNTI may schedule the PDSCH, wherein positioning measurement reporting related information may be included. The positioning measurement reporting related information may comprise at least one of.
The WTRU identity for which the positioning measurement reporting is triggered
One or more positioning measurement resources.
One or more SRSp resources for transmission
Uplink resources to use for reporting
A DCI with the Pos-RNTI may include a direct indication of which WTRU is triggered for the reporting. For example, a bitmap may be included and a bit position in the bitmap may be associated with a WTRU identity. When the bit position associated with a WTRU indicates TRUE (e.g., 1), the WTRU may be triggered to report the positioning measurement; otherwise, the WTRU is not triggered to report In various embodiments, aperiodic triggering of positioning measurement reporting may be used interchangeably with: 1) aperiodic triggering; 2) activation/deactivation of semi-persistent positioning measurement reporting; and/or 3) configuration of periodic positioning measurement reporting.

Condition Based Measurement Reporting Method

In one embodiment, the WTRU may transmit a positioning report on an available CG resource if RSRP is above a configured threshold. Such threshold may be the same threshold configured for small data transmission. If RSRP is less than the threshold, the WTRU may transmit the positioning report on a RACH resource or an SDT RACH resource and the WTRU may request a resource for subsequent transmission if the report does not fit within the PUSCH resource associated with the RA (i.e. the MSGA payload or the Msg3).

The WTRU may select a positioning method based on (a) the selected resource for transmitting the positioning report, (b) a channel measurement (e.g., RSRP or SINR), and/or (c) the selected SSB associated with the CG on which the positioning report is transmitted. In one example, the WTRU may select a certain positioning method and/or resource (e.g., PRS or SRSp) based on the channel condition. A positioning method may comprise at least: DL based positioning, UL based positioning, PRS based positioning, SRSp based positioning, time difference of arrival based positioning, and/or multi-RTT based positioning, among others. In one example, the WTRU may select a DL based positioning method if channel conditions (e.g., RSRP or SINR) are worse—or better—than a configured threshold (e.g., in cell edge conditions). The WTRU may select an UL based positioning method if channel conditions are better than a configured threshold. The WTRU may select an RTT based positioning method (e.g. multi-RTT) when channel conditions are better than a configured threshold (e.g. RSRP(s)>threshold, or RSRP differential is within a configure range). The WTRU may measure RSRP from more than just the serving cell to determine the selected positioning method.

The WTRU may select a positioning reporting method (e.g. the selected resource for reporting the positioning report) based on a channel measurement (e.g., RSRP or SINR), uplink time alignment, and/or based on the selected SSB associated with the CG on which the positioning report is transmitted. In one example, the WTRU may transmit a positioning report on a CG valid for small data transmission (e.g., valid in the sense that its TA timer is running, and in the same serving cell in which its configuration was received) if measured channel conditions (e.g., RSRP or SINR) are above a configured threshold or within a configured range, and/or if the WTRU is uplink timing aligned. Otherwise, the WTRU may select a PRACH resource to transmit the positioning report.

Measurement Reporting Over Control Plane (CP)
WTRU Sends the Positioning Information to the Network in an SDT Via Control/Use Plane In one embodiment, the WTRU may be assigned with a priority value associated with an SRB when sending measurement reports and/or location information to the network in small data transmission (SDT) while in RRC Inactive/idle mode. For sending the measurement report and/or location information in an SDT to the RAN/LMF via the control plane (via AMF) in one or more NAS messages/PDUs, the WTRU may use the priority value assigned to either SRB1, SRB2 or any SRB, for the following:

Requesting the UL grants using the LCG/BSR procedure
Multiplexing the NAS PDU in the received UL grant using the LCP procedure For sending the NAS PDUs in an SRB (e.g. SRB2) using SDT, the WTRU may send a request to the network to activate the security associated with the SRB. The request for security activation may be sent in a separate RRCResumeRequest message prior to sending the SDT containing the NAS PDUs. Alternatively, the request for security activation may be sent together with the SDT when sending the NAS PDU.

For activating the security for an SRB (e.g., SRB2), the WTRU may use the security related information (e.g., security keys and next hop chaining counter) which may be previously received in an RRCRelease message and stored as part of the WTRU context when transitioning to RRC Inactive/Idle mode. For example, the WTRU may include a resume cause value for indicating control plane forwarding and/or security activation when sending the NAS messages in the SDT. The security activation may also enable the RAN to activate the security and integrity protection for the SRB to carry the NAS PDUs in the SDT in the control plane from WTRU to LMF via AMF. In the case when sending a separate RRCResumeRequest, the WTRU may use the SRB (e.g., SRB2) for carrying the NAS PDUs upon receiving an indication message (e.g., in a RRCResume message) acknowledging control plane forwarding and/or security activation for the SRB. The indication message received by the WTRU may also contain an indication for using SDT for the SRB (e.g., SRB2) while remaining in RRC Inactive/Idle mode without transitioning to RRC Connected mode.

In one example, the one or more SRBs carrying the NAS PDUs may be assigned with priority values which are higher by default than those assigned to DRBs for sending data in SDT. In another example, different SRBs may be associated with different priorities which may be carrying NAS messages whose priorities may depend on the positioning service. For example, a WTRU supporting a positioning service with moderate latency requirements may be configured with one or more SRBs with relatively low priority when using SDT. In this case, it may be possible for the SRB(s) carrying NAS messages to be assigned with lower priority compared to other high priority DRBs using SDT.

In another embodiment, the WTRU may send the location information and/or measurement reports to the RAN/LMF via the user plane (via UPF) in one or more DRBs configured to be used with SDT. In this case, for example, the different DRBs may be assigned with different priority values and the WTRU may use the DRBs for sending positioning information in SDT based on the priority assigned to the poisoning service.

WTRU Sends Positioning Information Using SDT Based on Configured Data Volume Threshold In one embodiment, the WTRU (operating in INACTIVE state) may send one or more types of positioning information (e.g., measurement reports and/or location information) using SDT configured for one or more SRBs based on a data volume threshold configured and/or associated with the SRBs. In this case, the different SRBs (e.g., SRB1, SRB2, SRB3) may be configured in the WTRU, possibly for carrying the positioning information in NAS messages using SDT. The different SRBs configured for SDT in the WTRU may be configured with one or more data volume threshold values, possibly associated with the different types of positioning information (e.g., location estimate, measurement reports associated with PRS(s), Rx-Tx time difference measurement for multi-RTT methods). The data volume threshold may be used for resuming the SRBs (e.g., SRB2) configured for SDT when triggered by the arrival of a NAS message from a higher layer, possibly containing positioning information. In an example, the WTRU may resume SRB2 for transmitting RRC message and/or NAS message in SDT when the size of the RRC/NAS message is less than or equal to the data volume threshold configured for the SRB2. The data volume threshold may be configured by the LMF or gNB, for example. A similar approach used for sending positioning information using SDT when the WTRU is in INACTIVE state may also be applied when the WTRU is in IDLE state, for example.

In another example, the WTRU may be configured with one or more SRBs, which may be used for carrying positioning information in SDT based on the size of the positioning information determined by the WTRU. In this case the WTRU may be configured with a data volume threshold corresponding to the SRB(s), based on an indication sent by the WTRU to the network (e.g., gNB) indicating the size of the positioning information to be carried using SDT. For example, upon receiving a location request from the network (e.g., LMF), the WTRU may indicate to the serving gNB the size of the positioning information to be sent in UL when operating in INACTIVE state. The WTRU may send the indication of the size of the positioning information to the gNB either in an RRC message, MAC CE, or UCI, for example. The WTRU may send the indication to the gNB either before, during, or after transitioning to INACTIVE state, for example. Upon being configured with the corresponding data volume threshold, the WTRU may then send the positioning information in RRC/NAS message(s) in the associated SRB (e.g., SRB2) using SDT.

In another example, each SRB configured for SDT (e.g., SRB1, SRB2) in the WTRU may be associated with different data volume thresholds at different times, where at any given time at least one data volume threshold may be activated for the SRBs. The different data volume thresholds may be associated with a flag or an indicator, which may be used during triggering of SDT procedure. For example, a default data volume threshold may be activated and applicable when initially the SRB is configured for SDT. In an example, the WTRU may be configured with a default/first data volume threshold which may be aligned with or higher than the size of NAS messages carrying positioning information (e.g., measurement report). In another example, the data volume threshold may be dynamically changed/updated based on triggering of the SDT procedure, for example. In this case, upon the arrival of an NAS message of a certain size, the WTRU may initially determine if the NAS message is less than the default/first data volume threshold for determining whether the NAS message can be sent with SDT. In the case when the NAS message is determined to be higher than a first data volume threshold (e.g., the aforementioned default value) and less than or equal to a second configured data volume threshold greater than the first data volume threshold, the WTRU may trigger the SDT procedure by sending a resume request (e.g., in MSGA, MSG3, or CG) to the network containing an indicator/flag associated with the second data volume threshold. The WTRU may send the NAS message upon receiving a resume message (e.g., in RRC) indicating the activation of the second data volume threshold. In this case, the WTRU may continue sending the one or more NAS messages (e.g., carrying positioning information) so long as the second data volume threshold remains activated and/or not deactivated by the network, for example. The aforementioned data volume threshold may be configured by the LMF or gNB, for example.

In another example, the WTRU may determine the attributes of positioning information to be sent using SDT, including the type and size of the positioning information, based on the data volume threshold(s) that may be configured and/or activated for the associated SRB (e.g., SRB1, SRB2). For example, the WTRU may determine whether the positioning information (i.e., carried in a NAS message) is to be segmented into multiple segments based on the data volume threshold configured in the WTRU and/or associated with the SRB for carrying the positioning information. In this case, the WTRU may segment the positioning information into different segments which may be smaller than or equal to the configured data volume threshold, for example. In another example, the WTRU may segment the positioning information into several segments, where the number of segments may be determined based on a latency requirement associated with positioning configured in the WTRU. For example, the WTRU may use the data volume threshold and/or the configured positioning latency requirement, possibly related to a requirement where the positioning information is to be sent within a latency bound, for determining the number of segments to be made when segmenting the positioning information. The WTRU may then send the different segments containing the positioning information using SDT.

In another example, the WTRU may determine the type and amount of positioning measurements to be made and/or sent as a measurement report to the network based on the configured data volume threshold(s) associated with the SRBs (e.g., SRB1, SRB2) when using SDT. For example, the WTRU may be configured with one or more PRS configurations for making measurements on the DL-PRS and sending the measurement reports to the network. The different types of measurement reports that may be sent by the WTRU may be associated with different positioning accuracies, for example. In an example, the WTRU may determine whether to send rich measurement reports (e.g., measurements with higher granularity, possibly containing information/labels on multipath and/or interference) or normal/simplified measurement reports (e.g., measurements with a minimum configured granularity) based on the configured data volume threshold. In this case, the WTRU may send rich measurement reports, containing timing of arrival or angle of arrival measurements for additional paths at higher resolution, for example, when the data volume threshold configured for SDT in SRB2 is higher than or equal to the size of the NAS message carrying the rich measurement reports.

WTRU Indicates RAN Configuration to LMF for Supporting Positioning Procedures Based on WTRU RRC State In one embodiment, the WTRU may send information indicating its RAN configuration, including its RRC state and/or configuration to be applied in the RRC state, to the LMF for receiving the positioning assistance information and/or measurement reporting configuration associated with the RAN configuration. For example, the WTRU may send an indication to the LMF when transitioning from CONNECTED state to INACTIVE state such that the WTRU may receive the assistance information (e.g., PRS configuration) and/or measurement reporting configuration that may be applied when the WTRU operates in INACTIVE state. The WTRU may send the aforementioned indication to the LMF via LPP.

In an example, the WTRU may receive one or more positioning configurations (e.g., assistance information, positioning reporting configuration) containing an update to the QoS requirements associated with positioning, including positioning accuracy and/or latency, based on the information sent by the WTRU to the network about its RRC state. In this case, the configuration received by the WTRU may enable the WTRU to flexibly balance the trade-offs in terms of achieving high positioning accuracy, high device efficiency (i.e. low power consumption) and/or low latency positioning, for example.

In an example, the WTRU may receive assistance information, containing one or more PRS configurations, to be used for making measurements when operating in INACTIVE/IDLE state based on the indication sent by the WTRU to the network about its current and/or future RRC state. The WTRU may receive the assistance information/PRS configuration to be used when the WTRU is operating in a particular RRC state, for example. For example, the WTRU may use a first PRS configuration when operating in CONNECTED state and a second PRS configuration when operating in INACTIVE state. In this example, the use of the first PRS configuration may result in longer measurement duration, with possibly higher accuracy at the WTRU. Alternatively, the use of the second PRS configuration may result in lower power operation and shorter measurement duration at the WTRU, possibly with reduced accuracy.

In another example, where the WTRU may be configured with SDT for sending data (e.g., positioning information) when in INACTIVE state, the WTRU may receive a measurement reporting configuration from the network (e.g., LMF) indicating the one or more parameters to be used when sending the measurement reports when in INACTIVE state. The parameters associated with measurement report configuration received by the WTRU may include the type of measurements to be reported (e.g., rich/simplified reporting), the amount of measurements to be reported (e.g., the size of each measurement report), and/or the periodicity of reporting, for example. Whether reporting is simplified or rich may be determined by the number of additional paths for which the WTRU reports measurements. For example, in a simplified report, the WTRU may report the PRS measurements related to the main path. In a rich report, the WTRU may report the PRS measurements related to the main path and N additional paths, where N may be configured by the LMF. The parameters for measurement report configuration may be received from LMF based on the information sent by the WTRU on the data volume threshold configured for SDT, in one or more SRBs/DRBs, for example. For example, the WTRU may be configured to send simplified measurement reports, possibly with reduced granularity, in INACTIVE state based on the awareness at the LMF of the (lower) data volume threshold configured for SDT.

In another example, the WTRU may send the configuration information for INACTIVE mode operation, including the information on the SRB/DRBs (e.g., SRB2) configured for SDT and/or the associated data volume threshold configured for SDT, to the LMF. The WTRU may send the aforementioned information to the LMF via LPP. The configuration information for INACTIVE mode operation may be sent by the WTRU to the LMF, upon receiving one or more of the following signaling/messages:

Higher layer location request (e.g., MO-LR, MT-LR)
    (LPP) Capability transfer request
    (LPP) Assistance data transfer
    (LPP) Location request transfer request
    (LPP) Positioning information transfer The configuration information for INACTIVE operation also may be sent by the WTRU to the LMF when receiving a first INACTIVE mode configuration from a gNB and/or when an update to the INACTIVE mode configuration is triggered and is received by WTRU, for example. In an example, where the WTRU may have transitioned to INACTIVE state, the WTRU may send the indication to the LMF on the first/updated INACTIVE mode operation configuration in a NAS message. For example, the WTRU may send the indication in an NAS message in either MSG A, MSG 3 or CG in the resume message when triggered by an update to the INACTIVE mode configuration (e.g., change in the data volume threshold), for example.

An LMF is a non-limiting example of a node or entity (e.g., network node or entity) that may be used for or to support positioning. Any other node or entity may be substituted for an LMF and remain consistent with this disclosure.

Beam Management for CG
Beam Management During Configuration for CG.

In various embodiments, "PRS" and "PRS resource" may be used interchangeably. Also, "PRS", "DL PRS" and "Downlink PRS" may be used interchangeably.

Conditions to Use CG Based Measurement Reporting for Positioning
Condition to Proceed to Use Configured Grant for Measurement Reporting The WTRU may be (pre)configured with PRS configurations by LPP during the RRC connected state. In an embodiment, at least one of the following conditions should be satisfied for the WTRU to perform measurement reporting for positioning using the configured grant (CG).

The WTRU is configured with a valid timer for the configured grant.

The WTRU receives at least one SSB that satisfies the (pre)configured criterion, e.g., RSRP of the received SSB is above the (pre)configured threshold.

The WTRU has PRS configurations in LPP Assistance Data.

If the WTRU receives at least one SSB which satisfies the (pre)configured criterion, the WTRU also receives at least one PRS resource which satisfied the (pre)configured criterion (e.g., RSRP of the received PRS is above the (pre)configured threshold)

The WTRU performs WTRU assisted positioning or WTRU based positioning

The above conditions can be combined so that the WTRU can be configured with configured grants based on multiple conditions.

The WTRU may receive PRS configurations after the WTRU receives configuration for the CG. In that case, the WTRU may send a request for PRS configurations by sending the LPP Request Assistance Data to the LMF in the CG so that the WTRU can receive PRS configurations. The WTRU may send the request to the network in RRCResumeRequest, message 3 or message A.

Definition of 2 Sets of Association, SSB↔CG, SSB↔PRS/SRSp

Definition of 2 Sets of Association Rules

The WTRU may use a configured grant resource to transmit measurement reports to the network. If the WTRU is not configured with the configured grant resource, the WTRU may perform the following procedure to obtain configuration for the configured grant.

In one embodiment, the WTRU may receive two sets of association.

In the first set of associations, each SSB (SS block) may be associated with a configured grant (CG) resource. Alternatively, multiple SSBs may be associated with one configured grant resource or multiple configured grant resources can be associated with one SSB.
    In the second set of associations, information regarding spatial relation or QCL relationship between the SSB and other reference signals, such as PRS, or channels may be included. Examples of different types of QCL can be found in 3GPP Technical Specification. 38.214.

How Association is Stored at the WTRU

The WTRU may receive the aforementioned sets of associations via a higher layer during RRC connected state or after transition to RRC IDLE or INACTIVE mode. The WTRU may receive the aforementioned sets of associations by RRCRelease message, RRC, or LPP message.

SSB Reception: Procedure for Measurement Reporting

For example, the WTRU may perform the following procedure to return measurement reports to the network.

1. The WTRU selects an SSB among multiple SSBs transmitted from the gNB according to the (pre)configured criterion. The criterion may be whether RSRP of the SSB received by the WTRU is above the preconfigured threshold;
2. The WTRU receives the PRS that is associated with the selected SSB, where the association is indicated in the second set of associations;
3. The WTRU performs measurements using the received PRS;

4. The WTRU transmits the measurement reports to the network in the configured resource the selected SSB is associated with.

Multiple SSBs to One CG or Multiple CGs to One SSB

Multiple SSBs may be associated with one configured grant such that the WTRU can flexibly determine an SSB beam during mobility, for example. One SSB may be mapped to multiple CG resources so that the WTRU may determine to use multiple CG resources to send measurement reports on multiple measurement reporting occasions where there is a one-to-one correspondence between measurement reporting occasion and CG resource. In addition when one SSB is mapped to multiple CG resources, i.e., a group of CG resources, CG resources between groups do not overlap so that collision can be avoided.

For example, in the second set of associations, the WTRU receives association between SSB and other RS or channels and association may be related spatially. For example, the WTRU may receive a configuration that indicates a spatial quasi co-location relationship related to QCL-TypeD, between an SSB and a PRS resource. There could be a PRS that can be transmitted in the same direction as the SSB from the same location. In other words, the WTRU may assume that the same Tx (transmission) spatial filter is used to transmit SSB and PRS.

In the first set of associations, an identification number of an SSB and resource identification number of configured grant resource may be associated, for example.

As the WTRU may receive SSB from both the serving cell and a neighboring cell, the WTRU may use the first set of associations that associates a configured grant resource(s) and SSB from the serving cell.

As the gNB does not know which SSB the WTRU may choose, the WTRU may receive multiple variants of the first set of associations where different SSBs are within each variant.

SSB Reception+PRS Beam Sweeping: Procedure for Measurement Reporting

Figure 12:
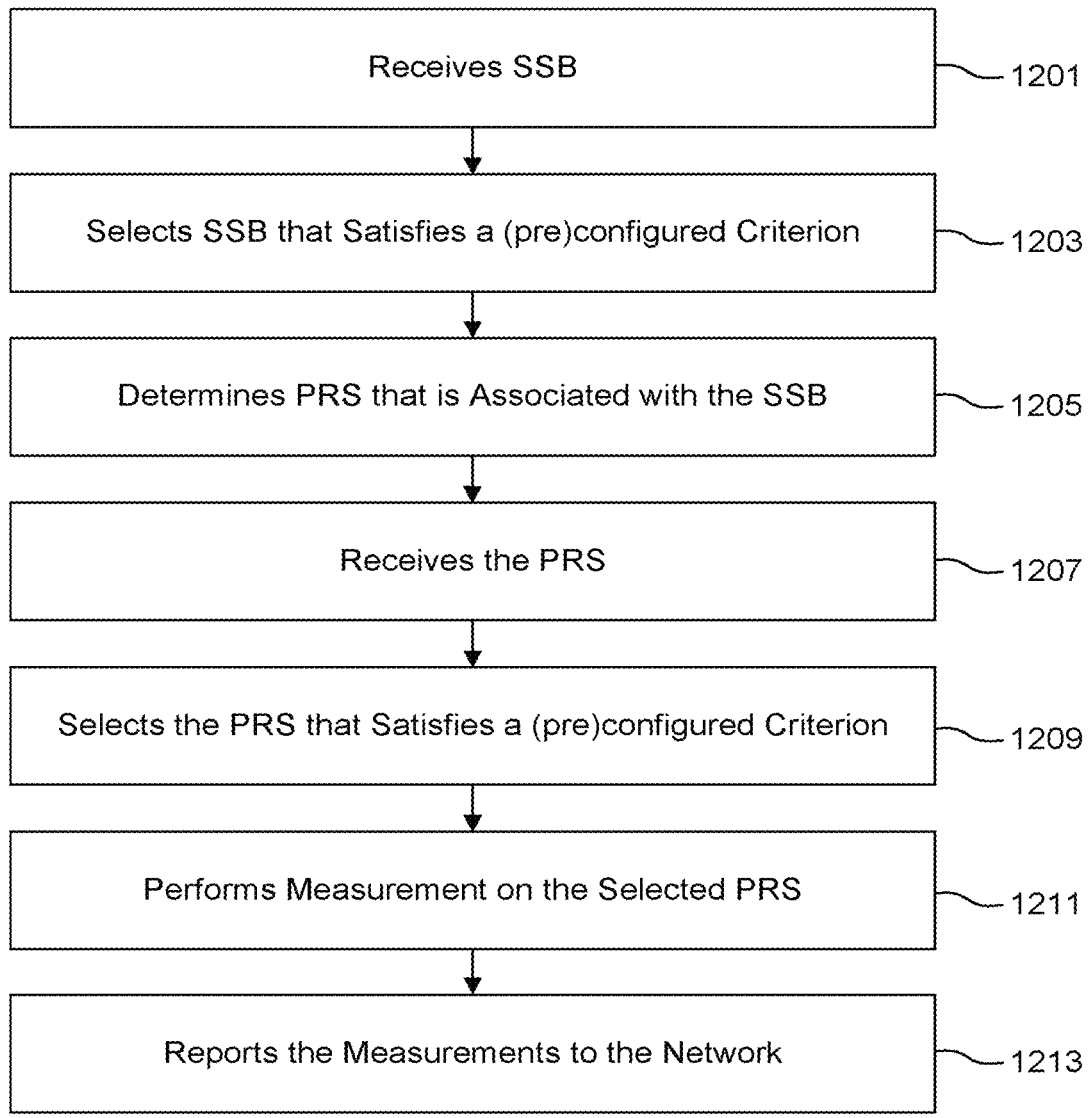
FIG. 12 is a flowchart illustrating a procedure for measurement reporting in accordance with an embodiment.

In an embodiment, in the second set of associations, there may be multiple PRS resources associated with the selected SSB. With reference to the flowchart of FIG. 12, the WTRU may perform the following procedure to return measurement reports to the network.
1. After receiving a SSB (1201), the WTRU selects an SSB from among multiple SSBs transmitted from the gNB according to a criterion (1203). The criterion may be whether RSRP of the SSB received by the WTRU is above a preconfigured threshold.
2. The WTRU determines the PRS to receive according to association with the SSB (1205).
3. The WTRU receives the PRS that is associated with the SSB, where the association is indicated in the second set of associations (1207). The WTRU may receive PRS resources in different symbols or slots that have unique association with the PRS resources. The WTRU may receive information about association between PRS resources and symbols/slots in RRCRelease, RRC, LPP message, or higher layer signaling.
4. The WTRU selects the PRS that satisfies the (pre) configured criterion, which the WTRU may receive in RRCRelease, RRC, LPP message, or higher layer signaling (1209).
5. The WTRU performs measurements using the PRS the WTRU received (1211).
6. The WTRU transmits the measurement reports to the network at the configured resource the selected SSB is associated with (1213).

The WTRU transmits the measurement reports to the network at the configured resource the selected SSB is associated with.

Definition of Two Sets of Association Rules for SRSp

In another example, in the first set of associations, each SSB may be associated with a configured grant resource. The second association information contains spatial relation or QCL regarding the SSB with SRS for positioning. In this disclosure, "SRSp" and "SRSp resource" may be used interchangeably.

The WTRU may implement the following procedure to transmit SRSp.
1. The WTRU selects an SSB according to a criterion from among multiple SSBs transmitted from the gNB;
2. The WTRU finds the SRSp that is associated spatially with the SSB the WTRU selected, and transmits the SRSp in the configured grant resource the selected SSB is associated with.

In another embodiment, the first set of associations concerns association between PRS and configured grant resource. The second association concerns association between SSB and multiple PRSs regarding spatial or QCL information. In this case, once the WTRU chooses the SSB, the WTRU chooses one of the PRSs associated with that SSB. The WTRU expects to send measurement reports in the configured grant resource that is associated with the chosen PRS.

Assumption of Beam Correspondence for SRSp

The WTRU may determine to transmit the SRSp using the spatial filter it has used to receive the SSB that the WTRU selected. In such case, the WTRU does not need to receive the second set of associations which contains association between SRSp and SSB in terms of spatial relation or QCL relationship. Configuration to allow the WTRU to determine the TX spatial filter may be explicit or implicit. The WTRU may receive explicit indication in higher layer signals such as RRCRelease, LPP message, or RRC. The WTRU may receive an implicit indication to determine to transmit SRSp using the spatial filter it used to receive the SSB, if it does not receive the second set of associations.

Only Given Association Between SSB and CG: WTRU Reports Back the Selected SSB

In another embodiment, the WTRU may be configured with the first set of associations only. In that case, the WTRU may transmit information about the SSB that the WTRU selected at the configured grant resource that is associated with the SSB selected by the WTRU. The WTRU may send information about the selected SSB, such as resource ID in RRCResumeRequest, message 3, or message A during the RACH procedure. After the transmission, the WTRU may receive from the network the second set of associations. The second set of associations contains spatial information or QCL relationship between the selected SSB and PRS.

Only Given Association Between SSB and CG: The WTRU Asks for PRS Assistance Data In another embodiment, the WTRU may receive configuration for the CG based on the first set of associations. If the WTRU is not configured with PRS, the WTRU may send LPP assistance data in the CG to ask the LMF for the PRS configuration.

The WTRU May have PRS Configuration Already, Passed Down from RRC_CONNECTED:

The WTRU May Trace Backward to Obtain the CG Configuration.

The WTRU may receive PRS configurations during RRC Connected state. The WTRU may keep the configuration even after transition to RRC IDLE or INACTIVE mode. Thus, after transition to RRC IDLE or INACTIVE mode, the WTRU may receive the same PRS as the one the WTRU received during RRC Connected state. The WTRU may determine the CG resource by the configured first and second sets of associations. For example, the WTRU may determine the CG resource by the following steps.
1. The WTRU determines the SSB that is associated spatially with the PRS the WTRU was configured during RRC Connected state.
2. The WTRU determines the CG resource that is associated with the SSB selected in the first step.

The WTRU may determine the CG resource and send the measurement reports associated with the PRS that the WTRU is configured with.

How Association is Obtained

The WTRU may receive the above first and second sets of associations in higher layer information, such as RRCRelease, LPP message related signaling, or WTRU context.

Special Cases of Association

The association may be defined to be used during IDLE/INACTIVE mode positioning. For example, the association may be limited to SSB, PRS resources, or SRSp resources that are used during the RRC Connected state.

Other Cases

Source of SSBs

In this disclosure, the SSB used in an association may be from the serving cell or a neighboring cell. In either case, the cell ID indicating which cell the SSB is transmitted from is also included in the association information which the WTRU uses to determine the transmission source of the SSB and CG resource, PRS, or SRSp which is associated with the SSB.

The WTRU May not Need to Measure SSBs if they are Already Provided in Assistance Data The WTRU may receive the assistance data from the LMF containing configurations of PRS and/or SSBs transmitted in the serving or neighboring cells during IDLE/INACTIVE mode or RRC Connected state. The WTRU may receive the assistance data by broadcast. In another embodiment, the WTRU may receive RRC configuration about SSBs transmitted from the TRPs. In such a case, if the WTRU receives the first set of associations, the WTRU may determine configurations of the CG without measuring SSBs. The WTRU may send a request for the assistance data to the network in RRCResumeRequest, message 3, or message A.

MO-LR

WTRU Sends the LCS Request for MO-LR Positioning Service while in RRC Inactive/Idle Mode In one embodiment related to MO-LR where the request for positioning information originates from the LCS client located in the WTRU, the WTRU sends the positioning information request to the network (i.e., RAN and/or LMF) while remaining in RRC idle/inactive mode. Specifically, the request for positioning information (i.e., LCS request) may be sent to the network, either in a control plane NAS message (e.g., sent via AMF to LMF) or a user plane message (e.g., sent via UPF to LMF). In addition to the LCS request, the WTRU in RRC inactive/idle mode may also send one or more of the following to the network:
WTRU capability information for positioning
For example, the WTRU may send the capability to support one or more positioning methods and/or configurations, including RAT-dependent (e.g., DL-based on PRS measurement (DL-TDoA or DL-AoD) or UL-based on SRSp transmission (UL-TDoA or UL-AoA)) and RAT independent methods (e.g., GNSS).
Request for assistance information
For example, the WTRU may request one or more PRS and/or SRSp configurations for supporting one or more positioning methods. The WTRU also may indicate the PRS/SRSp configurations that may be or are currently supported/available at the WTRU.

In one example, the WTRU may piggyback the WTRU capability information for positioning and/or request for assistance data onto an LCS request. In this case, the WTRU may send one or more of the above information/requests, upon encapsulation, either in a single transmission (e.g., single NAS message) or in multiple transmissions (e.g., multiple NAS messages). When sending in a single transmission, the WTRU may send the NAS message, possibly in a RRCResumeRequest or SDT, either in MsgA (i.e., when using 2-step RACH), Msg3 (i.e. when using 4-step RACH), or using a CG preconfigured in the WTRU. Likewise, when sending in multiple transmissions, the WTRU may send the NAS message(s) in multiple SDTs (e.g., multiple MsgA, Msg3, or CGs) while remaining in RRC inactive/idle mode.

In another example, it may be possible for a WTRU operating in RRC idle/inactive mode to skip the transmission of the WTRU capability information and/or the request for assistance information when sending the LCS request to the network. The decision of whether to send the above information/request may be made by the WTRU based on one or more validity conditions associated with the WTRU capabilities and/or assistance information. The validity conditions may be monitored by the WTRU upon receiving the trigger from the LCS client, for instance. As an example, it may be possible for the WTRU to have previously sent the WTRU capability and/or received the assistance information during RRC Connected mode. The WTRU may also be configured or provided with validity condition(s) (e.g., timer, cell IDs in RNA/TA, PLMN restrictions) when transitioning to RRC inactive/idle mode, in a RRCRelease message, for example. In this case, the WTRU may determine whether to include or exclude the WTRU capability information and/or request for assistance information based on whether the validity conditions are valid (e.g., timer is not expired or cell IDs are valid) when triggered by the LCS client and/or sending the LCS request to the network.

In another example, the decision of whether to send the WTRU capability information and/or (request) assistance information while operating in RRC inactive/idle mode may be made based on the reception of a request message from the network either before or after sending the LCS request to the network. In this case, the WTRU in RRC inactive/idle mode may send the WTRU capability information or assistance data information (e.g., PRS configurations supported) upon receiving a request from the network in a NAS message, which may be sent in a paging or RRCRelease message or RRCResume message, for instance. As an example, the request for WTRU capability and/or information on assistance data may be triggered by network (e.g., LMF) upon receiving the LCS request from the WTRU and/or determining that the context related to the WTRU capability/assistance data is either not available or not valid (e.g., at the AMF or LMF).

WTRU Receives Response Messages(s) Associated with MO-LR Positioning Service while in RRC Inactive/Idle Mode Upon sending the LCS request for MO-LR service and/or the information on WTRU capability/assistance data, the WTRU may receive one or more response messages containing one or more of the following:

- Response to LCS request for acknowledging the support for providing WTRU positioning information
- Request for WTRU capability information
- Assistance data, comprising one or more PRS/SRSp configurations, for the WTRU to use for determining positioning while operating in RRC inactive/idle mode
- Configuration for sending measurement reports, comprising information on resources to use (e.g., CG), periodicity for reporting, etc.

In one example, the WTRU may receive the response message(s) in one or more RRCRelease messages (e.g., in Msg B in 2-step RACH or Msg4 in 4-step RACH), upon sending an RRCResumeRequest message. For a WTRU operating in RRC inactive mode, the response message(s) may be received in an RRCRelease message under the suspendConfig configuration, for instance. In another example, the WTRU may receive the response message(s) in one or more RRCResume messages (e.g., Msg B or Msg 4). The WTRU also may receive the response message(s) containing one or more of the above information in a (RAN/CN) paging message, for example.

Reporting Bypassing Control Plane

WTRU-Based Positioning does not Require Measurement Reporting

In one embodiment, for the WTRU-based positioning, the WTRU may transition to the RRC Connected state to report the location of the WTRU. For instance, the WTRU may report a (pre)configured number of positions after the WTRU transitions to the RRC Connected state. In this case, the WTRU may be configured not to report measurements or estimated location while the WTRU is in IDLE or INACTIVE mode.

The (pre)configured number of positions reported may be the locations of the WTRU estimated at various times while the WTRU was in the IDLE or INACTIVE state. The location of the WTRU may be obtained after the WTRU estimates its own location after measuring PRSs transmitted from TRPs. The WTRU may estimate its location after collecting measurements such as AoD, AoA, RSTD, and/or ToA for each PRS or multiple PRSs transmitted from the TRP(s). Multiple location can be associated with different time stamps, indicating each location is estimated at different time occasion.

The WTRU may report statistical characteristics of the multiple locations, which may include at least average value of multiple locations (e.g., geometric center of multiple locations), and/or standard deviations of multiple locations. The aforementioned characteristics may be reported after the WTRU transitions to the RRC Connected state. Particularly, reporting an accumulated number of locations reduces the number of times that the WTRU must send a report, thereby reducing power consumption for transmitting the reports.

The WTRU may receive an indication from the network to return to the RRC connected state to report estimated location(s). The WTRU may receive the indication in RRC or LPP messaging.

The WTRU may be configured with the number of positions to report by higher layer message, such as RRC, RRCRelease message, or LPP.

In another embodiment, the WTRU may report the plurality of (pre)configured positions using message 3, message A, or CG during INACTIVE mode.

Positioning Handover During Mobility
Limited to IDLE/INACTIVITY Mode

WTRU in Idle/Inactive Mode Assists the Network in Aligning the Tracking Area and/or RNA Configuration with the PRS/SRSp Configuration In various embodiments, the WTRU sends an indication to the network while operating in idle/inactive mode for aligning the configuration parameters (e.g., cell IDs) associated with the PRS/SRSp configurations with those of the Tracking Area and/or RAN notification Area (RNA) configured in the WTRU. In the case of idle mode, the WTRU may be assigned a Tracking Area list consisting of the list of cell IDs in which the WTRU may be mobile without having to send a Tracking Area update message to the network. In the case of inactive mode, the WTRU may be assigned with an RNA list consisting of cells IDs where the WTRU may be mobile without sending the RNA update (RNAU) message to the RAN. The WTRU may be provided with the PRS configurations along with the associated cell IDs in the assistance information, which may be maintained and used by the WTRU for DL-based and/or UL+DL based positioning during idle/inactive mode. Similarly, the WTRU may be configured with SRSp resources along with the associated cell IDs for UL-based and/or UL+DL based positioning while in idle/inactive mode.

In this case, it is possible for the WTRU during mobility to use PRS/SRSp configuration parameters (e.g., cell IDs associated with PRS configurations and/or SRSp resources) which may not be aligned with the cells/gNBs associated with TA/RNA for use during idle/inactive mode. As a consequence, the WTRU may have a mismatch in the on-duration of the DRX cycle for receiving the PRS in DL and/or transmitting SRSp in UL during idle/inactive mode, hence resulting in possible inefficient resource usage, power waste, and inaccuracy in positioning measurements, for example. By aligning the PRS/SRSp configuration parameters with the TA/RNA parameters, the WTRU may receive PRS or transmit SRSp in the similar time slots when receiving paging messages or transmitting initial access messages during mobility while in idle/inactive mode. In addition, the WTRU may also be configured to send/receive measurement reports which can possibly be correlated with the TA/RNA update messages sent to the network or paging messages received from network.

In one embodiment, the WTRU may assist the network in correlating the TA/RNA configurations and the parameters associated with the PRS/SRSp configurations for enabling the WTRU to support different positioning methods during mobility while remaining in idle/inactive mode. In this case, upon receiving the PRS/SRSp configurations and the associated cell related parameters (e.g., in SIB, CN/RAN paging messages), the WTRU may compare the cell IDs associated with the PRS/SRSp configurations and the cell IDs in the TA/RNA for determining the TA/RNA configuration for positioning. The TA/RNA configurations for positioning may be either the same as or different from the TA/RNA configurations used for CN/RAN paging, for example. Based on the identification of the cell IDs that are common and different in both configurations, the WTRU may then perform one or more of the following:

- the WTRU may send an indication to the network when it identifies at least one cell ID that may be different between the TA/RNA lists and PRS/SRSp configuration parameters (e.g., cell list).

The WTRU may select a TA/RNA configuration for positioning from one or more pre-configurations, which may consist of different lists of cell IDs that may match with the cell related parameters associated with PRS/SRSp configurations. The WTRU may then send an indication to the network comprising the selected TA/RNA configuration for positioning The WTRU may determine/derive the parameters (e.g., cell IDs) for updating the TA/RNA list for positioning and send the updated parameters to the network.

The WTRU may send the assistance information to the network for correlating the PRS configuration with the TA/RNA list for positioning In the case when the WTRU sends indication for aligning the parameters in TA/RNA and in PRS/SRSp configurations, the WTRU may include one or more of the following information in the indication:

WTRU ID: For example, the WTRU may include the CN assigned IDs (e.g., S-TMSI, IMSI) and/or RAN assigned IDs (e.g., I-RNTI). In another example, the WTRU may select a random ID from a pool of IDs configured in the WTRU when sending the indication to the network.

Parameters related to PRS/SRSp configuration: For example, the WTRU may indicate the identifiers of PRS/SRSp configurations that may be currently aligned or to be reconfigured for aligning with the TA/RNA.

Parameters related to TA/RNA: For example, when sending the indication to the LMF/RAN, the WTRU may indicate the one or more parameters including number of cells and/or cell IDs associated with PRS/SRSp that may be different from those in the TA/RNA. In one example, the WTRU may include in the indication the RACH resources and/or the identifier of the RACH resources that may be updated when aligning with the TA/RNA list. In another example, the WTRU may send a group ID representing one or more cells associated with PRS/SRSp that are different from those in the TA/RNA.

TA/RNA ID: For example, when the WTRU selects a TA/RNA configuration from a set of pre-configurations, the WTRU may indicate to the network the identifier of the selected TA/RNA pre-configuration.

Assistance information: For example, the WTRU may indicate information on WTRU mobility (e.g., WTRU speed, direction) and/or WTRU environment (e.g., blockages to LOS path, multipath)

In the case when the WTRU determines/derives the cell list for TA/RNA for positioning based on the alignment with the cell related parameters associated with PRS/SRSp configurations, the WTRU may determine one or more of the following:

A number/list of Cell IDs that may be higher than the existing list by a certain threshold, and less than the list of cell IDs in the Tracking Area and/or RNA.

A number/list of Cell IDs that may match with the list of cell IDs in the Tracking Area and/or RNA.

A number/list of Cell IDs that may be higher than the list of cell IDs in the Tracking Area and/or RNA by a certain threshold.

A number/list of Cell IDs that may be determined based on a combination of cell IDs within the RNA and Tracking Area The criteria for determining the updated number of cells associated with the PRS/SRSp configurations, including the threshold number of cells, may be (pre)configured in the WTRU. The criteria and the thresholds may be determined based on balancing the tradeoff between having a wider area for performing positioning and having to send more positioning measurement reports during mobility while remaining in idle/inactive mode, for example. As an example, the WTRU may be configured to determine a number of cells that is less than the cell count in the TA/RNA if the WTRU is intended to send frequent number of measurement reports in TA/RNA update message while being mobile within a smaller area. Likewise, the WTRU may be configured to determine a number of cells that is higher than the cell count in the TA/RNA if the WTRU is intended to send fewer measurement reports in the TA/RNA update message while being mobile in a wider area.

The WTRU may send the indication to the network for aligning TA/RNA and the PRS/SRS configurations in either a TA/RNA update message or in an initial access message (e.g., Msg 1/3 or Msg A) based on one or more of the following triggering conditions:

Detection of different cell ID during mobility.

Detection of different PRS from the configured PRS

Reception of paging message

Timer (e.g., for periodic transmission of indication message)

Measurements made at WTRU

Higher layer/application trigger

Upon aligning the parameters, the parameters corresponding with the PRS/SRSp configurations (e.g., cell IDs, SRSp resources) may be associated with the WTRU context and maintained along with TA/RNA in the network (e.g., at the Access and Mobility Management Function (AMF) in the CN for the Tracking Area or at an anchor gNB in RAN for RNA) and/or WTRU. The WTRU may also be assigned an identifier/index indicating the alignment between the parameters in the TA/RNA and PRS/SRSp configurations. In this case, the assigned alignment identifier may be maintained with the WTRU context along with other parameters associated with supporting positioning during WTRU mobility (e.g., configured grants for sending measurement reports). When the WTRU detects a misalignment between the parameters (e.g., difference in cell ID), the WTRU may send an indication to the network including the assigned identifier for the network to retrieve the WTRU context from the CN function/anchor gNB and possibly to update the PRS/SRSp and/or TA/RNA configurations.

Figure 6:
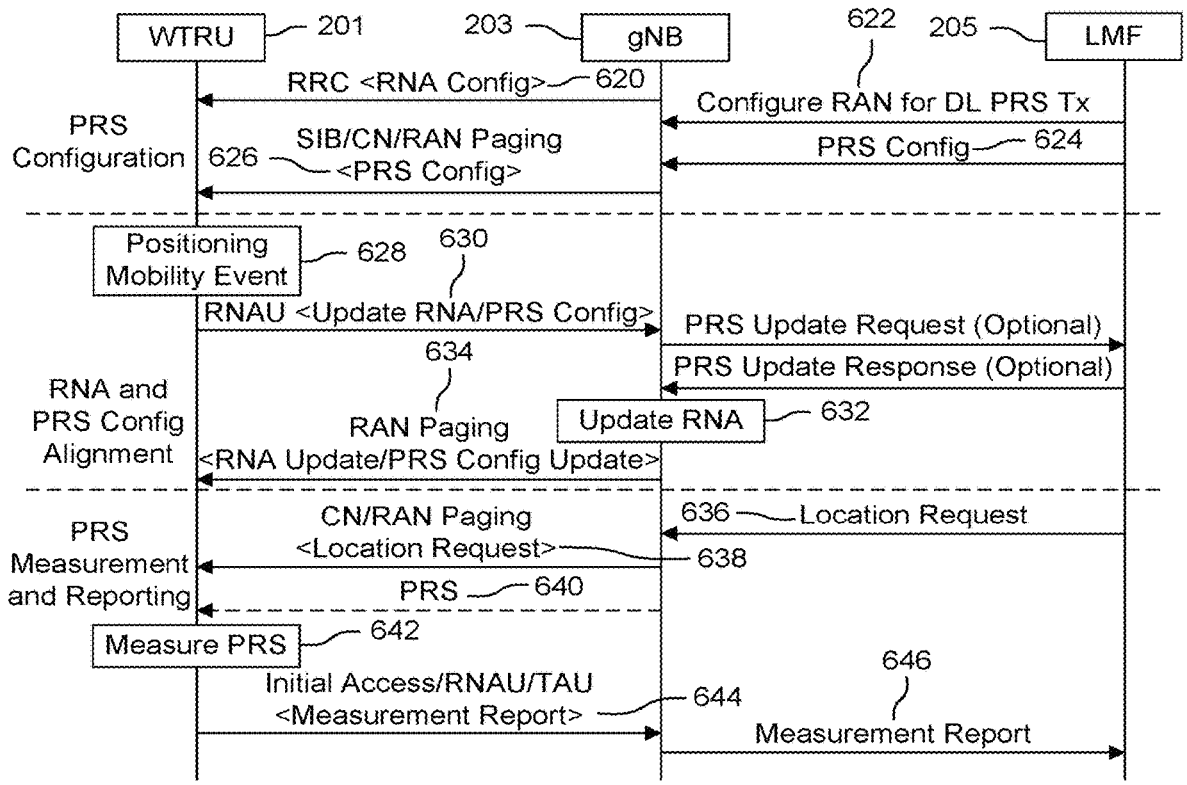
FIG. 6 is a signaling flow chart for positioning during WTRU Inactive mode mobility illustrating PRS configuration and RNA alignment in accordance with an embodiment.

An example of signaling flow for positioning during WTRU Inactive mode mobility is shown in FIG. 6, illustrating PRS configuration and RNA alignment. The WTRU 201 is initially configured by RAN with RNA (620) prior to transitioning into RRC Inactive mode. When triggered by the LMF 205 (622, 624), the WTRU 201 is provided with PRS configuration either in SIB, CN paging, or in RAN paging message (626). Upon triggering by positioning mobility event 628 (e.g., identifying a new cell ID outside of RNA or identifying cell ID associated with PRS config outside of RNA or interference from neighbor cells), the WTRU sends RNAU to the RAN to update RNA and/or PRS config (630). The RAN updates (632) the WTRU's RNA to align with PRS config based on information on cells associated with PRS in RNAU. The WTRU receives the updated RNA and possibly updated PRS config in a RAN paging message (634). The WTRU receives a Location Request from the LMF in a CN paging or RAN paging message (636, 638). The gNB sends PRS to the WTRU (640) and the WTRU measures DL PRS (e.g. during DRX on-duration) (642) and sends the measurement report to gNB/LMF in initial access (e.g. SDT), RNAU or TAU (Tracking Area Update) message(s) (644). The gNB may transmit the report to the LMF (646).

Figure 7:
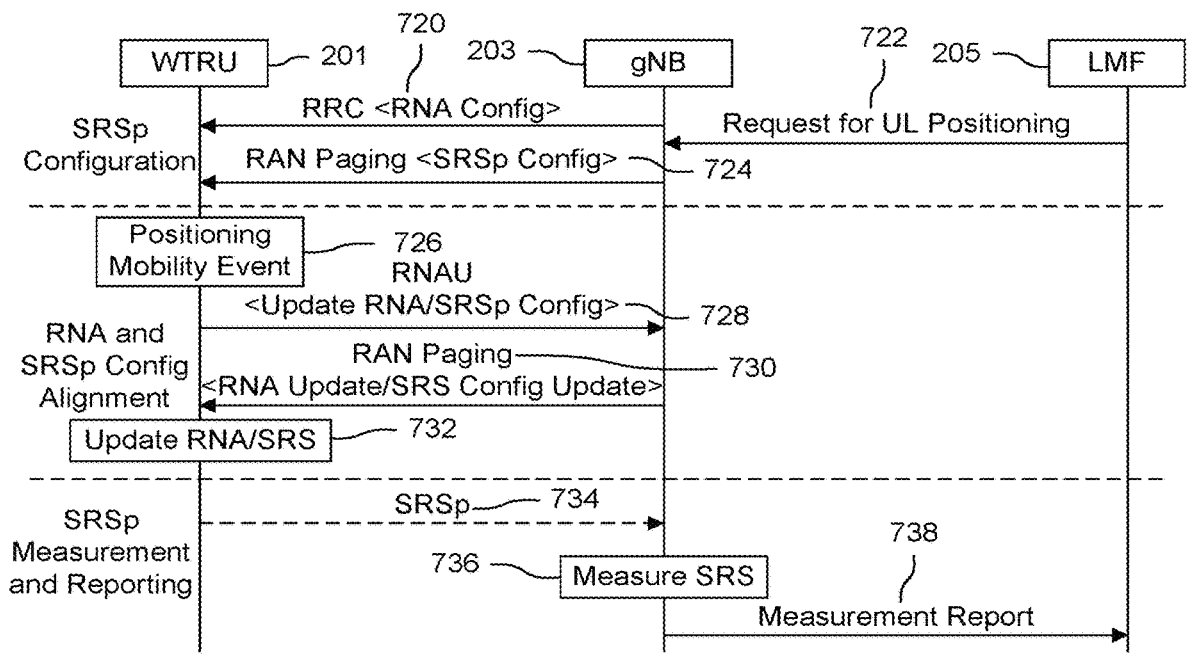
FIG. 7 is a signaling flow chart for positioning during WTRU Inactive mode mobility illustrating SRS configuration and RNA alignment in accordance with an embodiment.

Another example of signaling flow for positioning during WTRU Inactive mode mobility is shown in FIG. 7, illustrating SRS configuration and RNA alignment. The WTRU is initially configured by RAN with RNA (720), prior to transitioning into RRC Inactive mode. When triggered by the LMF (722), the WTRU is provided with SRSp configuration in a RAN paging message (724). Upon triggering by positioning mobility event (726), the WTRU sends RNAU to RAN to update the RNA and/or SRSp config (728). The RAN updates the WTRU's RNA to align with SRSp config. The WTRU receives the updated RNA and possibly updated SRSp config in RAN paging message (730). Finally, the SRSp transmitted by WTRU (734) is measured at the RAN (736) and the measurement report is sent to the LMF (738).

Figure 8:
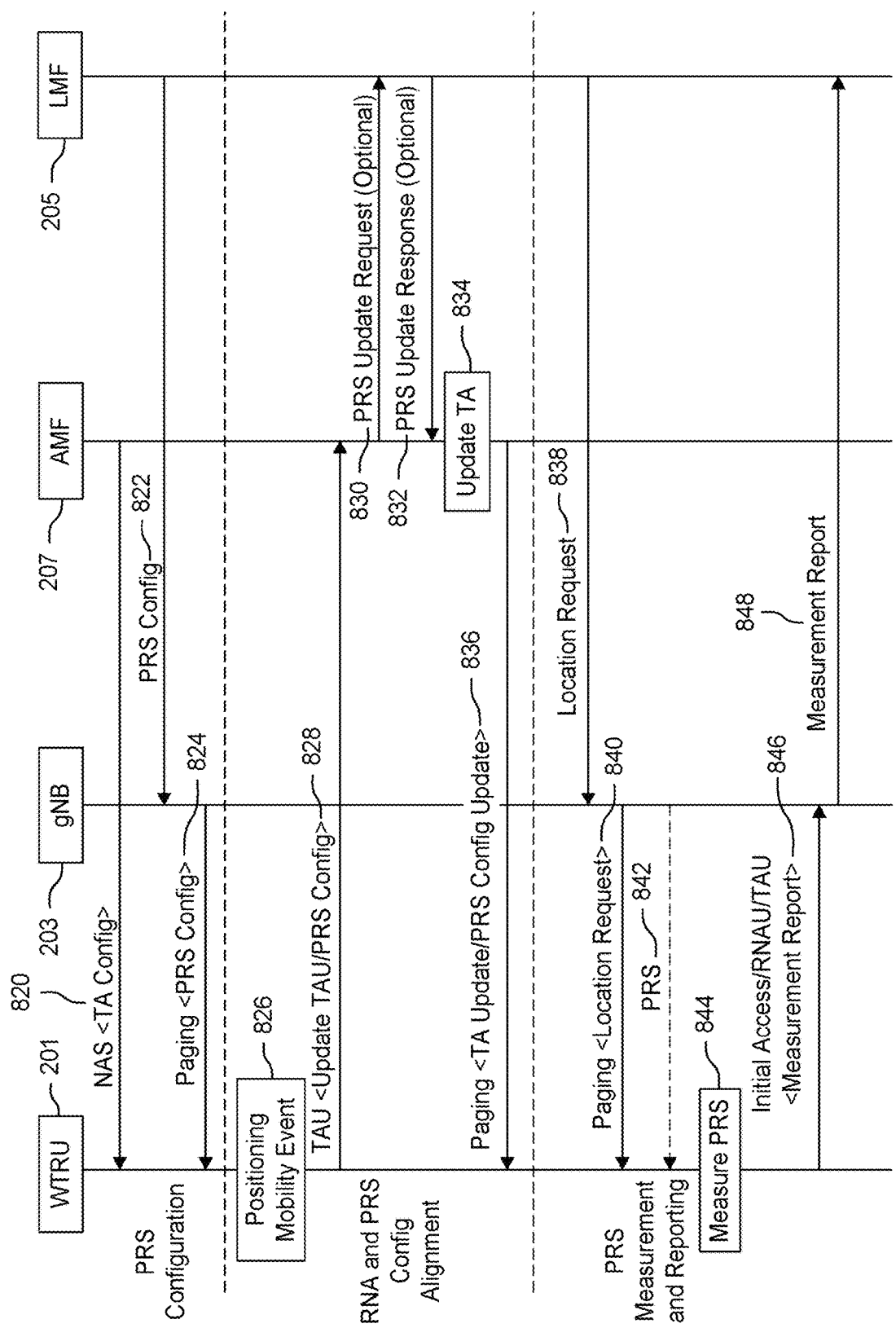
FIG. 8 is a signaling flow chart for positioning during WTRU idle mode mobility illustrating PRS configuration and Tracking Area alignment in accordance with an embodiment.

An example of signaling flow for positioning during WTRU Idle mode mobility, illustrating PRS configuration and Tracking Area alignment, is shown in FIG. 8. The WTRU 201 is initially configured by the RAN with RNA (820), prior to transitioning into RRC Inactive mode. When triggered (822) by the LMF 205, the WTRU is provided with PRS configuration either in CN paging or in RAN paging message (824). Upon triggering by a positioning mobility event (826) (e.g. identifying a new cell ID outside of Tracking Area or identifying cell ID associated with PRS config outside of Tracking Area or interference from neighbor cells), the WTRU sends a TAU (828) to the AMF (207) to update Tracking Area or PRS config. The AMF updates the WTRU's Tracking Area to align with PRS config based on information on cells associated with PRS sent in TAU (834). The WTRU receives the updated Tracking Area and possibly updated PRS config in a paging message (836). The WTRU receives a Location Request from the LMF in a CN paging or RAN paging message (840). The WTRU receives and measures DL PRS (842 and 844, respectively) (e.g. during DRX on-duration) and sends the measurement report to gNB/LMF in initial access (e.g. SDT), RNAU or TAU message(s) (846). The gNB sends the measurement report to the LMF (848).

WTRU in Idle/Inactive Mode Performs Measurements of DL PRS Aligned with Paging Occasions in DRX Cycle In one embodiment, a WTRU in idle/inactive mode makes positioning measurements on the DL PRS which may be received along with paging messages in time durations aligned with the paging occasions. In this case, the WTRU may be (pre)configured with one or more PRS configurations comprising different parameters (e.g., periodicity, resources) which may be associated and aligned with different DRX cycles (e.g., consisting of different ON and sleep durations) configured in the WTRU. In another example, the WTRU may receive the PRS/SRSp configurations which may be aligned with the DRX cycle configured in WTRU.

The alignment between PRS reception and paging message reception may be supported by the WTRU for both CN paging and RAN paging, for example. In this case, the mapping between the different PRS configurations (identified with PRS configuration IDs) and the DRX configurations (identified with DRX cycle IDs) may be provided to the WTRU either by CN functions (e.g., AMF, LMF) when supporting CN paging or by RAN when supporting RAN paging. The mapping between PRS configurations (i.e. assistance information) and DRX configurations may be configured in the WTRU either when the WTRU is in RRC connected mode or after transitioning into RRC idle/inactive mode (e.g., via SIB or paging messages), for example.

In addition, the WTRU may be assigned WTRU identifiers (e.g., positioning P-RNTI, positioning I-RNTI) either by the CN or RAN, which the WTRU may use to identify the presence of PRS when receiving paging messages during paging occasions or to identify presence of paging message when receiving DL PRS. The identifiers assigned to the WTRU may be either dedicated per-WTRU or per-group, where a group of WTRUs may use the common identifier when receiving the PRS during paging occasions. In the case of group paging/positioning, a group of WTRUs may use the group identifier (e.g., positioning Group-RNTI) for detecting the presence of the PRS during the paging occasions in DRX cycle which may be common to all WTRUs in the group.

While in idle/inactive mode, the WTRU may be triggered to make measurements of the PRS based on the detection of the identifier assigned to WTRU and/or the PRS ID during paging occasions of a default DRX cycle. For continuing to receive the DL PRS the WTRU may change to a different DRX cycle, which may be determined based on the PRS configuration ID and the configured mapping between the PRS configuration ID and the DRX cycle ID, for example. The WTRU may continue making measurements of the received DL PRS without transitioning to RRC connected mode based on the assistance information on the PRS configuration (e.g., measurement duration) available at the WTRU and send to the network the measurement report (e.g., small data transmission, early data transmission) upon completion of the measurement duration.

Figure 9:
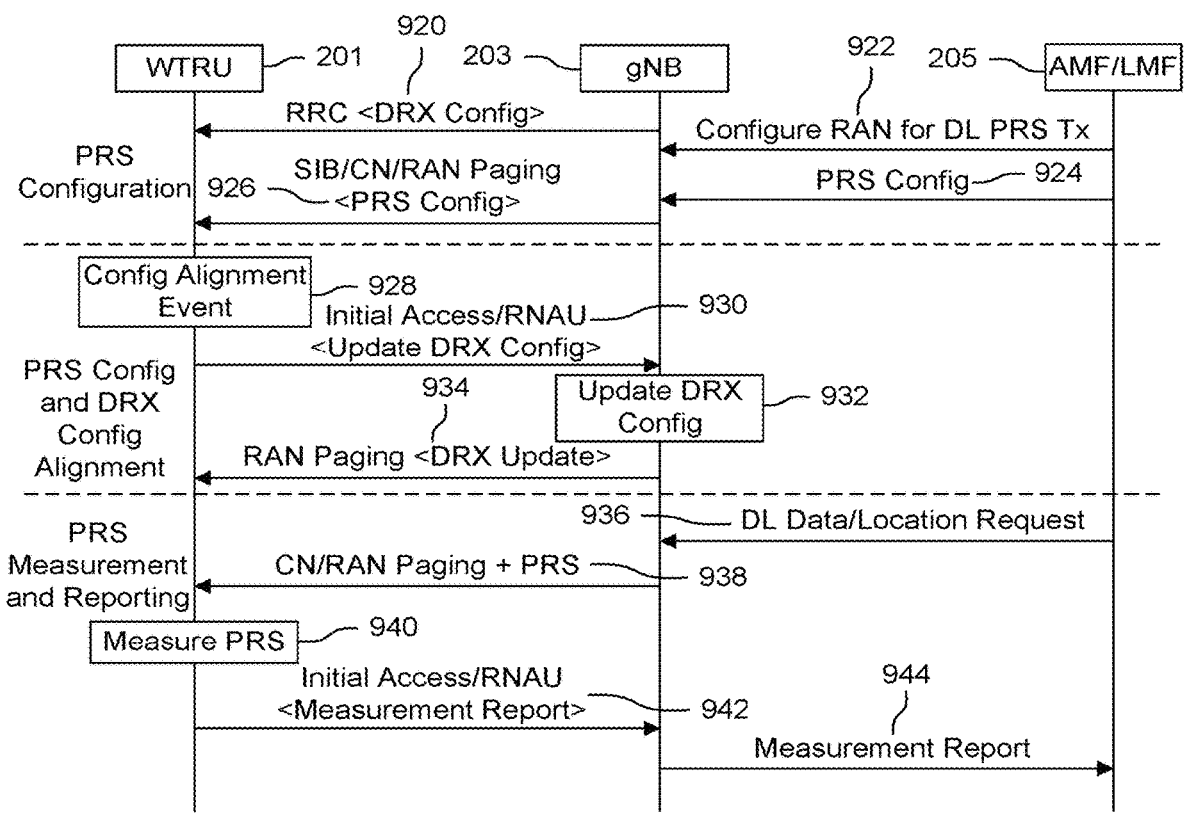
FIG. 9 is a signaling flow chart for positioning during WTRU Idle/Inactive mode with PRS configuration and DRX cycle alignment in accordance with an embodiment.

An example of signal flow for positioning during WTRU Idle/Inactive mode with PRS configuration and DRX cycle alignment is shown in FIG. 9. The WTRU 201 is initially configured by the RAN with DRX, (920) prior to transitioning into RRC Inactive mode. When triggered by the LMF (922, 924), the gNB provides the WTRU with PRS configuration either in SIB, CN paging or in RAN paging message (926). Upon triggering by a configuration alignment event (928) (e.g., DRX configuration is not aligned with PRS config), the WTRU sends an indication to the gNB (RAN) to update DRX config in an initial access (e.g., Msg A)/RNAU message (930). The RAN updates the WTRU's DRX configuration to align with PRS config (932). The WTRU receives the updated DRX config in RAN paging message (934). When the gNB receives a Location Request from LMF or DL data from AMF (936), the gNB pages the WTRU in a CN paging or RAN paging message (938). The WTRU may also receive the PRS in the same time durations when receiving the paging message. The WTRU measures DL PRS (940) (e.g., during DRX on-duration) and sends the measurement report to gNB/LMF in an initial access (e.g., SDT), RNAU message(s) (942). The gNB sends the measurement report to the LMF (944).

WTRU in Idle/Inactive Mode Sends SRSp Based on Triggering Conditions for Sending TA/RNA Update Message In one embodiment, the WTRU in idle/inactive mode sends SRSp for UL positioning based on triggering conditions for sending TA/RNA updates messages. In this case, the WTRU, which may be configured with one or more associated SRSp configurations (e.g., consisting of different SRSp IDs, resources, power, periodicity), may also be configured with the associated Tracking Area by the CN or RNA by the RAN. As an example, an SRSp configuration (e.g., SRSp ID X) may be associated with a Tracking Area consisting of at least one cell in cell list A (e.g., cell IDs 1, 2, . . . N) and/or an RNA consisting of at least one cell in cell list B (e.g., cell IDs 1, 2, . . . M). The cell list configured in the WTRU for Tracking Area and/or RNA for the SRSp transmission may be either the same or a different cell list associated with the Tracking Area and/or RNA configured for idle/inactive mode mobility.

In one embodiment, the WTRU may be triggered to transmit the SRSp based on one or more of the following conditions:
- Detection of a first cell ID that may be outside of the cell list associated with the existing/current Tracking Area and/or RNA configured in the WTRU.
- Detection of a first cell ID that may be inside of the cell list associated with a different Tracking Area and/or RNA configured in the WTRU The WTRU may determine the parameters of the SRSp for UL transmission based on the mapping between the SRSp configuration and the associated cell list in the TA/RNA configured in the WTRU. The WTRU may continue transmitting the SRSp according to the SRSp configuration until a termination condition is satisfied (e.g., detection of a different cell ID inside/outside of the TA/RNA cell list, expiry of timer, reception of a DL paging message).

Figure 10:
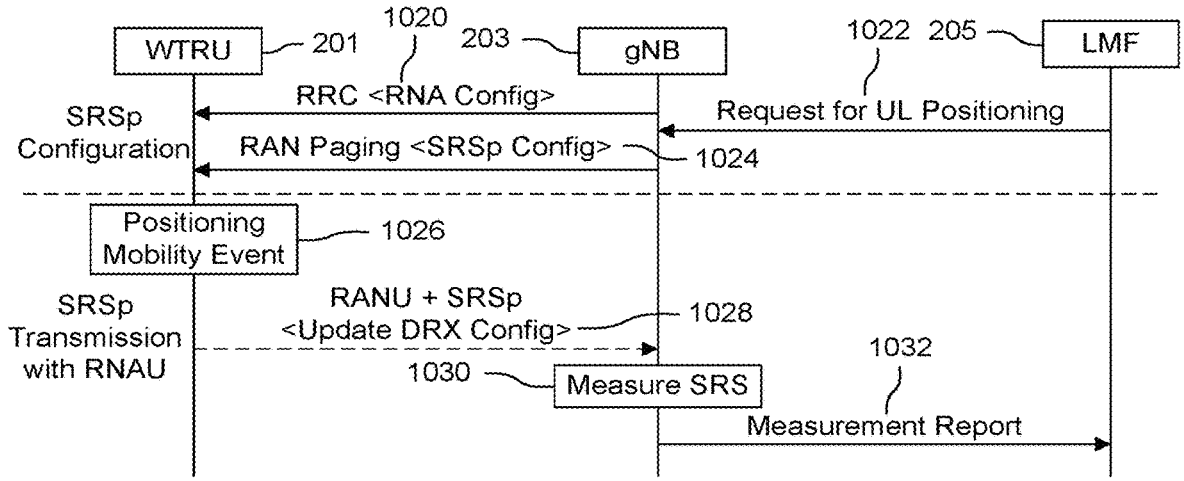
FIG. 10 is a signaling flow chart for positioning during WTRU Inactive mode mobility for SRS configuration and RNA alignment in accordance with an embodiment.

An example of signal flow for positioning during WTRU Inactive mode mobility for SRS configuration and RNA alignment is shown in FIG. 10. The WTRU 201 is initially configured by RAN with RNA (1020), prior to transitioning into RRC Inactive mode. When triggered by the LMF (1022), the WTRU is provided with SRS configuration in a RAN paging message (1024). Upon triggering by a positioning mobility event (1026) (e.g. WTRU detects new cell ID outside of RNA), the WTRU transmits SRSp along with the RNAU message (1028). Finally, the gNB 203 measures the SRSp (1030) and the gNB sends the measurement report (1032) to the LMF 205.

WTRU in Idle/Inactive Mode Receives Trigger to Update SRSp Configuration Based on Configured TA/RNA In one embodiment, the WTRU may receive a trigger to update the SRSp configuration while in idle/inactive mode based on the SRSp transmitted by the WTRU to at least one cell outside of the configured Tracking Area and/or RNA. Specifically, a WTRU configured for performing UL based or UL+DL based positioning while in idle/inactive mode may use the configured resources for sending the SRSp and the WTRU identifier (e.g., CN assigned ID such as TMSI or RAN assigned ID such as I-RNTI). In the case when the WTRU approaches a cell boundary or moves into a cell where the SRSp sent by the WTRU is not valid or resources are not aligned with the TA/RNA, the WTRU may receive a paging message from the network for performing one of the following:
- Update the resources/SRSp configuration: For example, the WTRU may receive a paging message containing one or more of the following:
  - A trigger to prohibit using the existing SRSp configuration, wherein the trigger may contain time/area restrictions (e.g., timer duration, cell IDs and/or AoDs) for prohibiting the use of the resources associated with SRSp configurations.
  - A change in the SRSp configuration, wherein the request to change the SRSp may contain the updated SRSp configuration in the same, first paging message or in a different, second RAN paging message sent after the first paging message
  - Selection of a different SRSp, wherein the indication to (re) select SRSp may contain the identifier of a network selected SRSp configuration from a set of SRSp pre-configurated in the WTRU.
- Update the TA/RNA: For example, the WTRU may receive in the paging message either a request to send a TA/RNA update message or an updated TA/RNA containing the updated cell IDs where the WTRU may continue using the existing SRSp configuration during mobility.

Figure 11:
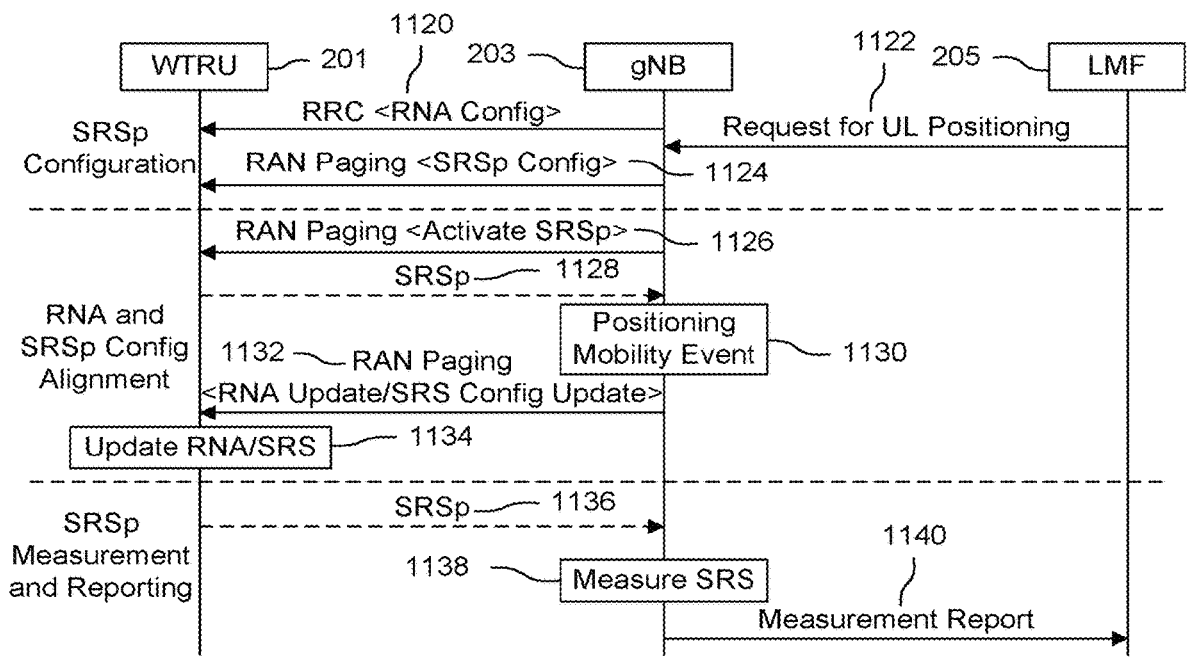
FIG. 11 is a signaling flow chart for positioning during WTRU Inactive mode mobility for trigger-based update for SRS configuration and RNA alignment in accordance with an embodiment.

FIG. 11 is an example of signal flow for positioning during WTRU Inactive mode mobility for trigger-based update for SRS configuration and RNA alignment in accordance with another embodiment. The WTRU 203 is initially configured by the RAN with RNA (1120), prior to transitioning into RRC Inactive mode. When triggered by the LMF (1122), the WTRU is provided with SRSp configuration in a RAN paging message (1124). Upon triggering by an activate SRSp indicator in a RAN paging message (1126), the WTRU transmits SRSp (1128). If triggered by positioning mobility (e.g. SRSp detected at gNBs/TRPs in RAN is different than RNA configured in WTRU) (1130), the WTRU may be provided with RNA update and/or SRSp config update in a RAN paging message (1132), and the WTRU updates its RNA/SRSp accordingly (1134). Finally, the WTRU transmits the SRSp (1136), which is measured at the gNB 203 (1138), and the measurement report is sent to the LMF 205 (1140).

WTRU Receives Indication for Using CG Configuration in RRC Inactive/Idle Mode During Mobility In one embodiment, the WTRU may receive a configuration for CG which may be used when moving to a new cell/gNB, so that the WTRU can continue performing positioning while remaining in RRC Inactive/idle mode. For example, the WTRU may receive the CG configuration from the source cell/gNB (e.g., in a RRCRelease message) for sending the positioning information and/or measurement reports (e.g., periodically). Along with the CG configuration, the WTRU may also be configured by the source cell/gNB with one or more validity conditions, such as a TA timer, a validity time duration, and/or a validity area (e.g., cell IDs, possibly associated with RNA), which may be verified by the WTRU when using the CG in RRC inactive/idle mode.

In the case, for example, when the WTRU moves to a new cell, where the new cell ID is within the validity area, the WTRU may continue using the CG configuration for sending positioning information using SDT while remaining in RRC inactive/idle mode. In the case when one or more validity conditions expire, where the WTRU moves to a new/target cell/gNB which may be outside of the validity area, the WTRU may send in the RRCResumeRequest message (e.g., in Msg A or Msg 3) wherein the cause value indicates the expiry and release of the previous CG configuration and/or request for a new CG configuration. The WTRU may include in the RRCResumeRequest the identifier associated with the previous CG configuration along with the WTRU identifier (e.g., Inactive-Radio Network Temporary Identification (I-RNTI)), for example. When fetching the WTRU context from the source cell/gNB, the target cell/gNB may determine, based on the identifiers sent by WTRU, whether the WTRU will be allocated/activated with a new CG configuration or may continue using the previous CG configuration. In response to the RRCResumeRequest, the WTRU may receive from the target cell/gNB one or more of the following:
- RRCResume message (e.g., in Msg B or Msg 4) indicating that the WTRU should use a new CG configuration
- RRCRelease message (e.g., in Msg B or Msg 4) indicating that the WTRU should release the previous CG configuration and use a new CG configuration
- RRCRelease message indicating that the WTRU should continue using the previous CG configuration The RRCResume message and/or RRCRelease message may include the parameters associated with the new CG configuration (e.g., periodicity, time/frequency resources) or may include an activation indication (e.g., ID of configuration) to activate a preconfigured CG configuration.

WTRU Receives Assistance Data in RRC Inactive/Idle Mode During Mobility

In one embodiment, the WTRU acquires assistance data, which may possibly contain one or more positioning configurations (e.g., PRS/SRSp configurations) when moving to a new cell/gNB while continuing to operate in RRC inactive/idle mode. The WTRU may initially receive the assistance data, either via broadcast or dedicated RRC signaling, upon triggering of the LPP procedure for positioning while in the coverage of a source cell/gNB. In this case, the WTRU may receive the assistance data in dedicated signaling while in RRC Connected mode or when transitioning to RRC Inactive/idle mode (e.g., in RRCRelease message), for example.

In one example, the WTRU may receive validity conditions (e.g., timer, cell IDs in validity area) associated with the assistance data, which may be used to verify the applicability of the assistance data when moving to a new cell/gNB and requesting new assistance data. In another example, the WTRU may receive configuration/rules for determining whether to send a request for new assistance data in dedicated NAS/RRC signaling or to acquire the new assistance data via broadcast RRC signaling (i.e., SIB), possibly including on-demand SIB. For example, the configuration/rules may indicate a first set comprising one or more cell/gNB IDs in which the WTRU may be allowed to send the request for new assistance data and a second set comprising one or more cell/gNB IDs, which may overlap at least in part with the first set, in which the WTRU may receive the new assistance data in broadcast signaling.

In the case when the conditions/rules associated with sending a request are satisfied (e.g., the new cell/gNB ID is outside of the validity area), the WTRU in RRC Inactive/Idle mode may send, in the RRCResumeRequest, the request for new assistance data for one or more new PRS and/or SRSp configurations. The WTRU may include in the RRCResumeRequest the identifiers associated with the WTRU (e.g., I-RNTI) and the previous assistance data (e.g., PRS/SRSp configuration IDs). The new cell/gNB may fetch the WTRU context from the source cell/gNB based on the WTRU ID and may implicitly determine the request from WTRU for a new assistance data when verifying the release/invalidity of the previous assistance data from the assistance data ID. Alternatively, the WTRU may include in the RRCResumeRequest the cause value indicating the expiry and/or release of the previous assistance data/configurations for requesting the new assistance data. In response to the request, the WTRU may either receive new assistance data, an activation indication for a preconfigured assistance data (i.e., for preconfigured PRS/SRSp configuration), or an indication to continue using the previous assistance data. The WTRU may receive the response indication in an RRCResume message or RRCRelease message (i.e. in Msg B or Msg 4), for example. In another example, the RRCResume message or RRCRelease message may instruct the WTRU to acquire the new assistance data via broadcast RRC signaling.

Minimum Accuracy Requirements and Deferred MT-LR Positioning

Examples of Minimum Accuracy Requirements

The WTRU may receive minimum accuracy or latency requirements from the network (e.g., LMF, gNB) associated with PRS configurations the WTRU receives from the network. The accuracy and/or latency requirements may be related to the positioning QoS indicated by higher layers/application (e.g., LCS client) associated with the WTRU, for example. The minimum/maximum accuracy and/or latency requirements may be at least one of the following metrics:

Threshold for standard deviation/variance for the position estimate made by the WTRU or for measurements made by the WTRU (e.g., RSRP, TDOA, time of arrival, angle of arrival): For example, the WTRU may receive a PRS configuration that is associated with the threshold, indicating that the PRS configuration can generate a standard deviation/variance below the threshold.

Threshold for the minimum/maximum value for range of the position estimate or measurements (e.g., RSRP, TDOA, time of arrival, angle of arrival): For example, the WTRU may receive a PRS configuration that is associated with the threshold, indicating that the PRS configuration can generate minimum/maximum above/below the threshold.

Threshold for latency: The WTRU may receive an indication from the network that the PRS configuration and measurement reporting configuration satisfies the indicated accuracy requirement. For example, the WTRU may receive multiple PRS configurations from the LMF with the number of PRS resources 3, 6 and 9. The WTRU may receive latency requirements associated with respective number of resources, 100 ms, 200 ms, 400 ms, indicating that measurements of 3, 6 and 9 PRS resources yields latency under 100 ms, 200 ms and 400 ms, respectively.

Threshold for accuracy: The WTRU may receive multiple PRS configurations from the network indicating various levels of accuracy (e.g., order of meters, order of centimeters) associated with each PRS configuration. For example, the WTRU may receive two PRS configurations from the network, one configuration consisting of 6 PRS resources and another configuration consisting of 20 PRS resources. The WTRU may also receive configuration associating the configuration with 6 PRS resources and 20 PRS resources with order of meters and order of centimeters, respectively, indicating that, by using 20 PRS resources, the WTRU can achieve centimeter-level accuracy positioning. Granularity of accuracy is not limited to the one described in the example. The WTRU may also receive association of accuracy requirement and different PRS configuration parameters such as the number of repetitions, number of TRPs from which the PRS are transmitted from, the number of symbols, number of repetitions, comb values/factors, bandwidth, muting pattern, number of PRS resources, PRS resource sets, frequency layers, etc.

Example Embodiment Using Minimum Accuracy/Latency Requirement

In an embodiment, a WTRU may be configured with one or more PRS configurations and/or informed which of the indicated PRS configurations are able to satisfy the minimum positioning QoS requirements (e.g. accuracy, latency) associated with the positioning service. In an example, the WTRU may receive the PRS configurations and/or the associated identifiers in a first indication (e.g., in LPP assistance data or SIB), followed by a second indication containing information on which of the PRS configurations (e.g., IDs/flags) are able to satisfy the minimum accuracy (and/or latency) requirement. In another example, the WTRU may receive, in the same message (e.g. assistance data), the PRS configurations and indications indicating which of the PRS configurations (e.g., IDs/flags) satisfy the minimum accuracy (and/or latency) requirement. In another example, the WTRU may determine which of the (pre) configured PRS configurations provided to the WTRU are able to satisfy the minimum accuracy requirement based on comparison of the measurements made and/or calculation of the positioning information with respect to the positioning information determined using one or more other reference positioning methods (e.g., GNSS positioning).

In one embodiment, when the WTRU may operate either in RRC CONNECTED or RRC INACTIVE state, the WTRU may select from the preconfigured one or more PRS configurations received from the network (e.g., LMF and/or gNB), a PRS configuration to use for measurements based on at least whether the selected PRS configuration is able to satisfy the minimum accuracy requirement associated with the positioning service of the WTRU. Other criterion used by the WTRU for selecting a PRS configuration may include the data volume threshold configured by the network (e.g., gNB) when the WTRU is configured with SDT for sending data in UL while operating in INACTIVE state, for example. In this case, the WTRU may be (pre)configured with one or more PRS configurations, where the different PRS configurations may include measurement configurations (e.g., PRS resources used for making measurements) and/or reporting configurations (e.g., information on which of the measurements to be reported). For example, the reporting configuration may indicate whether to report the absolute values of the measurements made on each of the N resources, average values of the measurements made upon averaging over the N number of resources, selected measurement values where the selection is made on the basis of measurements which are higher/lower than a configured threshold, etc. The different reporting configurations may result in different payload sizes when sending the measurement report in the uplink to the network. The (expected) payload sizes of the measurement report associated with the reporting configurations may be indicated by the network to the WTRU (e.g., in assistance data) or determined by the WTRU based on estimation of the number of resulting bits in a measurement report prior to or after performing the measurements.

Upon receiving the PRS configurations (i.e., measurement configuration and/or reporting configuration) as well as the configuration for SDT (e.g., data volume threshold) for use during INACTIVE state operation, the WTRU may select a PRS configuration such that the selected configuration satisfies the minimum accuracy requirement and/or the resulting payload size of the measurement report is less than or equal to the data volume threshold associated with the resources configured for SDT (e.g., RACH/CG). On the condition that at least one of the PRS configurations received from the network is able to satisfy the minimum accuracy (and/or latency) requirement and results in a measurement report the payload size of which is less than or equal to the SDT data volume threshold, the WTRU may select a PRS configuration from the (pre)configurations for performing the measurements. In this case, the WTRU may select a PRS configuration such that the resulting difference between the payload size of the measurement report and the configured data volume threshold is minimized, for example.

Upon selecting such PRS configuration, the WTRU may perform measurements on the PRS and may send the measurement report to the network using resources (e.g., RACH and/or CG) configured for SDT while in INACTIVE state, for example. In an example, the WTRU may include along with the measurement report sent to the network (e.g., the LMF), information related to the selected PRS configuration and/or the data volume threshold configured for use with SDT. Alternatively, on the condition that none of the (pre) configured PRS configurations are able to satisfy the minimum accuracy (and/or latency) requirement and/or results in a measurement report the payload size of which is less than or equal to the SDT data volume threshold, the WTRU may send an indication to the gNB (e.g., in a RRCResumeRequest message) requesting to transition the WTRU to RRC CONNECTED state. This would enable for the WTRU to perform measurements using a suitable PRS configuration (e.g., a PRS configuration that satisfies minimum accuracy/latency requirements) and send the measurement report to the network when operating in CONNECTED state.

Figure 13:
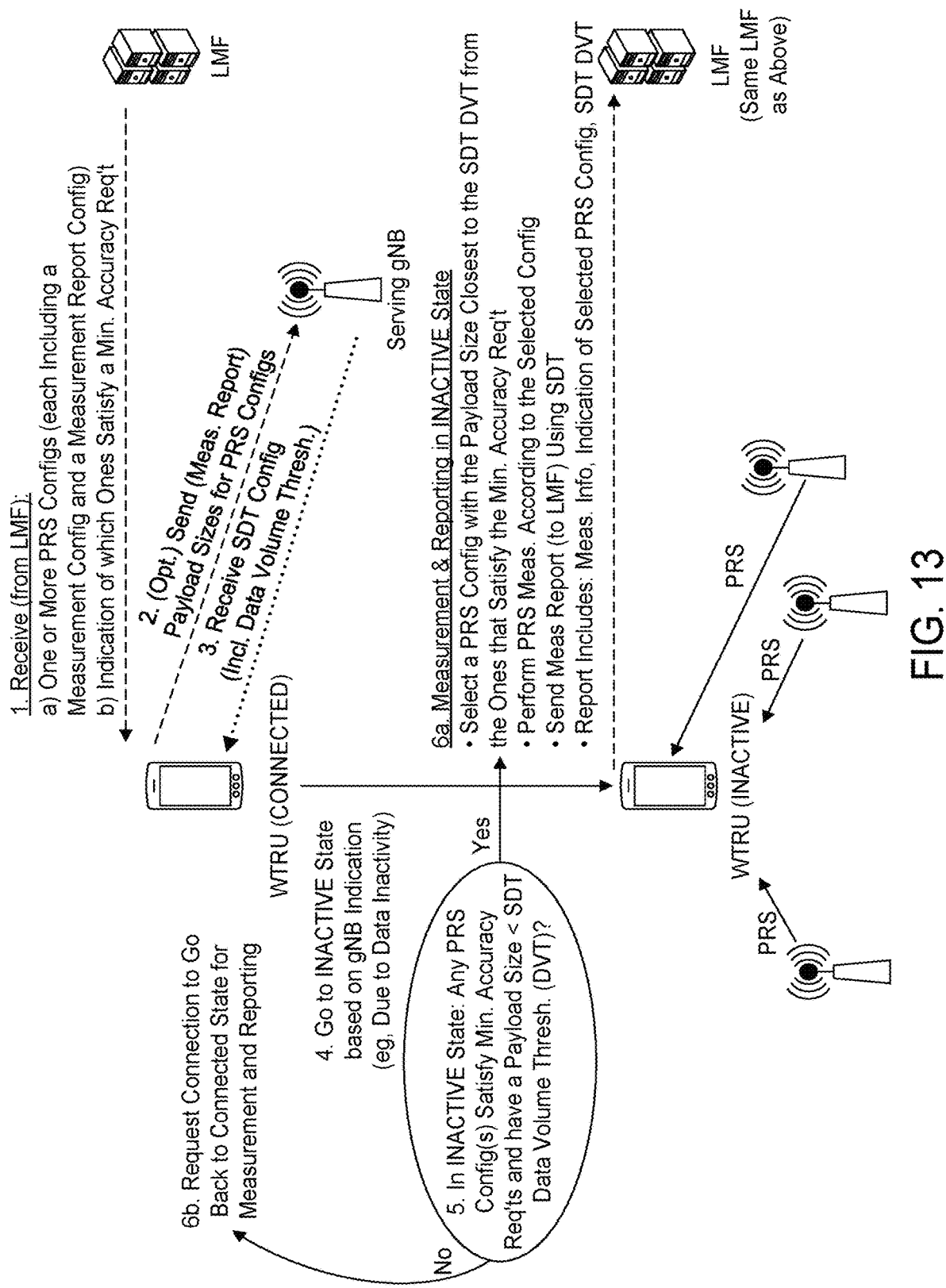
FIG. 13 is a diagram illustrating positioning measurements and reporting in INACTIVE vs. CONNECTED state based on a positioning requirement (e.g., accuracy requirements) and a data volume threshold for SDT.

The aforementioned example embodiment, including the procedure for the WTRU to perform positioning measurements and reporting in INACTIVE and/or CONNECTED state based on accuracy requirement and SDT data volume threshold is illustrated in FIG. 13. More particularly, at step 1, the WTRU receives (e.g., from the LMF) one or more PRS configurations, including a measurement configuration and a measurement reporting configuration. The WTRU also may receive an indication of which ones of the various configurations satisfy which minimum accuracy requirements. Optionally, at step 2, the WTRU may send to the serving gNB a measurement report, which may include payload sized for PRS configurations. At step 3, the serving gNB may send to the WTRU a SDT configuration, including a data volume threshold.

Next, at step 4, the WTRU may eventually go to INACTIVE state (e.g., due to data inactivity). While in INACTIVE state, the WTRU determines, at step 5, whether any PRS configurations satisfy the minimum accuracy requirements and have a payload size that is less than the established data volume threshold. IF either of those conditions are not met, the WTRU will seek to go back to CONNECTED state so that it can perform measurements and/or report its measurements to the network (step 6b). If, on the other hand, both conditions are met, then the WTRU remains in INACTIVE state to perform the measurements and/or report them to the network (Step 6a). Specifically, in an embodiment, the WTRU selects a PRS configuration with a payload size closest to, but smaller than the SDT data volume threshold from the ones satisfying the minimum accuracy requirement, performs the measurement according to the selected configuration and sends the measurement report to the LMF using SDT. The report may include the measurement information as well as an indication of the selected PRS configuration and SDT data volume threshold.

In this embodiment, a WTRU may be configured to receive (e.g., from an LMF) assistance data including one or more PRS configurations (each including a measurement config and a measurement report config), where at least some of the PRS configurations are indicated to meet a minimum accuracy requirement. The WTRU may send an indication (to a gNB) of the payload sizes (of the measurement report) associated with the one or more PRS configurations (payload sizes are WTRU determined or LMF indicated). The WTRU may receive a small data transmission (SDT) config (from the gNB) including a data volume threshold (DVT) for SDT (indicating the maximum payload size for SDT). In an example, when at least one PRS configuration from the one or more received PRS configurations indicated to satisfy the minimum accuracy requirement has an associated payload size less than the DVT for SDT: the WTRU may select a PRS config with an associated payload size closest to the DVT for SDT from among the at least one PRS configurations that satisfy the minimum accuracy requirement, and perform PRS measurements and send a measurement report (e.g., to the LMF) based on the selected PRS config using an SDT (in INACTIVE state), where the measurement report indicates the selected PRS config and the DVT for SDT. In another example, when none of the PRS configurations indicated to satisfy the minimum accuracy requirement have an associated payload size less than the DVT for SDT, the WTRU may send a connection request (to the gNB) (e.g., to transition to CONNECTED state to be able to send a measurement report).

Deferred MT-LR Positioning in INACTIVE State

In one embodiment, a WTRU may perform positioning related actions, including selection of PRS configuration, performing measurements on DL-PRS and transmission of measurement reports/location estimates, while operating in INACTIVE state when triggered by one or more events configured by a deferred MT-LR positioning procedure. The deferred MT-LR positioning refers to a procedure where the higher layers/application (e.g., LCS client), possibly located in the network, may establish and configure a location service session (e.g., LPP session) involving the LMF, AMF, and WTRU. In this case, upon receiving the deferred MT-LR request from the higher layers/application, the WTRU may be configured with PRS configuration(s) and one or more triggering events for the WTRU to monitor and perform measurements using the PRS configuration(s). For example, when a triggering event is detected by the WTRU, the WTRU performs the measurements and sends the measurement report (e.g., for WTRU-assisted mode) or location estimate (e.g. for WTRU-based mode) to the LMF. The LMF then sends the location information of the WTRU to the higher layers/application. The deferred MT-LR procedure is typically configured for use when the WTRU may operate in RRC CONNECTED state, where the positioning procedures (e.g., LPP procedures) related to WTRU receiving assistance data (e.g., consisting of PRS configuration), performing measurements and sending measurement reports may be done without consideration of any low power operation and any limitation in terms of payload size that can be supported for transmission of measurement reports.

For supporting deferred MT-LR in INACTIVE/IDLE mode, the WTRU should be able to perform one or more positioning related actions before, during, or after being triggered by the configured event(s). When performing the positioning related actions, including measurements and transmission of measurement reports/location estimates when detecting a triggering event, the WTRU may use one or more of the (pre)configured PRS configurations, for example. The (pre)configured PRS configurations received by the WTRU may include one or more aperiodic, periodic, and/or semi-persistent PRS configurations, where the use of different configurations for measurements may result in achieving different positioning QoS (e.g., accuracy, latency), for example. In this case, the PRS configurations may be received by the WTRU when in CONNECTED state, while the detection of a triggering event and the performing of positioning related actions may be done upon transitioning to INACTIVE state. For example, the triggering events configured in the WTRU for deferred MT-LR may include one or more of the following:

Time/temporal event: the WTRU may perform measurements at the start/expiry of a temporal event (e.g., start/expiry of a timer with a configured duration). For a fixed configured time duration, the WTRU performs measurements periodically with a periodicity that is a function of the time duration, for example.

Area/mobility event: the WTRU may perform measurements when detecting one or more configured cell IDs during mobility. In this case, the WTRU may perform measurements and send the measurement reports when entering the coverage area comprising at least one new cell, for example.

End of data/control channel reception: the WTRU may perform measurements when reception of PDCCH or PDSCH is completed during INACTIVE state. The WTRU may receive an indication from the network of PDCCH or PDSCH (e.g., DCI) the WTRU may receive. After receiving the indicated PDCCH or PDSCH, the WTRU should perform measurements of PRS.

In one embodiment related to INACTIVE/IDLE mode operation, the WTRU may associate the detection of one or more triggering events with the selection of a (pre)configured PRS configuration such that measurements performed in INACTIVE/IDLE mode and the determined WTRU location information results in satisfying a positioning QoS requirement (e.g., accuracy, latency) associated with deferred MT-LR. In an example, the WTRU may be configured with one or more triggering events, possibly when receiving a set of PRS configurations (e.g., in LPP assistance data). When transitioning to INACTIVE state, the WTRU may be configured by the gNB with one or more data volume threshold values associated with the payload sizes of data to be sent in the uplink using resources (e.g., RACH/CG) related to SDT configuration. When operating in INACTIVE state, the WTRU may select a PRS configuration upon detecting a triggering event, where the selection of the PRS configuration may be based on different factors including data volume threshold of measurement report payload size, the positioning QoS requirement (e.g., minimum accuracy/latency), and/or type of the detected triggering event (e.g., temporal, mobility). For example, the WTRU may select a PRS configuration such that the resulting payload size of the measurement report is less than the data volume threshold, satisfies the minimum accuracy requirement for deferred MT-LR, and/or corresponds to the type of triggering event. Upon performing measurements using the selected PRS configuration, the WTRU may send the measurement report using resources configured for SDT where the measurement report may include information on the selected PRS configuration, the size of data volume threshold, and/or type of triggering event detected, for example.

The WTRU Reporting Subset of Measurements During INACTIVE Mode Positioning Smaller Number of Quantities to Report To reduce the volume of measurement reports during INACTIVE mode, the WTRU may be configured by the network (e.g., LMF or gNB) to report a subset of measurements that the WTRU made during RRC_CONNECTED. For example, if the WTRU is configured to report measurements up to M PRS resources during RRC_CONNECTED, the WTRU may be configured by the network to report up to N PRS resources where N<M. In another example, the WTRU may be configured to report at reduced resolution/granularity of measurements or number of measurements for at least one of the following measurement/parameters during INACTIVE mode positioning:

Number of paths in multipath channels
Number of PRS resources

Resolution/granularity of RSRP
Resolution/granularity of time of arrival, TDOA, RSTD
Resolution/granularity of Rx-Tx time difference
Resolution/granularity of angle of arrival, angle of departure Reduced Frequency for Reporting In another example, the WTRU may be configured to report measurement reports at different periodicities. The WTRU may be configured with a smaller number of measurement report occasions (e.g., longer intervals between reports) compared to the number of occasions when the WTRU is in CONNECTED mode. For example, the WTRU may be configured with a decimation/muting pattern (e.g., expressed in a bitmap pattern) which indicates which measurement occasion the WTRU should skip or report during INACTIVE mode. For example, during CONNECTED mode, the WTRU may be configured to report every 1 ms. However, the WTRU may be configured to report every 10th occasion when the WTRU is in INACTIVE mode as compared to the reporting occasions during CONNECTED mode. Thus, the WTRU may report every 10 ms when the WTRU transitions to INACTIVE mode. The configuration of the reporting occasions for INACTIVE mode may be sent to the WTRU when the WTRU is in CONNECTED mode. Once the WTRU transitions to CONNECTED mode from INACTIVE mode, the WTRU may revert to the reporting configuration it had during CONNECTED mode (i.e., every 1 ms).

In another example, the WTRU may be configured (e.g., while in CONNECTED mode) with the number of measurement reports the WTRU needs to send to the network. For instance, the WTRU may be configured to send N measurement reports while the WTRU is in INACTIVE mode. After the WTRU sends the N measurement reports, the WTRU may send an indication to the network requesting more positioning occasions. Alternatively, the WTRU may terminate positioning after the WTRU sends N measurement reports to the network. In another example, the WTRU may be configured to keep sending the measurement reports at a configured periodicity while the WTRU is in INACTIVE mode until the WTRU transitions into CONNECTED mode.

Determining and Transmitting Positioning Information

In one embodiment, a method implemented in a WTRU of reporting positioning information to a network comprising receiving an indication from the network while in a low power connectivity state to commence positioning reporting; responsive to the indication, conducting positioning measurements while remaining in the low power connectivity state; and transmitting a positioning report to the network. In an example, the indication is received in a RACH procedure. The low power connectivity state may be one of RRC idle mode and RRC inactive mode. In an example, responsive to the indication from the network, the method may include: 1) transmitting a request to transition to RRC_CONNECTED mode; or 2) transmitting a signal to the network indicating a capability of the WTRU to perform positioning reporting while in the low power connectivity state.

In an example, the indication from the network includes a positioning reporting configuration for the WTRU.

In an example, the method may include transmitting a request to the network for a configuration for positioning measurement and/or reporting while in the low power connectivity state.

In an example, the WTRU may partitions the positioning report into a plurality of separate messages.

In an example, the method may include configuring a data volume threshold value for at least one Signaling Radio Bearer (SRB), and transmitting the measurement report in a Small Data Transmission (SDT) on the at least one SRB configured with a data volume threshold when a volume of the measurement report is less than the configured data volume threshold for that SRB. In some cases, the method may include receiving a data volume threshold configuration from an LMF of the network.

In an example, the method may include transmitting to the network information indicating a size of the measurement data to be transmitted. The information indicating the size of the measurement data to be transmitted may be transmitted in any one of a radio resource control (RRC) message, Media Access Control (MAC) Control Element (CE), or Uplink Control Information (UCI).

In an example, the method may include dynamically reconfiguring the data volume threshold for the at least one SRB. The dynamically reconfiguration of the data volume threshold for the at least one SRB may comprises: determining that the size of the measurement data to be transmitted exceeds a default data volume threshold of the applicable SRB and is less than a second data volume threshold of the applicable SRB greater than the default threshold; responsive to the determination, transmitting a resume request to the network containing an indicator associated with the second data volume threshold.

In an example, the method may include determining that the size of the measurement data to be transmitted exceeds a data volume threshold, and in response to the determination, segmenting the measurement data into segments smaller than the data volume threshold and transmitting the data in the segments.

In an example, the method may include determining an amount of measurement data to be transmitted to the network based on the data volume threshold.

In an example, the method may include receiving from the network an indication of at least one Positioning Reference Signal (PRS) configuration, including a configuration for taking measurements and a configuration for reporting measurements to the network; receiving from the network an indication of a level of positioning determination quality satisfied by each PRS configuration; and selecting a PRS configuration to use while in a low power connectivity state based on satisfaction of a minimum positioning accuracy threshold and a maximum measurement payload size threshold. The indication of level of positioning determination quality satisfied by each PRS configuration may include at least one of an accuracy of the positioning determination and a latency of the positioning determination. The PRS configuration may be determined/selected based on a criterion to minimize a difference between a payload size of the measurement report and maximum payload size requirement.

In some examples, if the WTRU does not have a PRS configuration that satisfies the minimum positioning accuracy threshold and the maximum measurement payload size threshold, the WTRU may transmit a request to the network to transition to CONNECTED mode.

In some examples, the indication of level of positioning determination quality comprises at least one of: a threshold for standard deviation/variance for the position estimate; a threshold for a range of the position estimate; a threshold for latency; and/or a threshold for accuracy.

In one embodiment, a method implemented in a WTRU of reporting positioning information to a network comprising: receiving assistance data including one or more Positioning Reference Signal (PRS) configurations (each may include a measurement config and a measurement report config), wherein at least one of the PRS configurations are indicated to meet a minimum accuracy requirement; sending an indication (e.g., to a gNB) of the payload sizes (of measurement report(s)) associated with the one or more PRS configurations; receiving a small data transmission (SDT) configuration (e.g., from the gNB) including a data volume threshold (DVT) for SDT (e.g., indicating the maximum payload size for SDT); on condition that at least one PRS config from the one or more received PRS configurations indicated to satisfy the minimum accuracy requirement has an associated payload size less than the DVT for SDT: selecting a PRS config with an associated payload size closest to the DVT for SDT from among the at least one PRS configurations that satisfy the minimum accuracy requirement; and performing PRS measurements and sending a measurement report (to the LMF) based on the selected PRS config using an SDT (e.g., in INACTIVE state), wherein the measurement report indicates the selected PRS config and the DVT for SDT; and on condition that none of the PRS configurations indicated to satisfy the minimum accuracy requirement have an associated payload size less than the DVT for SDT, sending a connection request (e.g., to the gNB) (e.g., to transition to CONNECTED state to be able to send a measurement report).

REFERENCES

The following references may have been referred to hereinabove and are incorporated in full herein by reference: [1] 3GPP, "User Equipment (UE) positioning in NG-RAN," TS 38.305, ver. 16.1.0, July 2020; and [2] 3GPP, "Radio Resource Control (RRC) protocol specification," TS 38.331, ver. 16.1.0, July 2020.

CONCLUSION

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU 102, WTRU, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost vs. efficiency tradeoffs. There may be various vehicles by which processes and/or systems and/or other technologies described herein may be affected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting. As used herein, when referred to herein, the terms "station" and its abbreviation "STA", "user equipment" and its abbreviation "UE" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like. Details of an example WTRU, which may be representative of any WTRU recited herein, are provided herein with respect to FIGS. 1A-1D.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type of medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc."

is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶ 6 or means-plus-function claim format, and any claim without the terms "means for" is not so intended.

Although the invention is illustrated and described herein with reference to specific embodiments, the invention is not intended to be limited to the details shown. Rather, various modifications may be made in the details within the scope and range of equivalents of the claims and without departing from the invention.

Throughout the disclosure, one of skill understands that certain representative embodiments may be used in the alternative or in combination with other representative embodiments.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a UE, WTRU, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits.

The data bits may also be maintained on a computer readable medium including magnetic disks, optical disks, and any other volatile (e.g., Random Access Memory ("RAM")) or non-volatile ("e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

No element, act, or instruction used in the description of the present application should be construed as critical or essential to the invention unless explicitly described as such. In addition, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Further, as used herein, the term "set" is intended to include any number of items, including zero. Further, as used herein, the term "number" is intended to include any number, including zero.

Moreover, the claims should not be read as limited to the described order or elements unless stated to that effect. In addition, use of the term "means" in any claim is intended to invoke 35 U.S.C. § 112, ¶ 6, and any claim without the word "means" is not so intended.

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used m conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A wireless transmit/receive unit (WTRU) comprising:
a processor configured to:
receive a configuration of sounding reference signals (SRS) for positioning, wherein the configuration comprises information indicating one or more SRS resources, a validity area information associated with the configuration, and a validity time information associated with the configuration, wherein the validity area information associated with the configuration comprises one or more cells indicated by a cell ID;
transition to an INACTIVE mode;
initialize a validity timer in accordance with the validity time information indicated by the configuration;
send a first SRS transmission using the one or more configured SRS resources during operation in the INACTIVE mode;
determine that the WTRU has moved to a different cell;
on condition that the different cell is one of the one or more cells comprised in the validity area information associated with the configuration, and on condition that the validity timer is running, transmit a second SRS transmission using the one or more configured SRS resources; and
on condition that the different cell is not one of the one or more cells comprised in the validity area information associated with the configuration, initiate a connection resume procedure, wherein the processor is configured to transmit a resume request message during the connection resume procedure, and wherein the resume request message comprises a cause value indicating an SRS configuration request.

2. The WTRU of claim 1, wherein the configuration is received in a radio resource control (RRC) release message.

3. The WTRU of claim 1, wherein the processor is configured to initialize the validity timer in accordance with the validity time information indicated by the configuration during the transition to the INACTIVE mode.

4. The WTRU of claim 1, wherein the processor is configured to refrain from transmitting SRS transmissions in accordance with the configuration on condition that the validity timer has expired.

5. The WTRU of claim 1, wherein information indicating the one or more SRS resources comprises information indicating frequency position information, frequency hopping information, spatial relation information, transmission power information, or symbol information.

6. The WTRU of claim 1, wherein the configuration comprises information indicating an SRS resource set that includes the one or more SRS resources.

7. The WTRU of claim 1, wherein the processor is configured to:
generate a small data buffer status report (BSR) medium access control (MAC) control element (CE), wherein the small data BSR MAC CE indicates a request for an uplink positioning resource, wherein the WTRU is configured with logical channel associated with transmission of positioning reporting bits, the positioning reporting bits are associated with small data transmission, and the small data BSR MAC CE is trigger based on generation of the positioning reporting bits;
on condition that the WTRU has an uplink shared data resource available for transmission, multiplex the small data BSR MAC CE indicating the request for the uplink positioning resource in the uplink shared data resource;
transmit the small data BSR MAC CE indicating the request for the uplink positioning resource using the uplink shared data resource; and
cancel the small data BSR MAC CE upon transmitting a subsequent small data transmission using a different small data transmission (SDT) resource.

8. A method implemented by a wireless transmit/receive unit (WTRU), the method comprising:
receiving a configuration of sounding reference signals (SRS) for positioning, wherein the configuration comprises information indicating one or more SRS resources, a validity area information associated with the configuration, and a validity time information associated with the configuration, wherein the validity area information associated with the configuration comprises one or more cells indicated by a cell ID;
transitioning to an INACTIVE mode;
initializing a validity timer in accordance with the validity time information indicated by the configuration;

sending an SRS transmission using the one or more configured SRS resources during operation in the INACTIVE mode;
determining that the WTRU has moved to a different cell;
on condition that the different cell is one of the one or more cells comprised in the validity area information associated with the configuration, and on condition that the validity timer is running, transmitting a second SRS transmission using the one or more configured SRS resources; and
on condition that the different cell is not one of the one or more cells comprised in the validity area information associated with the configuration, initiating a connection resume procedure, wherein the connection resume procedure comprises transmitting a resume request message during the connection resume procedure, and wherein the resume request message comprises a cause value indicating an SRS configuration request.

9. The method of claim 8, wherein the configuration is received in a radio resource control (RRC) release message.

10. The method of claim 8, wherein the validity timer is initialized in accordance with the validity time information indicated by the configuration during the transition to the INACTIVE mode.

11. The method of claim 8, further comprising refraining from transmitting SRS transmissions in accordance with the configuration on condition that the validity timer has expired.

12. The method of claim 8, wherein information indicating the one or more SRS resources comprises information indicating frequency position information, frequency hopping information, spatial relation information, transmission power information, or symbol information.

13. The method of claim 8, wherein the configuration comprises information indicating an SRS resource set that includes the one or more SRS resources.

14. The method of claim 8, further comprising:
generating a small data buffer status report (BSR) medium access control (MAC) control element (CE), wherein the small data BSR MAC CE indicates a request for an uplink positioning resource, wherein the WTRU is configured with logical channel associated with transmission of positioning reporting bits, the positioning reporting bits are associated with small data transmission, and the small data BSR MAC CE is trigger based on generation of the positioning reporting bits;
on condition that the WTRU has an uplink shared data resource available for transmission, multiplexing the small data BSR MAC CE indicating the request for the uplink positioning resource in the uplink shared data resource;
transmitting the small data BSR MAC CE indicating the request for the uplink positioning resource using the uplink shared data resource; and
cancelling the small data BSR MAC CE upon transmitting a subsequent small data transmission using a different small data transfer (SDT) resource.

\* \* \* \* \*